(12) United States Patent
Okita et al.

(10) Patent No.: US 8,843,272 B2
(45) Date of Patent: Sep. 23, 2014

(54) VEHICLE DRIVING SUPPORT DEVICE AND VEHICLE DRIVING SUPPORT METHOD

(71) Applicant: Mazda Motor Corporation, Hiroshima (JP)

(72) Inventors: Reiji Okita, Hiroshima (JP); Kenji Sasaki, Hiroshima (JP); Kensaku Oguri, Aki-gun (JP); Yosuke Ishii, Higashihiroshima (JP); Takeatsu Ito, Higashihiroshima (JP); Naoto Kawahara, Hiroshima (JP); Kazuya Ohsumi, Hiroshima (JP); Kenji Okada, Higashihiroshima (JP); Hidenobu Nakashima, Hiroshima (JP); Naoya Sugano, Hiroshima (JP); Manabu Shibakawa, Hiroshima (JP); Atsunori Tsukuda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/030,852

(22) Filed: Sep. 18, 2013

(65) Prior Publication Data
US 2014/0018974 A1 Jan. 16, 2014

Related U.S. Application Data

(63) Continuation of application No. PCT/JP2012/001106, filed on Feb. 20, 2012.

(30) Foreign Application Priority Data

Mar. 18, 2011 (JP) .................................. 2011-061685

(51) Int. Cl.
*B60W 30/20* (2006.01)
*B60W 40/09* (2012.01)
*B60W 50/14* (2012.01)
*G06F 7/00* (2006.01)
*B60W 50/00* (2006.01)

(52) U.S. Cl.
CPC ............ *G06F 7/00* (2013.01); *B60W 2520/105* (2013.01); *B60W 2540/30* (2013.01); *B60W 30/20* (2013.01); *B60W 2050/0031* (2013.01); *B60W 50/14* (2013.01); *B60W 40/09* (2013.01); *B60W 2050/146* (2013.01)
USPC ............................................................ 701/36

(58) Field of Classification Search
CPC ................................ B60R 16/00; G06F 17/00
See application file for complete search history.

(56) References Cited

U.S. PATENT DOCUMENTS

| 2002/0183958 A1* | 12/2002 | McCall et al. ................ 702/141 |
| 2010/0209890 A1* | 8/2010 | Huang et al. .................... 434/65 |
| 2010/0274435 A1* | 10/2010 | Kondoh et al. ................. 701/29 |

FOREIGN PATENT DOCUMENTS

| JP | 2002-211265 A | 7/2002 |
| JP | 2009-168862 A | 7/2009 |
| JP | 2009-209899 A | 9/2009 |
| JP | 2010-038645 A | 2/2010 |

OTHER PUBLICATIONS

International Search Report; PCT/JP2012/001106; Mar. 19, 2012.

* cited by examiner

*Primary Examiner* — John R Olszewski
*Assistant Examiner* — Jason Roberson
(74) *Attorney, Agent, or Firm* — Studebaker & Brackett PC

(57) ABSTRACT

There is provided a vehicle driving support device including: a change amount calculating part 10 that calculates a first correlation value correlated to a change amount of acceleration of a vehicle; a jerk calculating part 11 that calculates a second correlation value correlated to a jerk of the vehicle; and an operation state determining part 13 that determines a driving operation state of the vehicle from a first correlation value calculated by a change amount calculating part 10, and a second correlation value calculated by a jerk calculating part 11, in accordance with a determination reference previously set from a ratio of a kinetic energy of a mass point to the change amount of the acceleration of the vehicle at an end point of change when the acceleration of the vehicle is changed, calculated using a vibration model showing a movement of the mass point in a passenger compartment.

33 Claims, 32 Drawing Sheets

AVERAGE VEHICLE SPEED
IN NEAREST 2 SECONDS

Fig. 16
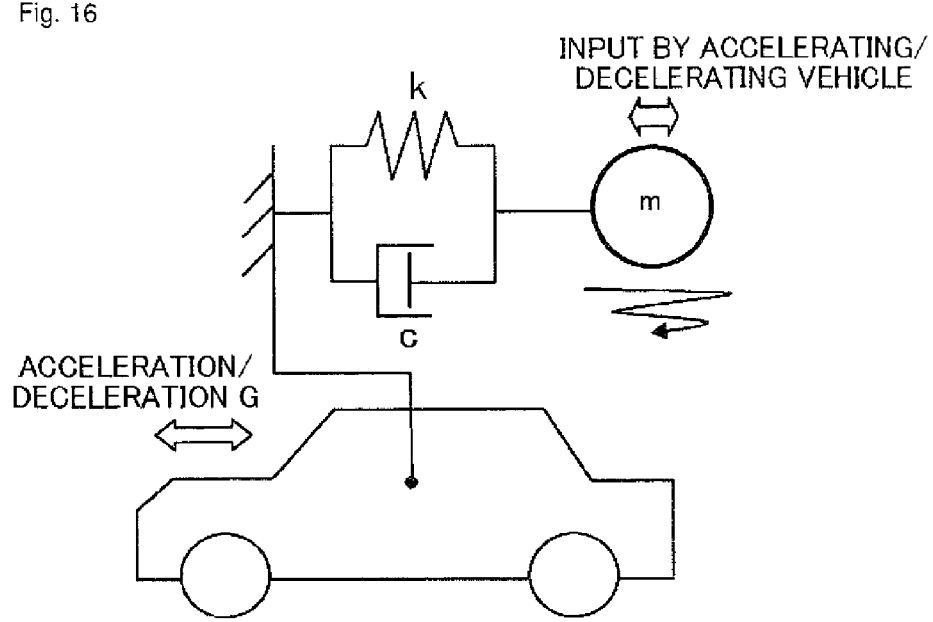
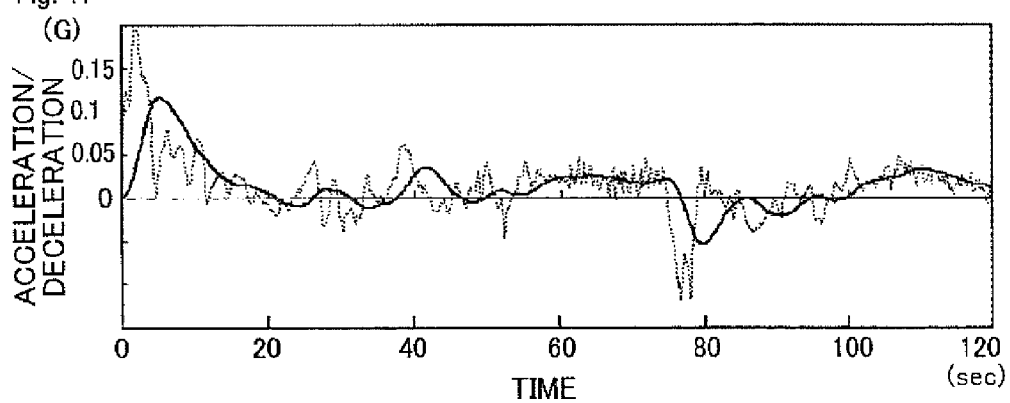
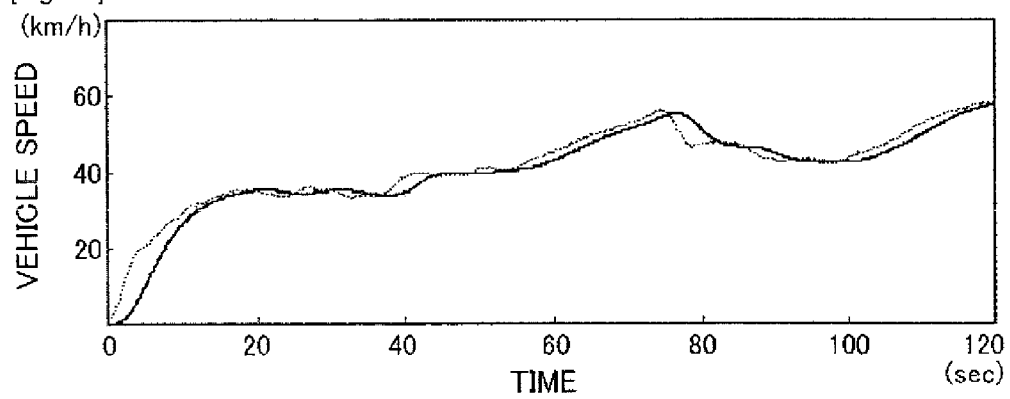

VEHICLE DRIVING SUPPORT DEVICE AND VEHICLE DRIVING SUPPORT METHOD

TECHNICAL FIELD

The present invention relates to a vehicle driving support device capable of supporting driving a vehicle.

BACKGROUND ART

A vehicle driving support device capable of supporting driving a vehicle, is known as a conventional art. Some of such a vehicle driving support device determines a driving operation state of a vehicle (for example, see PTL1). The vehicle driving support device of PTL1 includes a travel section dividing part configured to divide each of a plurality of travel sections of the vehicle into a plurality of sub-sections based on a road attribute; a virtual travel section formation part configured to form a virtual travel section by linking the sub-sections included in a plurality of travel sections in common; and a driving skill evaluation part configured to evaluate a driving skill from traveling data, which is the traveling data of the vehicle in the virtual travel section and is obtained from the traveling data of the vehicle in the sub-sections used for forming the virtual travel section. The traveling data includes vehicle fuel efficiency, number of times of sudden braking, number of times of sudden start, and number of times of sudden steering. Thus, the driving skill can be fairly evaluated even when a plurality of persons use the same vehicle and travel through different sections.

Further, jerk, being an acceleration change rate per unit time, is already known (for example, see PTL2). PTL2 discloses a driving control device that controls a vehicle based on an operation amount of an operation member operated by a driver. Specifically, the driving control device controls a throttle opening of an internal-combustion engine based on a target acceleration which is set based on a target jerk.

CITATION LIST

Patent Literature

PTL1: Japanese Patent Application Laid-Open No. 2009-168862
PTL2: Japanese Patent Application Laid-Open No. 2009-209899

SUMMARY OF INVENTION

Technical Problem

Incidentally, as a result of strenuous efforts by inventors of the present invention regarding a relation between the jerk of a vehicle and a driving operation state of the vehicle, it is found that the driving operation state can be precisely determined from the jerk.

In view of the above-described situation, the present invention is provided, and an object of the present invention is to precisely determine the driving operation state of the vehicle.

Solution to Problem

In order to solve the above-described problem, the present invention provides a vehicle driving support device capable of supporting vehicle driving.

Namely, according to an aspect of the present invention, there is provided a vehicle driving support device capable of supporting driving a vehicle, including:

a change amount calculation unit that calculates a first correlation value correlated to a change amount of an acceleration of the vehicle; a jerk calculation unit that calculates a second correlation value correlated to a jerk of the vehicle; and an operation state determination unit that determines a driving operation state of the vehicle, wherein based on the first correlation value and the second correlation value, the operation state determination unit calculates a ratio of a kinetic energy of a mass point to the change amount of the acceleration of the vehicle, at an end point of a change when the acceleration of the vehicle is changed, by using a vibration model showing a movement of the mass point in a passenger compartment, and determines a driving operation state of the vehicle in accordance with a determination reference in which the ratio of the kinetic energy to the change amount of the acceleration is previously set.

According to the above-described structure, based on the first correlation value and the second correlation value, the operation state determination unit calculates the ratio of the kinetic energy of the mass point at the end point of the change when the acceleration of the vehicle is changed, with respect to the change amount of the acceleration of the vehicle, using the vibration model showing the movement of the mass point in the passenger compartment, and determines the driving operation state of the vehicle in accordance with the determination reference in which the ratio of the kinetic energy with respect to the change amount of the acceleration is previously set. Therefore, the driving operation state of the vehicle can be precisely determined.

BRIEF DESCRIPTION OF DRAWINGS

FIG. 16 is a view showing the vibration model.

FIG. 17 is a graph showing an example of a relation between time and acceleration in a back and forth direction of the vehicle.

FIG. 18 is a graph showing an example of a relation between time and a vehicle speed.

FIG. 43 is a view showing modified examples of the sleek operation display part, the operation display part shaking in the back and forth direction, the operation display part shaking in the right and left direction, and the gentle operation display part, wherein FIG. 43(a) is a view showing an arrangement of the sleek operation display part, the operation display part shaking in the back and forth direction, the operation display part shaking in the right and left direction, and the gentle operation display part, and FIG. 43(b) is a view showing a state that the sleek operation display part is lighted and displayed, and FIG. 43(c) is a view showing a state that the gentle operation display part is lighted and displayed, and FIG. 43(d) is a view showing a state thon an upper side operation display part shaking in the back and forth direction is lighted and displayed, and FIG. 43(e) is a view showing a state that a right side operation display part shaking in the right and left direction is lighted and displayed.

FIG. 44 is a view showing another modified examples of the operation display part shaking in the back and forth direction, the operation display part shaking in the right and left direction, and the gentle operation display part, wherein FIG. 44(a) is a view showing an arrangement of the sleek operation display part, the operation display part shaking in the back and forth direction, the operation display part shaking in the right and left direction, and the gentle operation display part, and FIG. 44(b) is a view showing a state that the sleek operation display part is lighted and displayed, and FIG. 44(c) is a view showing a state that the gentle operation display part is lighted and displayed, and FIG. 44(d) is a view showing a state that the operation display part shaking in the back and forth direction is lighted and displayed, and FIG. 44(e) is a view showing a state that the operation display part shaking in the right and left direction is lighted and displayed.

DESCRIPTION OF EMBODIMENTS

Preferred embodiments of the present invention will be described hereafter, based on the drawings.

Figure 1:
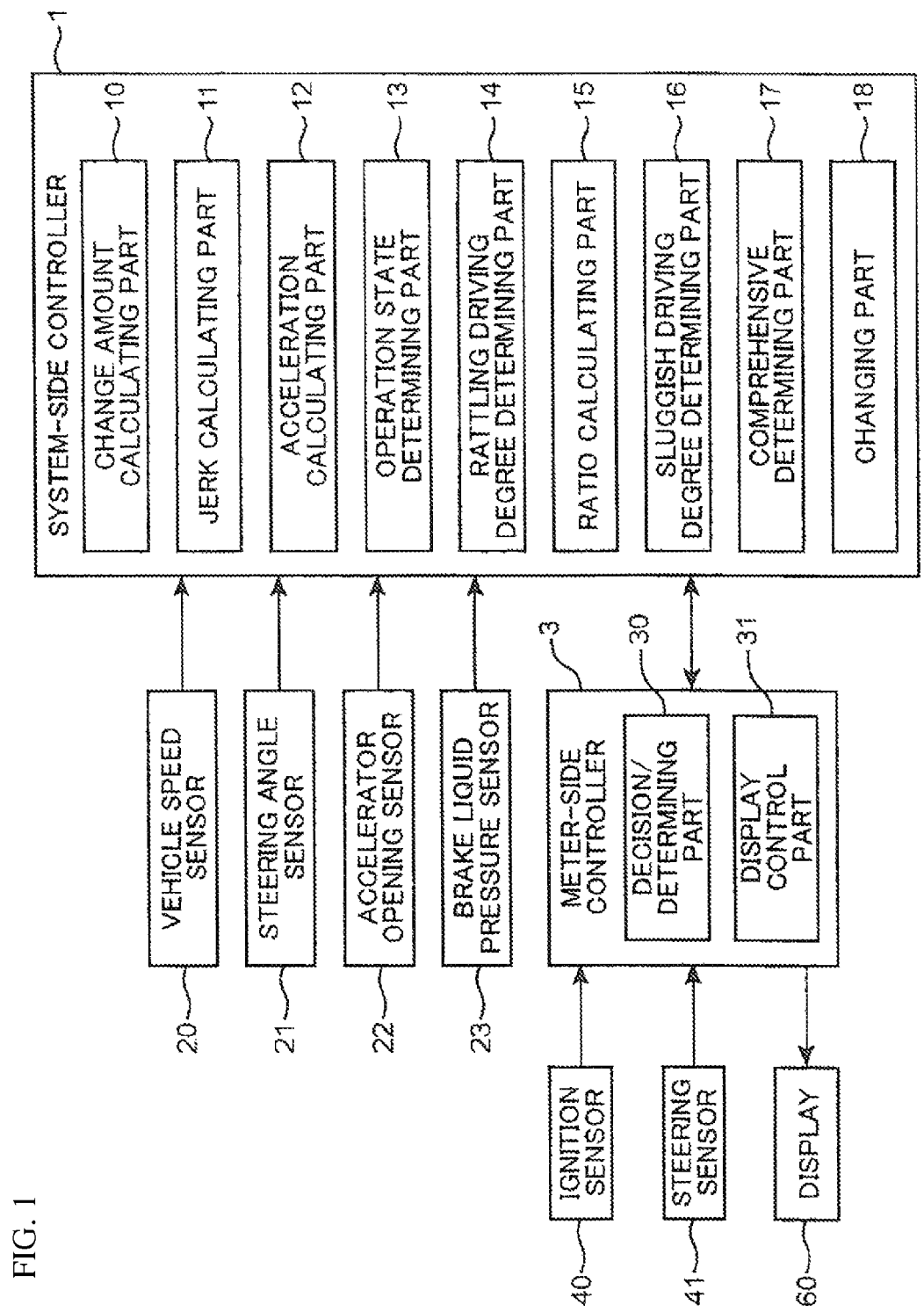
FIG. 1 is a block diagram showing a vehicle driving support device according to an embodiment of the present invention.

FIG. 1 is a block diagram showing a vehicle driving support system (also called a smart driving support system) including a vehicle display device according to an embodiment of the present invention. Reference numeral 1 indicates a system side controller (also called a PCM) that carries out determination/evaluation control of a driving operation state of a vehicle driven by a driver.

The system side controller 1 determines/evaluates the driving operation state of the vehicle (driving skill), from signals inputted from a vehicle speed sensor 20 for detecting a vehicle speed, a steering angle sensor 21 for detecting a steering angle of the vehicle, an accelerator opening sensor 22 for detecting an accelerator opening of the vehicle, and a brake liquid pressure sensor 23 for detecting a brake liquid pressure of the vehicle, and the like.

Specifically, the driving operation state is determined and evaluated, whether it is a "sleek driving" state, or a "body-shaking driving state (called a "shaking driving" state hereafter)", or a "gentle driving" state, and is determined and evaluated from a "rattling driving" degree.

More specifically, regarding the back and forth direction of the vehicle, the driving operation state in the back and forth direction of the vehicle is determined and evaluated, by determining whether it is the sleek (stylish) driving state, or the shaking driving state, or the gentle driving state, and is determined and evaluated from the rattling driving degree in the back and forth direction of the vehicle. Meanwhile, regarding the right and left direction of the vehicle, the driving operation state in the right and left direction is determined and evaluated by determining whether it is the sleek driving state, or the shaking driving state, or the gentle driving state, and is determined and evaluated from the rattling driving degree in the right and left direction of the vehicle. Note that a driving operation in the back and forth direction of the vehicle includes an accelerator operation and brake operation, and the driving operation in the right and left direction of the vehicle includes a steering operation.

The system side controller 1 includes a change amount calculating part (change amount calculation unit) 10, a jerk calculating part (jerk calculation unit) 11, an acceleration calculating part (acceleration calculation unit) 12, an operation state determining part (operation state determination unit) 13, a rattling drive degree determining part (rattling drive degree determination unit) 14, a ratio calculating part 15, a sluggish driving degree determining part 16, a comprehensive determining part (comprehensive determination unit) 17, and a changing part (changing unit) 18.

The change amount calculating part 10 calculates (computes) a first correlation value correlated to a change amount (change width) of the acceleration (acceleration and deceleration) of the vehicle, from signals detected by the vehicle speed sensor 20 and the steering angle sensor 21. The jerk calculating part 11 calculates a second correlation value correlated to the jerk of the vehicle, from the signals detected by the vehicle speed sensor 20 and the steering angle sensor 21. The acceleration calculating part 12 calculates a third correlation value correlated to an absolute value of the acceleration of the vehicle, from the signals detected by the vehicle speed sensor 20 and the steering angle sensor 21.

The operation state determining part 13 calculates a ratio of a kinetic energy added to a mass point with respect to the change amount of the acceleration of the vehicle, at an end point of a change when the acceleration of the vehicle is changed, using a vibration model showing a movement of the mass point in a passenger compartment, based on the first correlation value calculated by the change amount calculating part 10, and the second correlation value calculated by the jerk calculating part 11, and determines the driving operation state, whether it is the sleek driving state exhibiting moderate change of acceleration (which is not excessively slow, and is not excessively fast) (first driving operation state which is a preferable driving operation state), or a shaking driving state exhibiting sudden change of acceleration (second driving operation state which is unpreferable driving operation state), or a gentle driving state exhibiting slow change of acceleration (third driving operation state which is a preferable driving operation state).

Specifically, when the first correlation value is a predetermined value or more, the operation state determining part 13 determines the driving operation state, whether it is the sleek driving state, or the shaking driving state, or the gentle driving state, based on a determination reference, from the first and second correlation values, using a first determination map. Meanwhile when the first correlation value is smaller than a predetermined value, the operation state determining part 13 determines the driving operation state, whether it is the sleek driving state exhibiting moderate acceleration, from the first correlation value and the third correlation value which is calculated by the acceleration calculating part 12, using a second determination map different from the first determination map.

The rattling driving degree determining part 14 determines a degree of rattling drive. The ratio calculating part 15 calculates a ratio of a time required for change, with respect to the change amount of the vehicle speed (also called a vehicle speed difference). The sluggish driving degree determining part 16 determines a degree of a sluggish drive.

The comprehensive determining part 17 calculates a score of a determination result determined by the operation state determining part 13 in the current drive of the vehicle (drive from a nearest ignition on-state to the current state. Also called 1DC (1-trip) hereafter), and calculates a first evaluation index by dividing the score thus obtained, by the number of times of determination determined by the operation state determining part 13 in the current drive, and calculates a comprehensive evaluation point of the driving operation state in the current drive of the vehicle, from the first evaluation index thus obtained.

Specifically, the comprehensive determining part 17 calculates the score of the determination result determined by the rattling driving degree determining part 14 in the current drive of the vehicle, and calculates a second evaluation index by dividing the score by a determination time or the number of times of determination determined by the rattling driving degree determining part 14 in the current drive of the vehicle, and calculates first and second evaluation points from the first and second evaluation indices, and calculates a comprehensive evaluation point of the driving operation state in the current drive of the vehicle, from the first and second evaluation points. The changing part 18 changes the aforementioned determination reference, from the comprehensive evaluation point calculated by the comprehensive determining part 17.

Details of the aforementioned determination/evaluation will be described hereafter.

<<Determination of the Sleek Driving State, Shaking Driving State, and Gentle Driving State>>

Determination of the sleek driving state, shaking driving state, and gentle driving state, is carried out as follows.

<Determination Reference>

The aforementioned determination reference is obtained as described below.

—Calculation of the Determination Reference Used Accelerating and Decelerating the Vehicle in the Back and Forth Direction of the Vehicle—

First, explanation will be given for the calculation of the determination reference used for accelerating and decelerating the vehicle in the back and forth direction of the vehicle.

The determination reference used for accelerating and decelerating the vehicle in the back and forth direction of the vehicle, includes the determination reference used for accelerating the vehicle by accelerator-on (accelerator stepping operation), the determination reference used for accelerating the vehicle by brake-off (brake releasing operation), the determination reference used for decelerating the vehicle by accelerator-off (accelerator releasing operation), and the determination reference used for decelerating the vehicle by brake-on (brake stepping operation). These determination references are different from each other. The explanation will be given hereafter for a calculation method of the determination reference used for accelerating the vehicle by accelerator-on. Note that the other calculation method of the determination reference, is substantially same as the calculation method of the determination reference used for accelerating the vehicle by accelerator-on. Further, the accelerator-on, accelerator-off, brake-off, brake-on, and brake-off are determined from the acceleration in the back and forth direction of the vehicle, which is calculated from a signal detected by the vehicle speed sensor 20.

In order to calculate the determination reference, first, the acceleration in the back and forth direction of the vehicle (the back and forth direction of the vehicle G) is calculated by differentiating the signal with respect to time, which is the signal detected by the vehicle speed sensor 20, corresponding to the vehicle speed.

The acceleration thus calculated includes a high frequency (for example, 0.5 Hz or more) noise component, and an actual vehicle behavior is not shown in this high frequency area.

Figure 2:
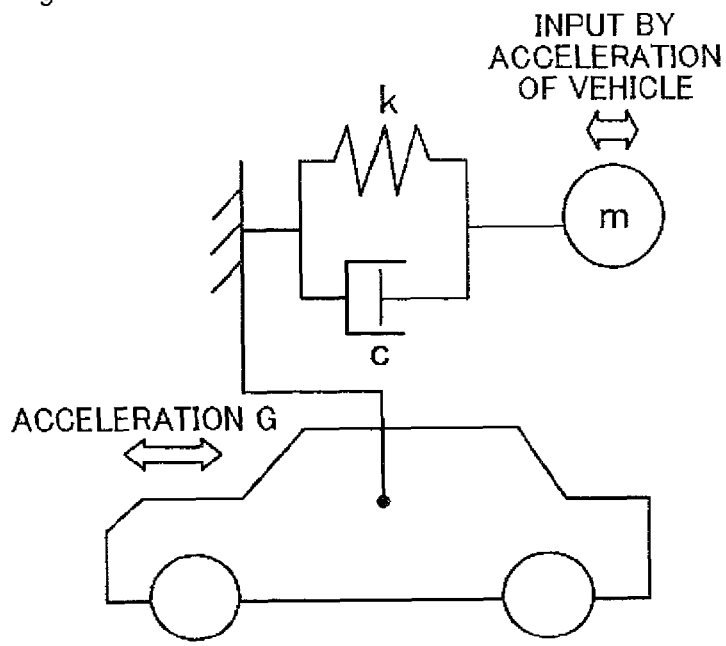
FIG. 2 is a view showing a vibration model.

Therefore, a position of the mass point in the passenger compartment is calculated as the acceleration in the back and forth direction of the vehicle, with the noise component removed (the position of the mass point in the passenger compartment (moving amount from a reference position, with a mass position as a reference at a point when the acceleration of the vehicle is 0) is a value proportional to a constant acceleration of the vehicle, and therefore the mass position can be calculated as the acceleration of the vehicle). Details thereof are explained hereafter using FIG. 2. FIG. 2 is a view showing the vibration model for removing the noise.

As shown in FIG. 2, viscosity damper model with 1 degree of freedom (1-DOF) (spring, mass, damper model with 1-DOF) fixed to the vehicle, is used as the vibration model for removing the noise. This model is previously stored in a memory (not shown). The same thing can be said for all vibration models given hereafter.

A differential equation of the mass point (equation of motion) is expressed by the following Equation (1).

$$m \cdot \frac{d^2 x}{dt^2} + c \cdot \frac{dx}{dt} + k \cdot x = f(t) \quad (1)$$

wherein mass amount is expressed by m, a spring constant is expressed by k, a damping constant (damping coefficient) of a damper is expressed by C, the mass position is expressed by x (a reference position x=0 is defined as the position where the acceleration of the vehicle is 0 and the mass point is set in a stationary state), time is expressed by t, and power input to the mass point is expressed by f(t) (wherein m, k, C, x, t, and f(t) are given for relatively comparing the calculation results of the vibration model, and are nondimensional quantities. The same thing can be said hereafter).

Values of m, k, and C are determined as follows. Namely, the values of m and k are set in a range of 0.5 to 1 Hz of a specific frequency value (proportional to the value of k/m), so that the noise component of 0.5 Hz or more can be maximally removed without phase deviation. For example, the value of k is set in a range of 50 to 200, when m=5.

Note that hereinafter in the specification, Greek Characters on the left are expressed as Roman Characters on the right:

| Greek Characters | Roman Characters |
| --- | --- |
| δ' | d' |
| Ω | W |
| ζ | zeta |
| Δ | D |
| ω | w |

Thus 'DG' in the specification corresponds to 'ΔG' in the mathematical expression (s) and FIGS.
Similarly, 'DE' corresponds to 'ΔE' and 'Dt' corresponds to 'Δt'.

Further, the value of C is set in a range of 0.5 to 1.0 of a value of a damping ratio, so as to be close to an actual state during continuous traveling. The damping ratio is expressed by zeta, and zeta is expressed by the following Equation.

$$\varsigma = \frac{c}{2\sqrt{m \cdot k}}$$

For example, the value of C is set in a range of 20 to 40, when m=5, and k=80.

Here, for example, m=5, k=80, and C=25.
Further, f(t) is expressed by the following Equation.

f(t)=(mass amount m)×(acceleration in the back and forth direction of the vehicle)

Sequential computation using the differential equation is carried out, as a calculation method of numerical values of the differential equation expressed by Equation (1).

A single differential value and a secondary differential value of the mass position x with respect to time t, are respectively expressed by the following Equations (2) and (3).

$$\frac{dx}{dt} = \frac{x(t + \Delta t) - x(t)}{\Delta t} \quad (2)$$

$$\frac{d^2 x}{dt^2} = \left\{ \frac{x(t + \Delta t) - x(t)}{\Delta t} - \frac{x(t) - x(t - \Delta t)}{\Delta t} \right\} / \Delta t \quad (3)$$

Equations (2) and (3) are substituted into Equation (1), and expressed by the following Equation (4).

$$x(t - \Delta t) = \quad (4)$$
$$\left\{ \left( 2 + \frac{c}{m} \cdot \Delta t - \frac{k}{m} \cdot \Delta t^2 \right) \cdot x(t) - x(t - \Delta t) + \frac{f(t)}{m} \cdot \Delta t^2 \right\} / \left( 1 + \frac{c}{m} \cdot \Delta t \right)$$

Using this Equation (4), mass position x (t+Dt) at time t+Dt is sequentially calculated from mass position x(t) at time t and mass position x (t−Dt) at time t−Dt. As described above, the mass position x corresponds to the acceleration in the back and forth direction of the vehicle, with high frequency noise component removed.

Figure 3:
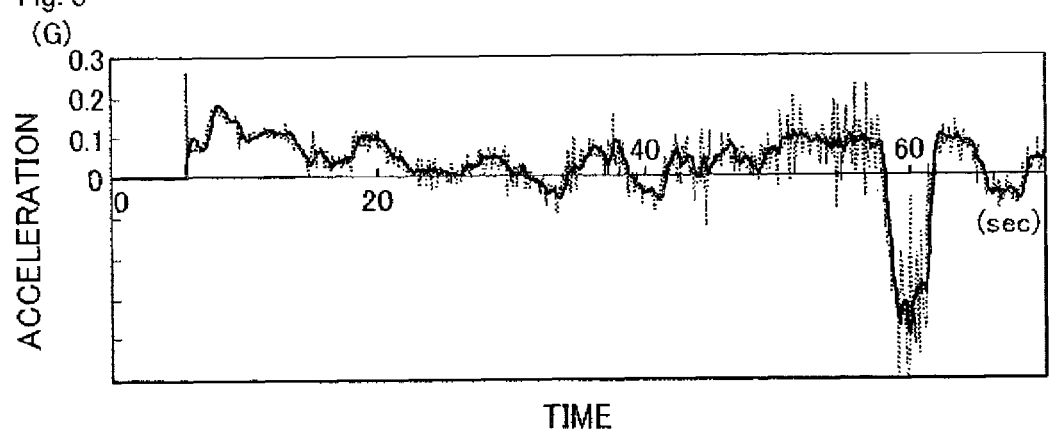
FIG. 3 is a graph showing an example of a relation between time and acceleration in a back and forth direction of a vehicle.

FIG. 3 is a graph showing an example of the relation between time and acceleration in the back and forth direction of the vehicle. In FIG. 3, solid line shows the relation between time and acceleration (mass position) in the back and forth direction of the vehicle calculated using the time and the vibration model, and broken line shows the relation between time and acceleration in the back and forth direction of the vehicle calculated from the signal detected by the vehicle speed sensor 20, with high frequency noise component removed.

As described above, the mass position is calculated as the acceleration in the back and forth direction of the vehicle, with high frequency noise component removed.

Note that using the vibration model, the acceleration in the back and forth direction of the vehicle is obtained, with high frequency noise component removed. However, for example a low frequency pass filter may also be used to obtain the acceleration in the back and forth direction of the vehicle.

Figure 4:
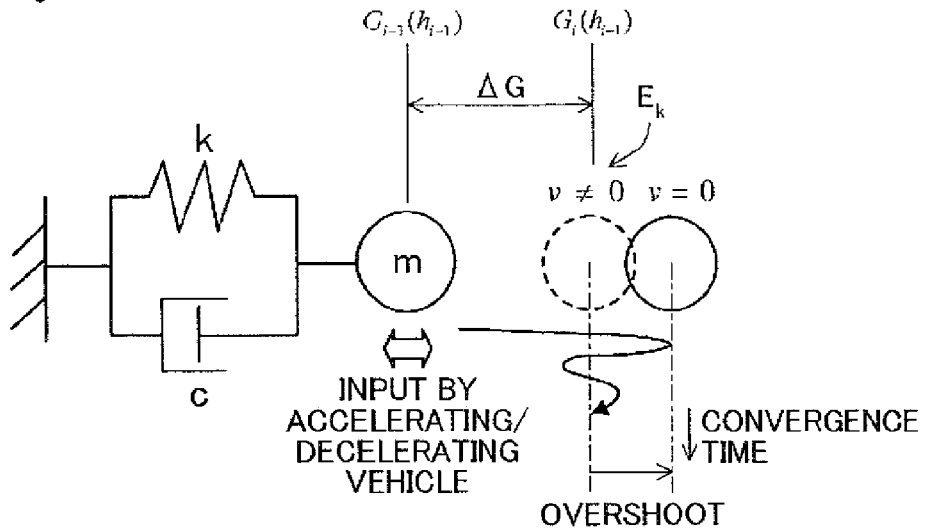
FIG. 4 is a view showing the vibration model.

Next, using the vibration model, the position of the mass point, being a head of a passenger seated in the passenger compartment, is calculated by inputting a force f(t) into the mass point, with high frequency noise component removed, wherein the force f(t) is inputted to the mass point by the acceleration in the back and forth direction of the vehicle. Namely, a movement of the head is assumed by the vibration model and the mass position in this case is calculated, wherein the movement of the head is caused by the change of the acceleration in the back and forth direction of the vehicle. The driving operation state of the vehicle is determined and evaluated using this mass point. This is because change of the acceleration of the vehicle is complicated under various influences of a road surface and a shift change, etc., and meanwhile the movement of the head does not follow such a change entirely. Detailed explanation thereof will be given hereafter using FIG. 4. FIG. 4 is a view showing the vibration model for calculating the mass position. Note that in FIG. 4, the vehicle is not shown.

As shown in FIG. 4, viscosity damper model with 1 degree of freedom (1-DOF) fixed to the vehicle is used as the vibration model for calculating the mass position. This model is formed on the assumption that the head of the passenger seated in the passenger compartment is set as the mass point, and a neck of the passenger is set as the spring and the damper.

The differential equation of the mass point is expressed by the following Equation (1).

$$m \cdot \frac{d^2 x}{dt^2} + c \cdot \frac{dx}{dt} + k \cdot x = f(t) \quad (1)$$

Values of the mass amount m, spring constant k, and damping constant C are determined as follows. Namely, in order to obtain the movement of the head so as to be close to an actual movement, values of m and k are set so that the value of the specific frequency is set in a range of 0.2 to 0.5 Hz. For example, the value of k is set in a range of 10 to 50 when m=5.

Further, the value of C is set so that the value of the damping ratio zeta is set in a range of 0.2 to 0.5, while assuming an actual movement of the head. For example, the value of C is set in a range of 6 to 13, when m=5, and k=35.

Here m=5, k=35, and C=8.

Further, f(t) is expressed by the following Equation.

$f(t)$=(mass amount $m$)×(acceleration in the back and forth direction of the vehicle, with high frequency noise component removed)

Sequential computation using the differential equation is carried out as the calculation method of the numerical values of the differential equation of Equation (1).

The single differential value and the secondary differential value of the mass position x with respect to time t are respectively expressed by the following Equations (2) and (3).

$$\frac{dx}{dt} = \frac{x(t + \Delta t) - x(t)}{\Delta t} \quad (2)$$

$$\frac{d^2 x}{dt^2} = \left\{ \frac{x(t + \Delta t) - x(t)}{\Delta t} - \frac{x(t) - x(t - \Delta t)}{\Delta t} \right\} / \Delta t \quad (3)$$

Equations (2) and (3) are substituted into Equation (1) to be developed, and expressed by the following Equation (4).

$$x(t + \Delta t) = \quad (4)$$
$$\left\{ \left( 2 + \frac{c}{m} \cdot \Delta t - \frac{k}{m} \cdot \Delta t^2 \right) \cdot x(t) - x(t - \Delta t) + \frac{f(t)}{m} \cdot \Delta t^2 \right\} \Big/ \left( 1 + \frac{c}{m} \cdot \Delta t \right)$$

Using this Equation (4), mass position x (t+Dt) at time t+Dt is sequentially calculated from mass position x(t) at time t and mass position x (t−Dt) at time t−Dt. The mass position x corresponds to the acceleration in the back and forth direction of the vehicle, which acts on an assumed passenger's body (this is because mass position x and the acceleration in the back and forth direction of the vehicle is set in a proportionality relation).

As described above, the mass position is calculated from the acceleration in the back and forth direction of the vehicle.

Next, a mass speed is calculated as the jerk in the back and forth direction of the vehicle, by differentiating the calculated mass position with respect to time. Namely, the mass speed corresponds to the jerk in the back and forth direction of the vehicle.

Figure 5:
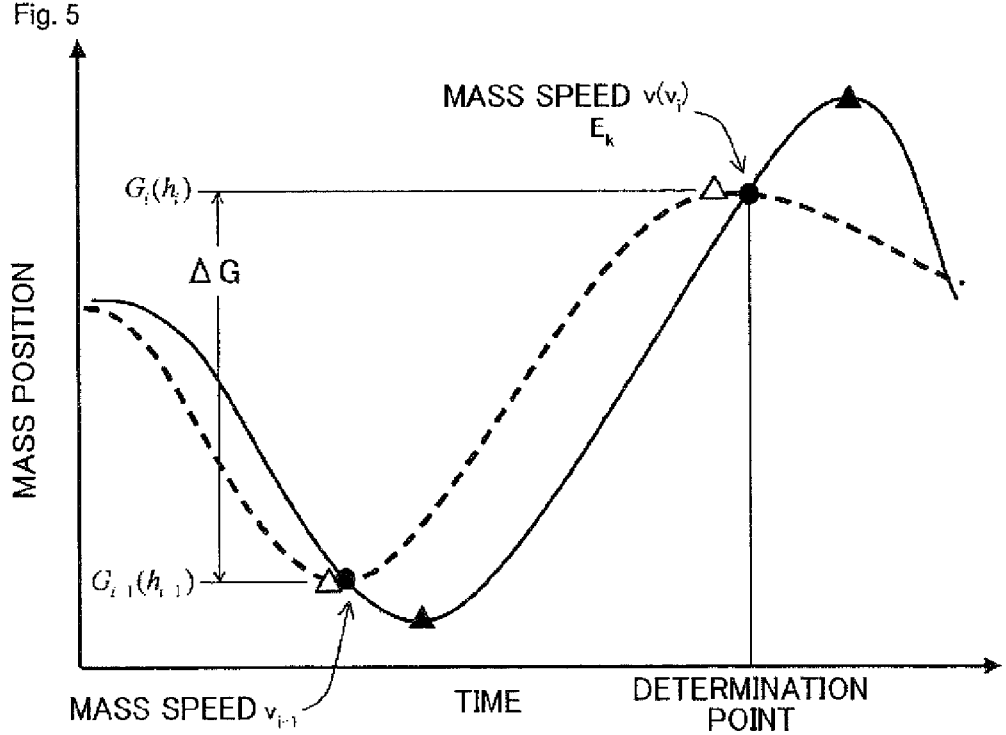
FIG. 5 is a graph showing a relation between time and a mass position.

Next, the change amount of the acceleration in the back and forth direction and the kinetic energy added to the mass point at the end point of the change, are calculated for every change. Detailed explanation thereof will be given hereafter, using FIG. 4 and FIG. 5. FIG. 5 is a graph showing a relation between time and mass position.

In FIG. 5, solid line shows a relation between time and mass position when power input is added to the mass point by the acceleration in the back and forth direction of the vehicle, with high frequency noise component removed (also called the kinetic position of the mass point, which is the position of the mass point including overshoot as shown by the solid line in FIG. 4), and broken line shows a relation between time and mass position (also called a static position, which is the position of the mass point after convergence not including overshoot as shown by broken line of FIG. 4), stabilized when power input is added statically to the mass point by the acceleration in the back and forth direction of the vehicle, with high frequency noise component removed.

Void triangles show a peak of the broken line respectively, and in this peak, the change of the acceleration of the vehicle is started (ended). Black triangles show a peak of the solid line respectively, and in this peak, the change of the mass position is started (ended). Black circles show an intersection point of the solid line and the broken line respectively, and in this intersection point, the input to the mass point becomes 0 (the acceleration of the mass position is increased (decreased)).

The change amount of the acceleration in the back and forth direction of the vehicle corresponds to the change amount of a position energy added to the mass point following the change of the acceleration in the back and forth direction of the vehicle (minimum necessary energy for the positional movement of the mass point following the change of the acceleration in the back and forth direction of the vehicle), which is, in FIG. 5, the change amount corresponding to a vertical length between the adjacent void triangles (DG in FIG. 4 and FIG. 5).

This change amount becomes larger, as the change amount of a position energy added to the mass point following the change of the acceleration in the back and forth direction becomes larger. Namely, a moving width of the head is determined by the change amount of the acceleration in the back and forth direction of the vehicle. When the change amount of the acceleration in the back and forth direction of the vehicle is expressed by DG, the acceleration in the back and forth direction of the vehicle at the end point of the change of the acceleration in the back and forth direction of the vehicle (corresponding to a determination point in FIG. 5) is expressed by G, (corresponding to a mass position $h_i$ at the end point of the change of the acceleration in the back and forth direction of the vehicle), and the acceleration in the back and forth direction of the vehicle at a start point of the change of the acceleration in the back and forth direction of the vehicle is expressed by $G_{i-1}$ (corresponding to the mass position $h_{i-1}$ at the start point of the change of the acceleration in the back and forth direction of the vehicle), then DG is expressed by the following Equation.

$DG = G_i - G_{i-1}$

Meanwhile, the kinetic energy added to the mass point at the end point of the change of the acceleration in the back and forth direction of the vehicle, is an excess energy generated by overshooting of the mass point during the change of the acceleration, which is the kinetic energy added to the mass point shown by the black circle at the upper right side of FIG. 5 (in FIG. 4, the kinetic energy added to the mass point which is positioned on the broken line). Such a kinetic energy becomes larger, as the jerk in the back and forth direction of the vehicle becomes larger. Namely, a moving speed of the head is determined by magnitude of the jerk in the back and forth direction of the vehicle. When the kinetic energy added to the mass point at the end point of the change of the acceleration in the back and forth direction of the vehicle is expressed by $E_k$, and the mass speed at the end point is expressed by v, $E_k$ is expressed by the following Equation.

$$E_k = (1/2)mv^2$$

Figure 6:
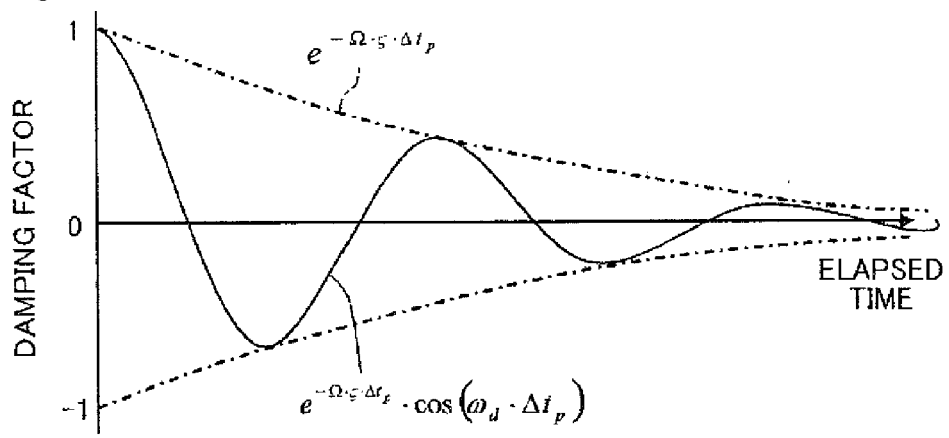
FIG. 6 is a graph showing a relation between elapsed time and damping factors.

$E_k$ is influenced by the kinetic energy added to the mass point at the end point of the previous change (the kinetic energy added to the mass point shown by black circle at the lower left side of FIG. 5), namely influenced by residual kinetic energy. Therefore, $E_k$ is preferably obtained by removing the influence of the kinetic energy added to the mass point at the end point of the previous change. Detailed explanation thereof will be given hereafter using FIG. 5 and FIG. 6. FIG. 6 is a graph showing a relation between elapsed time and damping factor.

$E_k$ of the acceleration in the back and forth direction of the vehicle after removing the kinetic energy added to the mass point at the end point of the previous change is expressed by the following Equation:

$$E_k = (1/2)m(v_i - v_{i-1}d')^2$$

wherein the mass speed at the end point of the current change is expressed by $v_i$, the mass speed at the end point of the previous change of the acceleration in the back and forth direction of the vehicle is expressed by $v_{i-1}$, and a natural damping factor from end point of the previous change of the acceleration in the back and forth direction of the vehicle, to the end point of the current change thereof is expressed by d'.

d' is expressed by the following Equation from logarithmic decrement:

$$\delta = e^{-\Omega \cdot \zeta \cdot \Delta t_F} \cdot \cos(\omega_d \cdot \Delta t_p)$$

wherein elapsed time from the end point of the previous change to the end point of the current change of the acceleration in the back and forth direction of the vehicle is expressed by $Dt_p$, angle specific frequency is expressed by W, damping angle specific frequency is expressed by $w_d$ (see FIG. 6).

W and $w_d$ are expressed by the following Equation respectively.

$$\Omega = \sqrt{\frac{k}{m}}$$

$$\omega_d = \sqrt{\frac{k}{m} - \left(\frac{c}{2 \cdot m}\right)^2}$$

Figure 7:
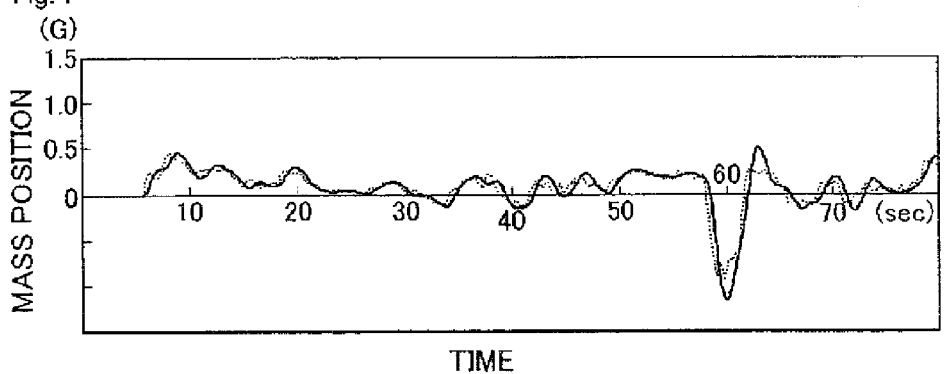
FIG. 7 is a graph showing an example of the relation between time and the mass position.

FIG. 7 is a graph showing an example of a relation between time and mass position. In FIG. 7, solid line shows a relation between time and mass position added with force f(t) inputted to the mass point by the acceleration in the back and forth direction of the vehicle, with high frequency noise component removed, and broken line shows a relation between time and stable mass position statically added with force f(t) inputted to the mass point by the acceleration in the back and forth direction of the vehicle.

As described above, the change amount of the acceleration in the back and forth direction and the kinetic energy added to the mass point at the end point of this change are calculated.

Next, an overshoot ratio of the mass point is calculated, which is the ratio of the kinetic energy added to the mass point at the end point of the current change, with respect to the change amount of the acceleration in the back and forth direction of the vehicle. The overshoot ratio is a determination index used for determining whether the driving operation state is the sleek driving state, or the shaking driving state, or the gentle driving state, in the back and forth direction of the vehicle. When the overshoot ratio of the mass point is expressed by OS, OS is expressed by the following Equation.

$$OS = E_k/DG$$

Note that when DG is a predetermined value or less, DG is not used as a calculation object of OS. Further, OS is not limited to $OS = E_k/DG$, and $OS = v/DG$, $OS = v/DE_p$ (the change amount of a position energy added to the mass point following the change of the acceleration in the back and forth direction of the vehicle) or $OS = E_k/DE_p$ are also acceptable. However, in order to precisely determine whether the driving operation state is the sleek driving state, or the shaking driving state, or the gentle driving state in the back and forth direction of the vehicle, $OS = E_k/DG$ is preferable, from actual driving feeling.

Figure 8:
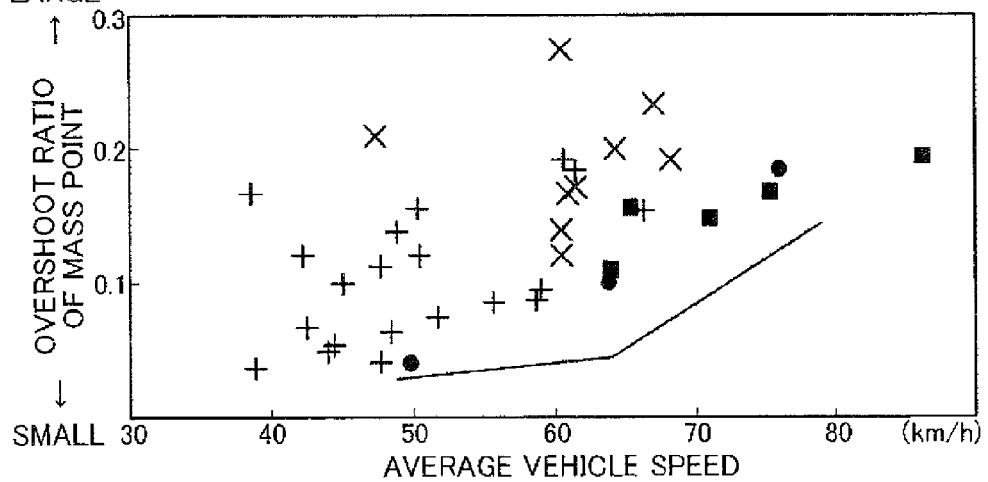
FIG. 8 is a graph showing an example of a relation between an average vehicle speed and an overshot rate of the mass point.

FIG. 8 is a graph showing an example of a relation between average vehicle speed and overshoot ratio of the mass point. In FIG. 8, black circles show driving results of a good driver, black squares show driving results of a driver equivalent to the good driver, + shows driving results of a general driver, and x shows driving results of a bad driver.

From FIG. 8, it is found that the overshoot ratio of the mass point tends to be higher as the average vehicle speed is increased, when compared in a case of the same driver, it is also found that the overshoot ratio of the mass point tends to be low as the skill of the driver is improved, when compared in a case of the same average vehicle speed. Broken line of FIG. 8 shows the driving result of the best driver, which is estimated from the above-described driving results of each kind of driver.

Thus, it is found that there is a correlation between good or bad of the driving operation of the vehicle, and the overshoot ratio of the mass point. Namely, the movement of the vehicle and the movement of the passenger's head are largely deviated from each other, when the driving operation is started suddenly. Then, the driving operation is poor as the deviation between the movement of the vehicle and the movement of the head becomes larger, and the driving operation is good as the deviation becomes smaller. Therefore, the overshoot ratio of the mass point (the aforementioned determination index) is fixed from the characteristic of the vehicle and the actual driving feeling, and from a fixed value thus obtained, the driving operation state is determined whether it is the sleek driving state, or the shaking driving state, or the gentle driving state, in the back and forth direction of the vehicle.

As described above, the overshoot ratio OS (fixed value) of the mass point is expressed by the following Equation (5).

$$OS = E_k/\Delta G \quad (5)$$

wherein as described above, $E_k$ is expressed by the following Equation (6).

$$E_k = 1/2 \cdot m \cdot v^2 \quad (6)$$

Equations (6) is substituted into Equation (5) to be developed with respect to v, and expressed by the following Equation.

$$v = \sqrt{\frac{2OS}{m}} \cdot \sqrt{\Delta G}$$
$$= K \cdot \sqrt{\Delta G} \ (K: \text{CONSTANT VALUE})$$

Figure 9:
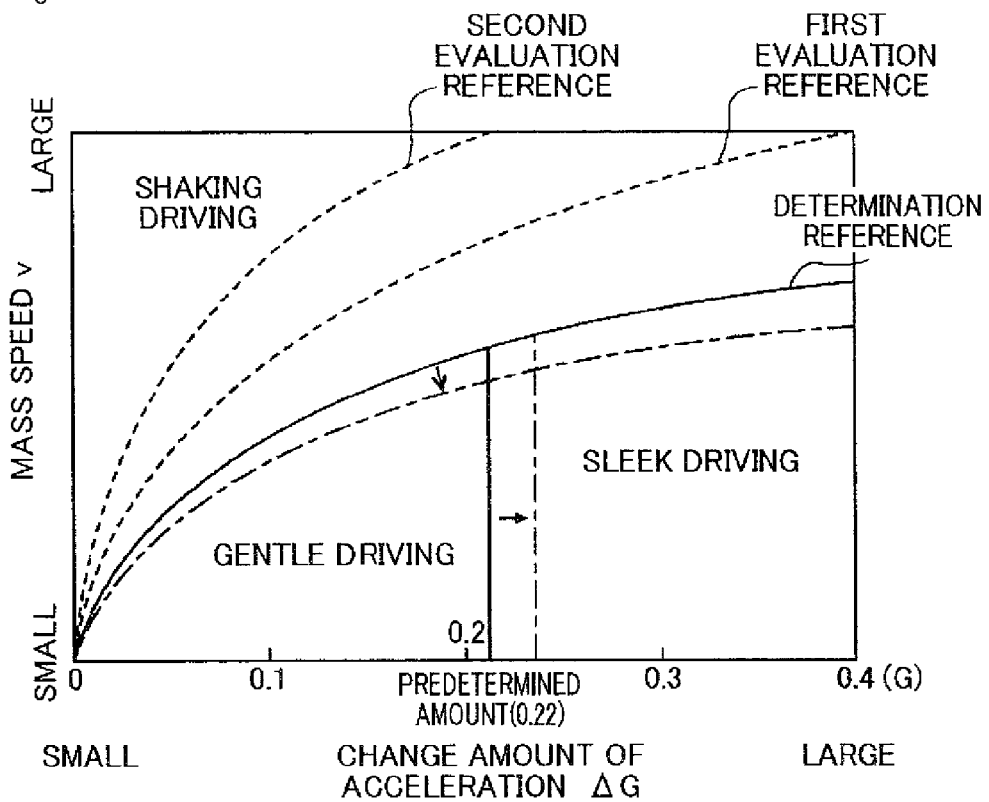
FIG. 9 is a view showing a first determination map.

The above equation shows the determination reference (determination threshold value) used for determining whether the driving operation state is the sleek driving state, the shaking driving state, or the gentle driving state in the back and forth direction of the vehicle (see FIG. 9).

As described above, the determination reference is obtained, which is used for determining accelerating or decelerating the vehicle in the back and forth direction of the vehicle.

—Calculation of the Determination Reference Used for Steering the Vehicle in the Right and Left Direction of the Vehicle—

Subsequently, explanation will be given for the calculation of the determination reference used for steering the vehicle in the right and left direction of the vehicle.

The determination reference used for steering the vehicle in the right and left direction of the vehicle includes the determination reference used for a steering state (turning steering state) of the vehicle and a return steering state of the vehicle. These determination references are different from each other. The explanation will be given hereafter for a calculation method of the determination reference used for steering the vehicle. Note that the other calculation method of the determination reference is substantially same as the calculation method of the determination reference used for steering the vehicle. Further, the return steering state is determined by the acceleration in the right and left direction of the vehicle calculated from the signals detected by the vehicle speed sensor 20 and the steering angle sensor 21.

First, the acceleration in the right and left direction of the vehicle (right and left direction of the vehicle G) is calculated from the signals detected by the vehicle speed sensor 20 and the steering sensor 21. The acceleration in the right and left direction of the vehicle is expressed by the following Equation.

(Acceleration in the right and left direction of the vehicle)=coefficient(steering angle of the vehicle)×(vehicle speed)$^2$ The coefficient depends on the vehicle speed. Since this formula (mathematical relation) is generally well-known, detailed explanation thereof is omitted.

The calculation step thereafter is substantially same as the calculation step of the determination reference used for accelerating and decelerating the vehicle in the back and forth direction of the vehicle. Namely, the aforementioned vibration model for removing the noise is used, and the mass position thereof is calculated as the acceleration in the right and left direction of the vehicle, with high frequency noise component removed.

Next, the vibration model for calculating the mass position is used, to calculate the mass position by inputting force f(t) to the mass point, which is caused by the acceleration in the right and left direction of the vehicle, with high frequency noise component removed. Next, the mass speed is calculated as the jerk in the right and left direction of the vehicle.

Next, the change amount of the acceleration in the right and left direction and the kinetic energy added to the mass point at the end point of this change, are calculated for every change. Next, the overshoot ratio of the mass point, which is the ratio of the kinetic energy added to the mass point at the end point of the change of the acceleration in the right and left direction of the vehicle, with respect to the change amount of the acceleration in the right and left direction, is calculated as the determination index used for determining the driving operation state whether it is the sleek driving state, or the shaking driving state, or the gentle driving state. Next, the determination reference used for determining the driving operation state in the right and left direction of the vehicle, whether it is the sleek driving state, the shaking driving state, or the gentle driving state, is calculated.

As described above, the determination reference used for steering the vehicle in the right and left direction of the vehicle, is obtained.

<Determination/Evaluation of the Sleek Driving State, the Shaking Driving State, and the Gentle Driving State>

Determination/evaluation of the sleek driving state, the shaking driving state, and the gentle driving state, is performed as described below. Note that this evaluation includes "real time evaluation" and "comprehensive evaluation".

—Determination/Evaluation of the Sleek Driving State, the Shaking Driving State, and the Gentle Driving State in the Back and Forth Direction of the Vehicle—

First, explanation will be given for the determination/evaluation of the sleek driving state, the shaking driving state, and the gentle driving state in the back and forth direction of the vehicle.

Figure 10:
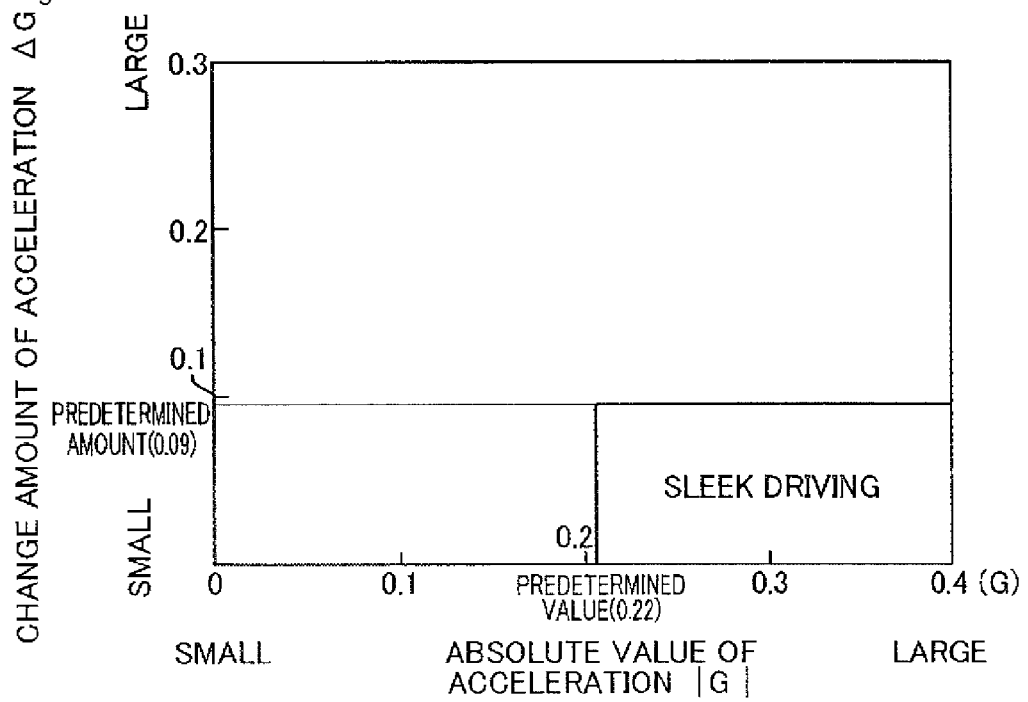
FIG. 10 is a view showing a second determination map.

First, first and second determination maps will be described. FIG. 9 is a view showing a first determination map, and FIG. 10 is a view showing a second determination map.

The first and second determination maps are stored in the memory in advance. For example, the first and second determination maps used for accelerating the vehicle by accelerator-on, the first and second determination maps used for accelerating the vehicle by brake-off, the first and second determination maps used for decelerating the vehicle by accelerator-off, and the first and second maps used for decelerating the vehicle by accelerator-off, can be given as the first and second determination maps. These first and second determination maps are different from each other.

The first determination map is used when the change amount of the acceleration is relatively large at the time of departure or stop, acceleration, and deceleration of the vehicle (when the acceleration is changed). Mass speed v corresponding to the jerk in the back and forth direction of the vehicle is taken on the vertical axis, and change amount DG of the acceleration in the back and forth direction of the vehicle is taken on the horizontal axis in the first determination map.

Then, a lower side range from the determination reference (an area below the determination reference) shows the range of the sleek driving state and the gentle driving state, and an upper side range from the determination reference (an area beyond the determination reference) shows the range of the shaking driving state. In the lower side range from the determination reference, a range in which the change amount of the acceleration in the back and forth direction of the vehicle is a predetermined amount or more, is the range of the sleek driving state, and a range in which the change amount is smaller than the predetermined amount, shows the range of the gentle driving state.

The sleek driving state in the first determination map is the driving state comfortable for the driver by shaking a passenger's body with moderate force and speed, under the driving operation at a moderate speed. The shaking driving state is a low-fuel efficient, unstable (rough) driving state uncomfortable for the passenger excluding the driver, by largely shaking the passenger's body with a jerk, under sudden driving operation. The gentle driving state is a high-fuel efficient, stable driving state comfortable for the passenger excluding the driver, by slowly and slightly shaking the passenger's body, under slow driving operation.

Meanwhile, the second determination map is the map used when the change amount of the acceleration is relatively small at the time of accelerating or decelerating the vehicle (when the acceleration is approximately constant). Change amount DG of the acceleration in the back and forth direction of the vehicle is taken on the vertical axis, and absolute value |G| of the acceleration in the back and forth direction of the vehicle is taken on the horizontal axis in the second determination map. Note that the first determination map is used when the change amount of the acceleration in the back and forth direction of the vehicle is moved to a relatively large state from a relatively small state.

A range in which the change amount of the acceleration in the back and forth direction of the vehicle is a predetermined amount or less and the absolute value of the acceleration in the back and forth direction of the vehicle is a predetermined value or more, shows the range of the sleek driving state.

The sleek driving state in the second determination map is a refreshing driving state in which an optimal driving operation is carried out with a single operation, and this operation state is maintained to thereby maintain passenger's body in a fixed state.

Explanation has been given for the first and second determination maps heretofore.

Next, explanation will be given for the determination/evaluation of the driving state such as the sleek driving state, shaking driving state, and gentle driving state in the back and forth direction of the vehicle, using the first and second determination maps.

First, the acceleration in the back and forth direction of the vehicle is calculated by differentiating the signal detected by the vehicle speed sensor 20 corresponding to the vehicle speed, with respect to time.

Next, the position of the mass point in the passenger compartment is calculated as the acceleration in the back and forth direction of the vehicle, with high frequency noise component removed. Detailed explanation thereof will be explained hereafter using FIG. 2.

As shown in FIG. 2, viscosity damper model with 1 degree of freedom (1-DOF) fixed to the vehicle is used as the vibration model for removing the noise.

The differential equation of the mass point is expressed by the following Equation (1):

$$m \cdot \frac{d^2 x}{dt^2} + c \cdot \frac{dx}{dt} + k \cdot x = f(t) \tag{1}$$

wherein mass amount is expressed by m, spring constant is expressed by k, damping constant is expressed by C, mass position is expressed by x, time is expressed by t, and input to the mass point is expressed by f(t).

Values of m, k, and C are determined as follows. Namely, in order to remove the noise component of 0.5 Hz or more maximally without phase deviation, values of m and k are set so that the value of the specific frequency is in a range of 0.5 to 1 Hz. For example, the value of k is set in a range of 50 to 200, when m=5.

Further, in order to obtain the driving state close to an actual state while continuous traveling is being carried out, the value of C is set so that the value of the damping ratio is set in a range of 0.5 to 1.0. When the damping ratio is expressed by zeta, zeta is expressed by the following Equation.

$$\varsigma = \frac{c}{2\sqrt{m \cdot k}}$$

For example, when m=5, and k=80, the value of C is set in a range of 20 to 40, wherein, for example, the values of m, k, and C are set to m=5, k=80, and C=25.

Further, f(t) is expressed by the following Equation.

$f(t)$=(mass amount $m$)×(acceleration in the back and forth direction of the vehicle)

As a numerical value calculation method of the differential equation expressed by Equation (1), sequential computation using a differential equation is carried out.

A single differential value and a secondary differential value of the mass position x with respect to time t are expressed by the following Equations (2) and (3).

$$\frac{dx}{dt} = \frac{x(t + \Delta t) - x(t)}{\Delta t} \tag{2}$$

$$\frac{d^2 x}{dt^2} = \left\{ \frac{x(t + \Delta t) - x(t)}{\Delta t} - \frac{x(t) - x(t - \Delta t)}{\Delta t} \right\} \Big/ \Delta t \tag{3}$$

Equations (2) and (3) are substituted into Equation (1) to be developed, and expressed by the following Equation (4).

$$x(t + \Delta t) = \left\{ \left( 2 + \frac{c}{m} \cdot \Delta t - \frac{k}{m} \cdot \Delta t^2 \right) \cdot x(t) - x(t - \Delta t) + \frac{f(t)}{m} \cdot \Delta t^2 \right\} \Big/ \left( 1 + \frac{c}{m} \cdot \Delta t \right) \tag{4}$$

Using this Equation (4), mass position x (t+Dt) at time t+Dt is sequentially calculated from mass position x(t) at time t and mass position x (t−Dt) at time t−Dt. As described above, the mass position x corresponds to the acceleration in the back and forth direction of the vehicle, with high frequency noise component removed.

Next, using the vibration model, the position of the mass point, being the head of the passenger seated in the passenger compartment, is calculated by inputting the force f(t) into the mass point, with high frequency noise component removed, wherein the force f(t) is caused by the acceleration in the back and forth direction of the vehicle. Namely, the movement of the head is assumed by the vibration model and the mass position in this case is calculated, wherein the movement of the head is caused by the change of the acceleration in the back and forth direction of the vehicle. Detailed explanation thereof will be explained using FIG. 4.

As shown in FIG. 4, viscosity damper model with 1 degree of freedom (1-DOF) fixed to the vehicle is used as the vibration model for calculating the mass position. This model is formed on the assumption that the head of the passenger seated in the passenger compartment is set as the mass point, and a neck of the passenger is set as the spring and the damper.

The differential equation of the mass point is expressed by the following Equation (1).

$$m \cdot \frac{d^2 x}{dt^2} + c \cdot \frac{dx}{dt} + k \cdot x = f(t) \tag{1}$$

Values of the mass amount m, spring constant k, and damping constant C are decided as follows. Namely, in order to obtain the movement of the head so as to close to an actual movement, values of m and k are set so that the value of the specific frequency is set in a range of 0.2 to 0.5 Hz. For example, the value of k is set in a range of 10 to 50 when m=5.

Further, the value of C is set so that the value of the damping ratio zeta is set in a range of 0.2 to 0.5, while assuming an actual movement of the head. For example, the value of C is set in a range of 6 to 13, when m=5, and k=35.

Here m=5, k=35, and C=8.

Further, f(t) is expressed by the following Equation.

$f(t)$=(mass amount $m$)×(acceleration in the back and forth direction of the vehicle, with high frequency noise component removed)

Sequential computation using the differential equation is carried out as the calculation method of the numerical values of the differential equation of Equation (1).

The single differential value and the secondary differential value of the mass position x with respect to time t are respectively expressed by the following Equations (2) and (3).

$$\frac{dx}{dt} = \frac{x(t+\Delta t) - x(t)}{\Delta t} \quad (2)$$

$$\frac{d^2 x}{dt^2} = \left\{ \frac{x(t+\Delta t) - x(t)}{\Delta t} - \frac{x(t) - x(t-\Delta t)}{\Delta t} \right\} / \Delta t \quad (3)$$

Equations (2) and (3) are substituted into Equation (1) to be developed, and expressed by the following Equation (4).

$$x(t+\Delta t) = \quad (4)$$
$$\left\{ \left( 2 + \frac{c}{m} \cdot \Delta t - \frac{k}{m} \cdot \Delta t^2 \right) \cdot x(t) - x(t-\Delta t) + \frac{f(t)}{m} \cdot \Delta t^2 \right\} / \left( 1 + \frac{c}{m} \cdot \Delta t \right)$$

Using this Equation (4), mass position x (t+Dt) at time t+Dt is sequentially calculated from mass position x(t) at time t and mass position x (t−Dt) at time t−Dt.

Next, the mass speed is calculated as the jerk in the back and forth direction of the vehicle, by differentiating the calculated mass position with respect to time.

Next, change amount DG (first correlation value) of the acceleration in the back and forth direction of the vehicle, mass speed v at the end point of this change (second correlation value), and absolute value |G| (third correlation value) of the acceleration in the back and forth direction of the vehicle at the end point of this change, are calculated for every change (see FIG. 5).

Next, the driving operation state in the back and forth direction of the vehicle is determined whether it is the sleek driving state, the shaking driving state, or the gentle driving state, from data of DG, v, and |G|, using the first and second determination maps. Specifically, when DG is a predetermined value or more (when the acceleration is changed), the first determination map is used to determine the driving operation state as the sleek driving state when (DG, v) is in a range of the sleek driving state, and as the gentle driving state when (DG, v) is in a range of the gentle driving state, and as the shaking driving state when (DG, v) is in a range of the shaking driving state. Namely, when DG is relatively large and v is relatively small, the driving operation state is determined as the sleek driving state or the gentle driving state. Meanwhile, when DG is relatively small and v is relatively large, the driving operation state is determined as the shaking driving state.

Meanwhile, when DG is smaller than a predetermined amount (when the acceleration is approximately constant), the second determination map is used to determine the driving operation state as the sleek driving state when (|G|, DG) is in a range of the sleek driving state.

Further, when it is determined from the signal detected by the vehicle speed sensor 20, that the acceleration in the back and forth direction of the vehicle is changed, and when it is determined from the signals detected by the accelerator opening sensor 22 and the brake liquid pressure sensor 23, that an accelerator operation or a brake operation is carried out by a predetermined operation amount (the accelerator operation and the brake operation are not substantially carried out), the driving operation state is not determined whether it is the sleek driving state, or the shaking driving state, or the gentle driving state in the back and forth direction of the vehicle, on the assumption that the change of the acceleration is caused by an operation other than the driving operation in the back and forth direction of the vehicle (for example, caused by traveling of the vehicle on a bad road, such as a puddle or a bump).

Further, when it is determined from the signals detected by the accelerator opening sensor 22 and the brake liquid pressure sensor 23, that the accelerator operation or the brake operation is carried out, by a certain operation amount or higher, with a certain frequency or higher, the driving operation state is determined as the shaking driving state (unpreferable driving operation state), irrespective of magnitudes of DG, v, and |G|.

Namely, when the accelerator operation or the brake operation is repeatedly carried out in a short period of time (when it is carried out at a predetermined cycle or less), the following situation occurs. Namely, the acceleration is not changed in the back and forth direction of the vehicle, or the vibration model fails in following the frequency of the acceleration of the vehicle changed by the driving operation (such as brake operation) in the back and forth direction of the vehicle, even if the driving operation in the back and forth direction of the vehicle (such as accelerator operation) is carried out. Thus, although the driving operation state in the back and forth direction of the vehicle cannot be determined using the first and second determination maps, the accelerator operation or the brake operation are set in an unpreferable driving operation state. Therefore, the driving state is determined as the shaking driving state. Detailed explanation for this determination will be described hereafter.

Figure 11:
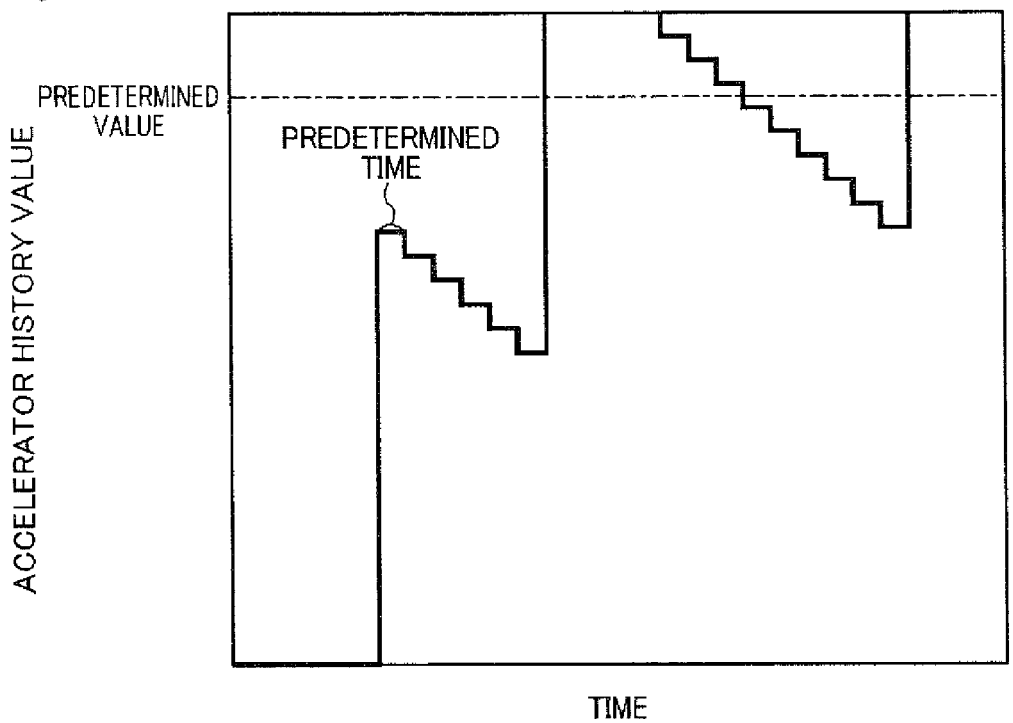
FIG. 11 is an operation history model showing an example of a relation between time and an accelerator operation history value.

FIG. 11 is a view of an operation history model showing an example of a relation between time and an accelerator operation history value as will be described later. In FIG. 11, one dot chain line shows a predetermined value (a threshold value) as will be described later. When the accelerator operation is carried out once by a certain operation amount or higher, the accelerator operation history value is increased by a value smaller than the predetermined value (for example, 20). The accelerator operation history value is decreased one by one, for every predetermined time. Then, the accelerator operation is carried out by a certain operation amount or higher, with a certain frequency or higher, and when the accelerator operation history value reaches a predetermined value or more, the driving operation state is determined as the shaking driving state. Note that a method for determining whether the brake operation is carried out by a certain operation amount or higher, with a certain frequency or higher, is substantially same as the method for determining whether the accelerator operation is carried out by a certain operation amount or higher, with a certain frequency or higher.

Further, when the driving operation state is determined as the shaking driving state in the back and forth direction of the vehicle, the degree of the shaking driving state is evaluated. Detailed explanation for this evaluation will be described hereafter.

In the range of the shaking driving state in the first determination map, first and second evaluation references (evaluation threshold values) are previously set in an upper side of the determination reference, and in FIG. 9, the first and second evaluation references are shown by broken lines. The second evaluation reference is positioned on the upper side of the first evaluation reference. Then, the driving operation state is determined as described below, using the first determination map. Namely, when (DG, v) is positioned in a lower side range from the first evaluation reference in the range of the shaking driving state of the first determination map, this state is evaluated as NG1 with score of 1-point deduction, and when (DG, v) is positioned in a range from the first evaluation reference to the second evaluation reference, this state is evaluated as NG2 with score of 2-points deduction, and when (DG, v) is positioned in an upper side range from the second evaluation reference, this state is evaluated as NG3 with score of 3-points deduction. Namely, the larger the deduction is, the more sudden the driving operation is carried out in the back and forth direction of the vehicle.

The aforementioned evaluation points are real time evaluation points of the shaking driving state in the back and forth direction of the vehicle. A signal including information regarding the real time evaluation points, is transmitted to a meter-side controller 3 as will be described later.

Note that, in the explanation given hereafter, only the evaluation point of the degree of the shaking driving state is displayed in real time. However, the evaluation point of the aforementioned rattling driving degree or the evaluation point of the sluggish driving degree may also be displayed in real time.

Further, an evaluation index of a "degree of a sudden driving operation" in the back and forth direction of the vehicle in the current drive of the vehicle is also calculated. Detailed explanation thereof will be described hereafter.

Using the first determination map, when the driving operation state is determined as the sleek driving state, the score is 1-point addition, and when it is determined as the shaking driving state, the score is 1-point, 2-points, or 3-points deduction (see the score of deduction in a case of the shaking driving state), and when it is determined as the gentle driving state, the score is 0-point addition/deduction. Meanwhile, using the second determination map, when the driving operation state is determined as the sleek driving state, the score is 0.3-point addition.

Then, in the current drive of the vehicle, the evaluation index of the degree of the sudden driving operation in the back and forth direction of the vehicle is expressed by the following formula (mathematical relation), from the number of times of determinations (the number of times of evaluations) whether the current driving operation state is the sleek driving state, the shaking driving state, or the gentle driving state in the back and forth direction of the vehicle, and from the sum (total) of the aforementioned scores of deduction and the sum (total) of the aforementioned scores of addition regarding the current drive of the vehicle.

Evaluation index=(total of deductions−total of additions)/number of times of determinations Next, the evaluation point of the degree of the sudden driving operation in the back and forth direction of the vehicle is calculated from the evaluation index based on a correlation, with 5-points as a perfect score. Detailed explanation thereof will be given hereafter.

Figure 12:
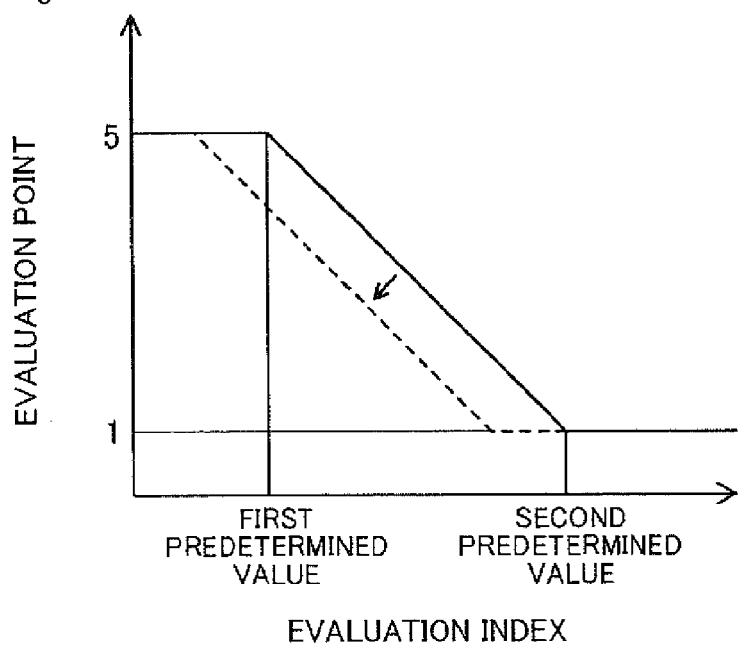
FIG. 12 is a graph showing an example of a relation between an evaluation index and an evaluation point.

FIG. 12 is a graph showing an example of a relation between evaluation index and evaluation point. As shown by the solid line in FIG. 12, the evaluation point of the sudden driving operation degree in the back and forth direction of the vehicle is calculated by scoring 5-points when the evaluation index is a first predetermined value or less, and 1-point when the evaluation index is a second predetermined value or more which is larger than the first predetermined value, and by linearly interpolating between them.

As described above, the determination/evaluation of the sleek driving state, the shaking driving state, and the gentle driving state, is carried out in the back and forth direction of the vehicle.

—Determination/Evaluation of the Sleek Driving State, the Shaking Driving State, and the Gentle Driving State in the Right and Left Direction of the Vehicle—

Subsequently, the determination/evaluation of the sleek driving state, the shaking driving state, and the gentle driving state in the right and left direction of the vehicle will be described.

First, the first and second determination maps will be described (see FIG. 9 and FIG. 10).

The first and second determination maps are previously stored in the memory. For example, the first and second determination maps used for steering the vehicle, and the first and second determination maps used for return steering, can be given as the first and second determination maps These first and second determination maps are different from each other.

The first determination map is the map used when the change amount of the acceleration is relatively large in a case of start and end of a turn of the vehicle (when the acceleration is changed). In the first determination map, mass speed v corresponding to the jerk in the right and left direction of the vehicle is taken on the vertical axis, and change amount DG of the acceleration in the right and left direction of the vehicle is taken on the horizontal axis.

Then, the lower side range from the determination reference shows the range of the sleek driving state and the gentle driving state, and the upper side range from the determination reference shows the range of the shaking driving state. In the lower side range from the determination reference, a range in which the change amount of the acceleration in the right and left direction of the vehicle is a predetermined amount or more, is the range of the sleek driving state, and a range in which the change amount is smaller than the predetermined amount, shows the range of the gentle driving state.

The second determination map is the map used when the change amount of the acceleration is relatively small when turning the vehicle (when the acceleration is approximately constant). Change amount DG of the acceleration in the right and left direction of the vehicle is taken on the vertical axis, and absolute value |G| of the acceleration in the right and left direction of the vehicle is taken on the horizontal axis in the second determination map. Note that the first determination map is used when the change amount of the acceleration in the right and left direction of the vehicle is moved to a relatively large state from a relatively small state.

A range in which the change amount of the acceleration in the right and left direction of the vehicle is a predetermined amount or less and the absolute value of the acceleration in the right and left direction of the vehicle is a predetermined value or more, shows the range of the sleek driving state.

Explanation has been given for the first and second determination maps heretofore.

Next, explanation will be given for the determination/evaluation of the driving state such as the sleek driving state, the shaking driving state, and the gentle driving state in the right and left direction of the vehicle, using the first and second determination maps.

First, the acceleration in the right and left direction of the vehicle is calculated from the signals detected by the vehicle speed sensor 20 and the steering angle sensor 21.

The determination step thereafter is substantially the same as the determination step of the determining whether the driving operation state is the sleek driving state, or the shaking driving state, or the gentle driving state in the back and forth direction of the vehicle. Namely, the aforementioned vibration model for removing the noise is used, and the mass position thereof is calculated as the acceleration in the right and left direction of the vehicle, with high frequency noise component removed.

Next, the vibration model for calculating the mass position is used, to calculate the mass position by inputting force f(t) to the mass point which is caused by the acceleration in the right and left direction of the vehicle, with high frequency noise component removed. Next, the mass speed is calculated as the jerk in the right and left direction of the vehicle.

Next, change amount DG of the acceleration in the right and left direction of the vehicle, mass speed v at the end point of this change, and absolute value |G| of the acceleration in the right and left direction of the vehicle at the end point of this change, are calculated. Next, using the first and second determination maps, whether the driving operation state is the sleek driving state, or the shaking driving state, or the gentle driving state, is determined from data of DG, v, and |G|.

Further, from the signal detected by the steering angle sensor 21, when it is determined that the steering operation is carried out by a certain operation amount or higher, with a certain frequency or higher, the driving operation state is determined as the shaking driving state (unpreferable driving operation state), irrespective of magnitudes of DG, v, and |G|.

Namely, when the steering operation is repeatedly carried out in a short period of time, the vibration model fails in following the frequency of the acceleration of the vehicle changed by the steering operation, and the driving operation state in the right and left direction of the vehicle cannot be determined using the first and second determination maps. However, such a steering operation is in an unpreferable driving operation state, and is determined as the shaking driving state. Note that this determination method is substantially the same as the determination method of determining whether the accelerator operation is carried out by a certain operation amount or higher, with a certain frequency or higher.

Further, when the driving operation state is determined as the shaking driving state in the right and left direction of the vehicle, such a shaking driving state is evaluated. The evaluation method thereof is substantially the same as the evaluation method of the shaking driving state in the back and forth direction of the vehicle.

Namely, when DG exhibits a predetermined value or higher (when the amount of acceleration is changed) and when (DG, v) is positioned in a lower side range from the first evaluation reference in the range of the shaking driving state of the first determination map, this state is evaluated as NG1 with score of 1-point deduction, and when (DG, v) is positioned in a range from the first evaluation reference to the second evaluation reference, this state is evaluated as NG2 with score of 2-points deduction, and when (DG, v) is positioned in an upper side range from the second evaluation reference, this state is evaluated as NG3 with score of 3-points deduction. This evaluation point is a real time evaluation point of the shaking driving operation state in the right and left direction of the vehicle. A signal including the information regarding the real time evaluation point, is transmitted to a meter-side controller 3.

Further, the evaluation index of the sudden driving operation degree in the right and left direction of the vehicle in the current driving of the vehicle, is calculated. Detailed explanation thereof will be described hereafter.

Namely, using the first determination map, when the driving operation state is determined as the sleek driving state, the score is 1-point addition, and when it is determined as the shaking driving state, the score is 1-point, 2-points, or 3-points deduction (see the score of deduction in a case of the shaking driving state), and when it is determined as the gentle driving state, the score is 0-point addition/deduction. Meanwhile, using the second determination map, when the driving operation state is determined as the sleek driving state, the score is 0.3-point addition.

Then, in the current drive of the vehicle, the evaluation index of the sudden driving operation degree in the back and forth direction of the vehicle is expressed by the following formula (mathematical relation), from the number of times of determinations whether the current driving operation state is the sleek driving state, the shaking driving state, or the gentle driving state in the right and left direction of the vehicle, and from the total of the aforementioned scores of deductions, and the total of the aforementioned scores of additions regarding the current drive of the vehicle.

$$\text{Evaluation index}=(\text{total of deductions}-\text{total of additions})/\text{number of times of determinations}$$

Next, the evaluation point of the sudden driving operation degree in the right and left direction of the vehicle is calculated from the evaluation index based on a correlation, with 5-points as a perfect score, similarly to the calculation method of the evaluation point of the sudden driving operation degree in the back and forth direction of the vehicle.

As described above, the determination/evaluation of the sleek driving state, the shaking driving state, and the gentle driving state, is carried out in the right and left direction of the vehicle.

<<Rattling Driving Degree>>

As described below, a rattling driving degree is obtained by calculating a generation frequency of peak of the mass speed corresponding to the jerk in the back and forth direction, and in the right and left direction of the vehicle.

<Rattling Driving Degree in the Back and Forth Direction of the Vehicle>

First, the rattling driving degree in the back and forth direction of the vehicle, will be described.

—Calculation of the Generation Frequency of the Peak of the Mass Speed Corresponding to the Jerk in the Back and Forth Direction of the Vehicle—

First, calculation of the generation frequency of the peak of the mass speed corresponding to the jerk in the back and forth direction of the vehicle, will be described.

First, the acceleration of the mass point is calculated by differentiating the mass speed corresponding to the jerk in the back and forth direction of the vehicle calculated in the calculation of the ratio of the kinetic energy of the mass point at the end point of the change, with respect to the change amount of the acceleration in the back and forth direction of the vehicle (where the mass speed is calculated using the vibration model for calculating the position of the mass point, on the assumption that the passenger's head is moved by the change of the acceleration in the back and forth direction of the vehicle).

Next, a peak value of the mass speed is calculated (obtained) at a point when the calculated mass acceleration is 0. This peak value receives an influence of the previous peak value of the mass speed. Therefore, the peak value, with the influence of the previous peak value removed, is preferable. A value obtained by removing the influence of the previous peak value of the mass speed is expressed by $V_{pr(i)}$, and $V_{pr(i)}$ is expressed by the following Equation:

$$V_{pr(i)} = V_{p(i)} - V_{p(i-1)} d'$$

wherein the current peak value of the mass speed is expressed by $V_{p(i)}$, and the previous peak value of the mass speed is expressed by $V_{p(i-1)}$, and the natural damping factor from the previous peak to the current peak of the mass speed is expressed by d'.

d' is expressed by the following Equation (see FIG. 6):

$$\delta' = e^{-\Omega \cdot \varsigma \cdot \Delta t_F} \cdot \cos(\omega_d \cdot \Delta t_p)$$

wherein elapsed time from the previous peak to the current peak of the mass speed is expressed by $Dt_p$, the angle specific frequency is expressed by W, and the damping angle specific frequency is expressed by $w_d$.

W and $w_d$ are expressed by the following Equation respectively.

$$\Omega = \sqrt{\frac{k}{m}}$$

$$\omega_d = \sqrt{\frac{k}{m} - \left(\frac{c}{2 \cdot m}\right)^2}$$

Note that when the absolute value of the peak value of the mass speed is a predetermined value (threshold value) or less, this peak is not regarded as the peak.

As described above, the peak value of the mass speed is calculated.

Figure 13:
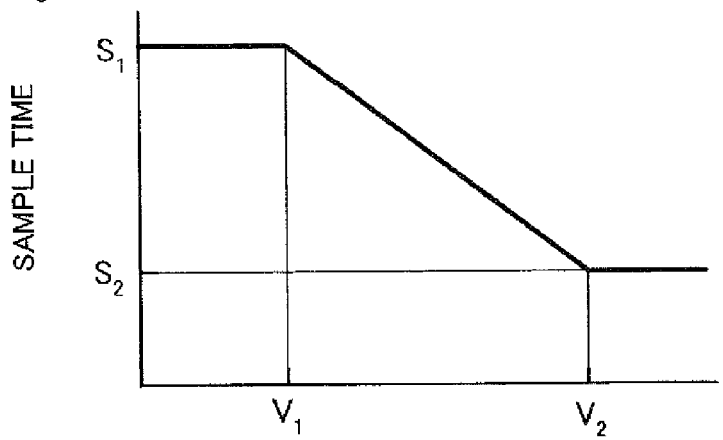
FIG. 13 is a graph showing a relation between an average vehicle speed in nearest 2 seconds and a sample time.

Next, the number of times of the generation of the calculated peak of the mass speed is counted (calculated) per sample time. The number of times of the generation of the peak is regarded as the evaluation index of the rattling driving degree (also called a smooth driving degree) in the back and forth direction of the vehicle. The rattling driving degree shows the degree of the rattling driving with high frequency of the driving operation, in other words, with high frequency of the movement of the head. The peak is generated twice at start and end points of the driving operation when the operation is carried out once. Sample time is decided by an average vehicle speed in nearest two seconds. Specifically, as shown in FIG. 13, the sample time is expressed by $S_1$ second when the average vehicle speed is $V_1$ km/h or less in the nearest two seconds, and the sample time is expressed by $S_2$ second which is shorter than $S_1$ sec when the average vehicle speed is $V_2$ km/h or more.

When the average vehicle speed in the nearest two seconds is $V_1$ to $V_2$ km/h, the sample time becomes smaller in direct proportion to the average vehicle speed. Further, the sample time is moved and updated every predetermined time (for example, 0.1 sec), with elapse of the time. Namely, a count value of the number of times of generation of the peak of the mass speed per sample time is updated every predetermined time.

Note that when the count value of the number of times of generation of the peak of the mass speed per sample time is 0, namely, when no driving operation is carried out in the back and forth direction of the vehicle, such a count value is not an evaluation target of the rattling driving degree, and this count is not included in the number of times of count.

Figure 14:
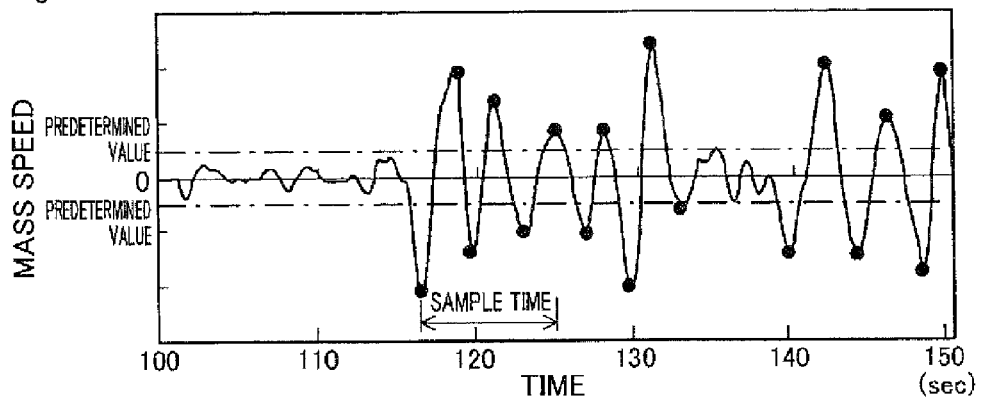
FIG. 14 is a graph showing an example of the relation between time and the mass speed.

FIG. 14 is a graph showing an example of the relation between time and mass speed. In FIG. 14, black circles show the peak of the mass speed, and one dot chain line shows the aforementioned predetermined value.

As described above, the generation frequency of the peak of the mass speed corresponding to the jerk in the back and forth direction of the vehicle is calculated.

—Determination/Evaluation of the Rattling Driving Degree in the Back and Forth Direction of the Vehicle—

Next, determination/evaluation of the rattling driving degree in the back and forth direction of the vehicle will be described.

Figure 15:
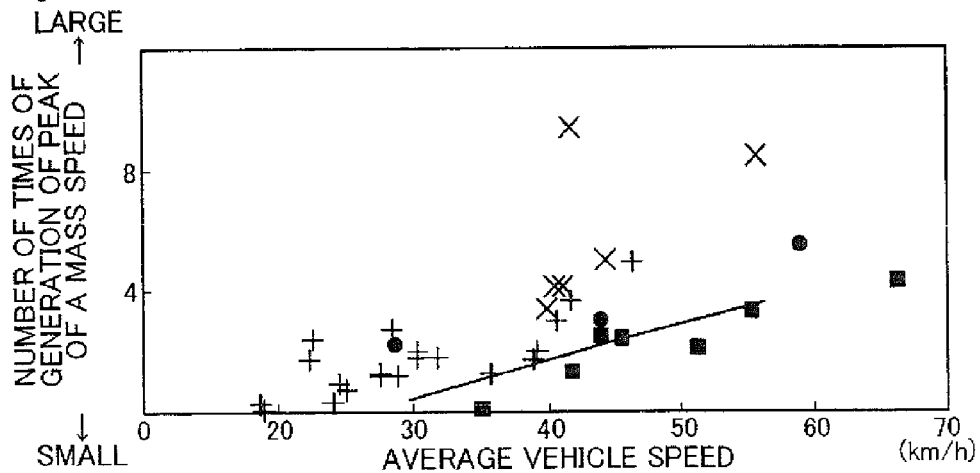
FIG. 15 is a graph showing an example of a relation between the average vehicle speed and number of times of generation of a peak of the mass speed per sample time.

FIG. 15 is a graph showing an example of a relation between the average vehicle speed and the number of times of generation of the peak of the mass speed per sample time. In FIG. 15, black circles show driving results of a good driver, black squares show driving results of a driver equivalent to the good driver, + shows driving results of a general driver, and x shows driving results of a bad driver.

From FIG. 15, it is found that the number of times of generation of the peak of the mass speed per sample time tends to be higher as the average vehicle speed is increased, when compared in a case of the same driver, and it is also found that the number of times of generation of the peak of the mass speed per sample time tends to be low as the skill of the driver is improved, when compared in a case of the same average vehicle speed. Broken line of FIG. 15 shows the driving result of the best driver, which is estimated from the above-described driving results of each kind of driver.

Thus, it is found that there is a correlation between good or bad of the driving operation of the vehicle, and the number of times of generation of the peak of the mass speed per sample time. Namely, the frequency of the movement of the passenger's head becomes higher, as the driving operation is increased. Then, the driving operation is worse as the frequency of the movement of the head is increased, and the driving operation is better as the frequency thereof is decreased. Therefore, the rattling driving degree in the back and forth direction of the vehicle is determined/evaluated from the number of times of generation of the peak of the mass speed per sample time. Detailed explanation thereof will be described hereafter.

First, a magnitude correlation between the number of times of generation of the peak of the mass speed per sample time, and evaluation points of 2 to 5 (corresponding to first threshold value to fourth threshold value) is compared. Then, the rattling driving degree in the back and forth direction of the vehicle is determined from this comparison result. Specifically, when the number of times of generation of the peak of the mass speed per sample time is 2 or less, it is determined as OK with score of 0-point deduction, and evaluation point of 3 is determined as NG1 with score of 1-point deduction, and evaluation point of 4 is determined as NG2 with score of 2-points deduction, and evaluation point of 5 is determined as NG3 with score of 3-points deduction, and evaluation point of 5 or more is determined as NG4 with score of 4-points deduction. Namely, as described above, the peak is generated twice when the driving operation is carried out once. However, when the peak is generated three times or more, namely, when the driving operation is carried out twice or more, it is so determined that an improper (unnecessary) driving operation is carried out, and the score of such a driving operation is deducted.

Next, the rattling driving degree in the back and forth direction of the vehicle is evaluated by a method with 5-points as a perfect point. Specifically, evaluation is carried out in such a manner that 5-points are obtained when the deduction point is 0, 4-points are obtained when the deduction point is 1, 3-points are obtained when the deduction point is 2, 3-points are obtained when the deduction point is 2, and 4-points are obtained when the deduction point is 1. Namely, the evaluation point is the point obtained by deducting the score of the aforementioned deduction point from 5-points. Such an evaluation point is regarded as a real time evaluation point of the rattling driving degree.

Further, the evaluation index of the rattling driving degree in the back and forth direction of the vehicle in the current drive of the vehicle, is calculated. Specifically, the evaluation index is expressed by the following formula (mathematical relation), from the total (obtained by adding all sample times when the peak is generated) of the sample times (determination times) when the peak of the mass speed is generated in the back and forth direction of the vehicle in the current drive of the vehicle, and from the total of the aforementioned deduction points in the current drive of the vehicle.

Evaluation index=total of the deduction points/total of sample times when the peak of the mass speed is generated Next, the evaluation point of the rattling driving degree in the back and forth direction of the vehicle in the current drive of the vehicle, is calculated based on the correlation by the method with 5-points as a perfect point, similarly to the calculation method of the evaluation point of the sudden driving operation degree in the back and forth direction of the vehicle.

Note that as described above, the evaluation index of the rattling driving degree in the back and forth direction of the vehicle in the current drive of the vehicle, is obtained by dividing the total of the aforementioned deduction points in the current drive of the vehicle, by the total of the sample times when the peak of the mass speed is generated. However, the evaluation index may also be obtained by dividing the total of the deduction points by the number of times of counts (the number of times of determination) of the generation of the peak of the mass point per sample time in the current drive of the vehicle.

As described above, the rattling driving degree in the back and forth direction of the vehicle is determined and evaluated.

<Rattling Driving Degree in the Right and Left Direction of the Vehicle>

Subsequently, the rattling driving degree in the right and left direction of the vehicle will be described.

—Calculation of the Generation Frequency of the Peak of the Mass Speed Corresponding to the Jerk in the Right and Left Direction of the Vehicle—

First, the calculation of the generation frequency of the peak of the mass speed corresponding to the jerk in the right and left direction of the vehicle will be described.

First, the acceleration of the mass point is calculated by differentiating the mass speed corresponding to the jerk in the right and left direction of the vehicle calculated in the calculation of the ratio of the kinetic energy of the mass point at the end point of the change, with respect to the change amount of the acceleration in the right and left direction of the vehicle (the mass speed calculated using the vibration model for calculating the position of the mass point, on the assumption that the passenger's head is moved by the change of the acceleration in the right and left direction of the vehicle).

The calculation step hereafter is substantially the same as the calculation step of the generation frequency of the peak of the mass speed corresponding to the jerk in the back and forth direction of the vehicle. Namely, the peak value of the mass speed is calculated at a point when the calculated mass acceleration is 0. Next, the number of generation of the peak of the mass speed per sample time is counted.

As described above, the generation frequency of the peak of the mass speed corresponding to the jerk in the right and left direction of the vehicle, is calculated.

—Determination/Evaluation of the Rattling Driving Degree in the Right and Left Direction of the Vehicle—

Next, determination/evaluation of the rattling driving degree in the right and left direction of the vehicle, will be described.

The determination/evaluation method of the rattling driving degree in the right and left direction of the vehicle, is substantially the same as the determination/evaluation method of the rattling driving degree in the back and forth direction of the vehicle. Namely, the magnitude correlation between the number of times of generation of the peak of the mass speed per sample time, and evaluation points of 2 to 5 is compared. Then, the rattling driving degree in the right and left direction of the vehicle is determined from this comparison result.

Next, the rattling driving degree in the right and left direction of the vehicle is evaluated by the method with 5-points as a perfect point. Further, the evaluation index of the rattling driving degree in the right and left direction of the vehicle in the current drive of the vehicle, is calculated. Next, the evaluation point of the rattling drive degree in the right and left direction of the vehicle in the current drive of the vehicle, is calculated based on the correlation by the method with 5-points as a perfect point, similarly to the calculation method of the evaluation point of the sudden driving operation degree in the back and forth direction of the vehicle.

As described above, the rattling driving degree in the right and left direction of the vehicle, is determined and evaluated.

<<Sluggish Driving Degree>>

As shown below, the sluggish driving degree is obtained by calculating the ratio of the time required for change, with respect to the change amount of the vehicle speed.

<Calculation of the Ratio of the Time Required for Change, with Respect to the Change Amount of the Vehicle Speed>

First, explanation will be given for the calculation of the ratio of the time required for change, with respect to the change amount of the vehicle speed.

First, using the vibration model, the mass position is calculated as the acceleration in the back and forth direction of the vehicle. Wherein, the mass position is computed on the assumption that an overall vehicle speed is changed, using the vibration model. Detailed explanation thereof will be described hereafter using FIG. 16. FIG. 16 is a view showing the vibration model.

As shown in FIG. 16, viscosity damper model with 1 degree of freedom (1-DOF) fixed to the vehicle is used, as the vibration model.

The differential equation of the mass point is expressed by the following Equation (1).

$$m \cdot \frac{d^2 x}{dt^2} + c \cdot \frac{dx}{dt} + k \cdot x = f(t) \quad (1)$$

Values of mass amount m, spring constant k, and damping constant C are determined as follows. Namely, values of m and k are set so that the specific frequency is in a range of 0.03 to 0.1 Hz to broadly obtain the vehicle speed history (so as to obtain a long change cycle of the vehicle speed). For example, the value of m is set in a range of 50 to 500, when k=20.

Further, the value of C is set, so that the value of zeta is in a range of 0.5 to 1.0 to obtain a driving state close to an actual state during continuous traveling. For example, the value of C is set in a range of 45 to 90, when m=100, and k=20.

Wherein, m=100, k=20, and C=50.

Further, f(t) is expressed by the following Equation.

f(t)=(mass amount m)×(acceleration in the back and forth direction of the vehicle, with high frequency noise component removed)

Sequential computation using the differential equation is carried out, as the calculation method of the numerical values of the differential equation expressed by Equation (1).

A single differential value and a secondary differential value of the mass position x with respect to time t, are respectively expressed by the following Equations (2) and (3).

$$\frac{dx}{dt} = \frac{x(t+\Delta t) - x(t)}{\Delta t} \quad (2)$$

$$\frac{d^2 x}{dt^2} = \left\{ \frac{x(t+\Delta t) - x(t)}{\Delta t} - \frac{x(t) - x(t-\Delta t)}{\Delta t} \right\} / \Delta t \quad (3)$$

Equations (2) and (3) are substituted into Equation (1), and expressed by the following Equation (4).

$$x(t + \Delta t) = \left\{ \left( 2 + \frac{c}{m} \cdot \Delta t - \frac{k}{m} \cdot \Delta t^2 \right) \cdot x(t) - x(t - \Delta t) + \frac{f(t)}{m} \cdot \Delta t^2 \right\} / \left( 1 + \frac{c}{m} \cdot \Delta t \right) \quad (4)$$

Using this Equation (4), mass position x (t+Dt) at time t+Dt is sequentially calculated from mass position x(t) at time t and mass position x (t−Dt) at time t−Dt. As described above, the mass position x corresponds to the acceleration in the back and forth direction of the vehicle.

FIG. 17 is a graph showing an example of the relation between time and acceleration in the back and forth direction of the vehicle. In FIG. 17, solid line shows the relation between time and acceleration (mass position) in the back and forth direction of the vehicle calculated using the time and the vibration model, and broken line shows the relation between time and acceleration in the back and forth direction of the vehicle calculated from the signal detected by the vehicle speed sensor 20.

As described above, the mass position is calculated as the acceleration in the back and forth direction of the vehicle.

Next, the vehicle speed is calculated by integrating the calculated mass position with respect to time.

FIG. 18 is a graph showing an example of the relation between time and vehicle speed. In FIG. 18, the solid line shows a relation between time and calculated vehicle speed using the vibration model, and the broken line shows a relation between time and the signal detected by the vehicle speed sensor 20 corresponding to the vehicle speed.

Next, the change amount of the vehicle speed from acceleration 0 to the next 0 of the vehicle, is calculated.

Next, the ratio of the time required for change, with respect to the change amount of the vehicle speed thus obtained is calculated. The ratio thus obtained is regarded as the evaluation index of the sluggish driving degree (also called a modulation driving). Therefore, the sluggish driving degree shows the change of the vehicle speed, in other words, shows the degree of the sluggish driving in which the passenger's head is moved slowly for a long period of time. When the ratio of the time required for change, with respect to the change amount of the vehicle speed is expressed by Dara, Dara is expressed by the following Equation:

Dara=$Dt_d/Dv_d$ wherein the change amount of the vehicle speed is expressed by $Dv_d$, and the time required for this change is expressed by $Dt_d$.

Figure 19:
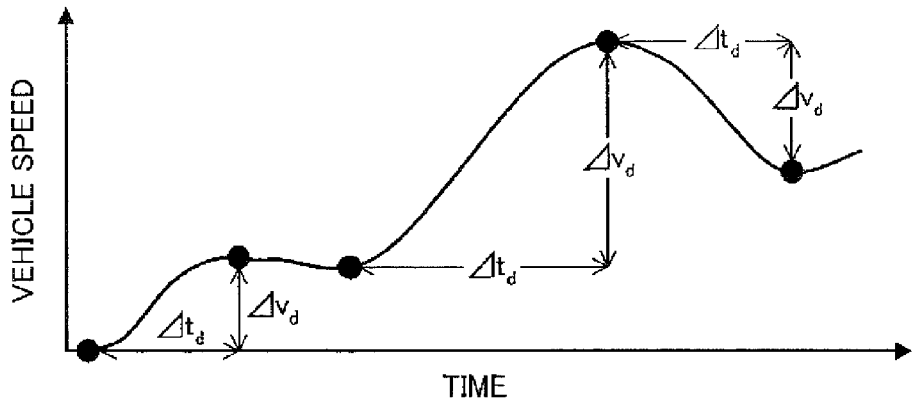
FIG. 19 is a graph showing the relation between time and the vehicle speed.

FIG. 19 is a graph showing the relation between time and vehicle speed. In FIG. 19, black circles show the time when the acceleration of the vehicle is 0.

Note that when the change amount of the vehicle speed is a predetermined value (for example, 10 km/h) or less, the driving operation state of the vehicle is regarded as a regular traveling, and such a change amount is not an evaluation target of the sluggish driving degree.

As described above, the ratio of the time required for change, with respect to the change amount of the vehicle speed is calculated.

<Determination/Evaluation of the Sluggish Driving Degree>

Subsequently, the determination/evaluation of the sluggish driving degree will be described.

Figure 20:
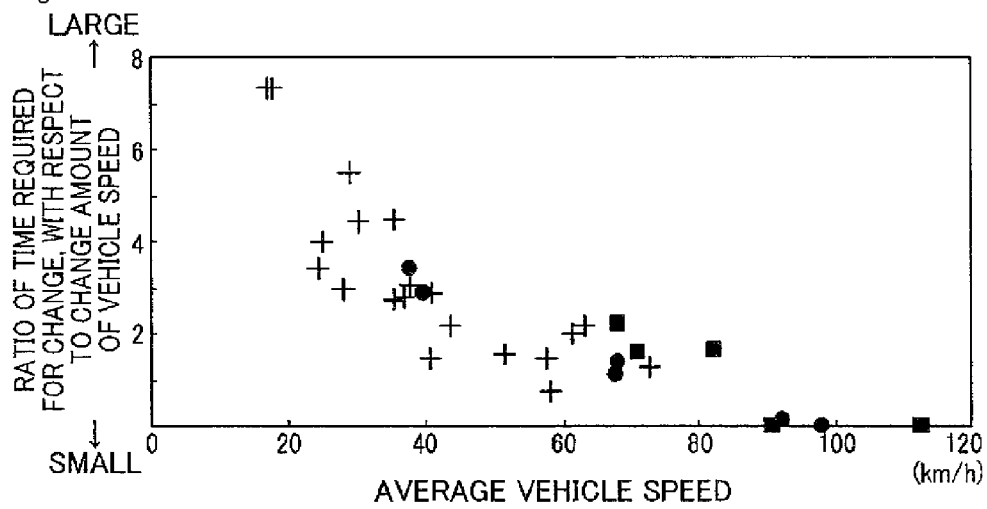
FIG. 20 is a graph showing an example of a relation between an average vehicle speed and a ratio of the time required for change, with respect to the change amount of the vehicle.

FIG. 20 is a graph showing an example of a relation between the average vehicle speed and the ratio of the time required for change, with respect to the change amount of the vehicle speed. In FIG. 20, black circles show driving results of a good driver, black squares show driving results of a driver equivalent to the good driver, and + shows driving results of a general driver. From FIG. 20, it is found that the ratio of the time required for change, with respect to the change amount of the vehicle speed, tends to be smaller, as the average vehicle speed becomes larger, when compared in a case of the same driver.

The time required for the continuous movement of the passenger's head corresponding to the mass point is prolonged, as the driving operation of the vehicle is sluggishly prolonged. Then, as the time is prolonged, the driving operation becomes poor, and as the time is shortened, the driving operation becomes good. Therefore, the sluggish driving degree is determined and evaluated by the ratio of the time required for change, with respect to the change amount of the vehicle speed. Detailed explanation thereof will be given hereafter.

First, the magnitude correlation is compared, between the ratio of the time required for change with respect to the change amount of the vehicle speed, and first to fourth threshold values. Then, from this comparison result, the sluggish driving degree is determined. The first to fourth threshold values become gradually larger in this order. Specifically, when the ratio of the time required for change, with respect to the change amount of the vehicle speed is the first threshold value or less, this state is evaluated as OK with score of 0-point deduction, and when it is larger than the first threshold value and smaller than the second threshold value, this state is evaluated as NG1 with score of 1-point deduction, and when it is larger than the second threshold value and smaller than the third threshold value, this state is evaluated as NG2 with score of 2-points deduction, and when it is larger than the third threshold value and smaller than the fourth threshold value, this state is regarded as NG3 with score of 3-points deduction, and when it is larger than the fourth threshold value, this state is regarded as NG4 with 4-points deduction.

Next, the sluggish driving degree is evaluated by the method with 5-points as a perfect score. Specifically, 5-points are obtained when the deduction is 0-point, 4-points are obtained when the deduction is 1-point, 3-points are obtained when the deduction is 2-points, 2-points are obtained when the deduction is 3-points, and 1-point is obtained when the deduction is 4-points. Such evaluation points are regarded as real time evaluation points of the sluggish driving degree.

Further, the evaluation index of the sluggish driving degree in the current drive of the vehicle, is calculated. Specifically, this evaluation index is expressed by the following formula (mathematical relation), from the number of times of calculations of calculating the ratio of the time required for change with respect to the change amount of the vehicle speed, and from the total of the aforementioned deductions in the current drive of the vehicle.

Evaluation index=total of the deductions/number of times of calculations

Next, the evaluation point of the sluggish driving degree in the current drive of the vehicle is calculated from this evaluation index, based on the correlation with 5-points as a perfect score, similarly to the calculation method of the evaluation point of the sudden driving operation degree in the back and forth direction of the vehicle.

As described above, the sluggish driving degree is determined and evaluated.

<<Comprehensive Determination/Evaluation of the Driving Operation State of the Vehicle>>

Comprehensive determination/evaluation of the driving operation state of the vehicle, will be described next.

First, the evaluation index (first evaluation index) of the sudden driving operation in the current drive of the vehicle, is calculated. The evaluation index #1 is expressed by the following formula (mathematical relation), from the number of times of determinations whether the driving operation state is the sleek driving state, the shaking driving state, or the gentle driving state in the back and forth direction and in the right and left direction of the vehicle in the current drive of the vehicle, and from the total of the aforementioned deduction points (deduction points of 1-point, 2-points, or 3-points) obtained by determining the driving operation state as the shaking driving state in the back and forth direction and in the right and left direction of the vehicle in the current drive of the vehicle, and from the total of addition points (addition points of 0.3-points or 1-point) obtained by determining the driving operation state as the sleek driving state in the back and forth direction and in the right and left direction of the vehicle in the current drive of the vehicle.

Evaluation index #1=(total of deductions−total of addition)/number of times of determinations Next, the evaluation index (second evaluation index) of the rattling driving degree in the current drive of the vehicle, is calculated. The evaluation index #2 is expressed by the following formula (mathematical relation), from the total of the sample times when the peak of the mass speed is generated in the back and forth direction and in the right and left direction of the vehicle in the current drive of the vehicle, and from the total of the aforementioned deduction points obtained by determining the sluggish driving degree in the back and forth direction and in the right and left direction of the vehicle.

Evaluation index #2=total of deduction points/total of sample times when the peak of the mass speed is generated Note that as described above, the evaluation index of the rattling driving degree in the current drive of the vehicle, is obtained by dividing the total of the aforementioned deduction points in the current drive of the vehicle, by the total of the sample times when the peak of the mass speed is generated. However, the evaluation index may also be obtained by dividing the total of the deduction points by the number of times of counts of counting the number of times of generation of the peak of the mass speed in the current drive of the vehicle per sample time.

Next, the evaluation point (first evaluation point) of the sudden driving operation degree in the current drive of the vehicle is calculated from the evaluation index #1, and the evaluation point (second evaluation point) of the rattling driving degree in the current drive of the vehicle is calculated from the evaluation index #2, based on the correlation with 5-points as a perfect score, similarly to the calculation method of the evaluation point of the sudden driving operation degree in the back and forth direction of the vehicle.

Next, the comprehensive evaluation point (also called a SD-degree) of the driving operation state in the current drive of the vehicle, is calculated. Specifically, the evaluation points are weighted so that a weight of the evaluation point of the sudden driving operation degree in the current drive of the vehicle is larger than a weight of the evaluation point of the rattling driving degree in the current drive of the vehicle, and from this weighted evaluation point, the comprehensive evaluation point is calculated. Namely, the comprehensive evaluation point is expressed by the following formula (mathematical relation).

Comprehensive evaluation point=evaluation point of sudden driving operation degree×weight*1+ evaluation point of rattling driving degree× weight*2 wherein sum of the weight*1 and weight*2 is 1, and weight*1 is a value larger than weight*2. Thus, the weight*1 is set to be a value larger than the weight*2, for displaying only the evaluation point of the shaking driving state in real time. A signal including the information regarding the comprehensive evaluation point, is transmitted to a meter-side controller 3.

Note that as described above, the comprehensive evaluation point of the driving operation state in the current drive of the vehicle, is obtained from the sudden driving operation degree and the rattling driving degree. However, the comprehensive evaluation point may also be obtained from the sudden driving operation degree only. Further, the comprehensive evaluation point may also be obtained from the sluggish driving degree, instead of the rattling driving degree, or in addition to the sudden driving operation degree and the rattling driving degree.

As described above, the comprehensive determination and evaluation is carried out for the driving operation state in the current drive of the vehicle.

<Change of the Determination Reference>

Change of the determination reference will be described.

Namely, the determination reference is changed from the SD degree in the current drive of the vehicle. Specifically, when the number of stages as will be described later is increased (when the vehicle driving operation skill is improved) which is fluctuated in accordance with the SD degree in the current drive of the vehicle, the determination reference is changed and set so that the driving operation state is hardly determined as the sleek driving state or the gentle driving state. Namely, as shown in one dot chain line of FIG. 9, when the number of stage is raised, the determination reference is moved to a lower side in the first determination map by decreasing a fixed value of the overshoot ratio or increasing the predetermined amount (ranges of the sleek driving state and the gentle driving state are narrowed).

Further, when the number of stage is raised, the damping ratio is reduced so that the mass point is easily overshooted in the vibration model. Meanwhile, when the number of stage is lowered, the determination reference is moved to an upper side in the first determination map, or the damping ratio is increased in the vibration model.

<<Display of Vehicle Driving Information>>

Display of vehicle driving information by the vehicle display device will be described hereafter.

Reference numeral 3 of FIG. 1 indicates a meter-side controller that performs display control of the vehicle driving information, being the information regarding drive of the vehicle. Signals are inputted into the meter-side controller 3, from a ignition sensor 40 for detecting on/off operation of the ignition switch of the vehicle, and a steering sensor 41, etc., for detecting an operation of the steering switch 50 (see FIG. 21), and determination/evaluation results of the vehicle driving operation state by a driver, are displayed on a display 60 (display unit, notification unit). A system-side controller 1 is connected to the meter-side controller 3 so that the signal can be received.

Figure 21:
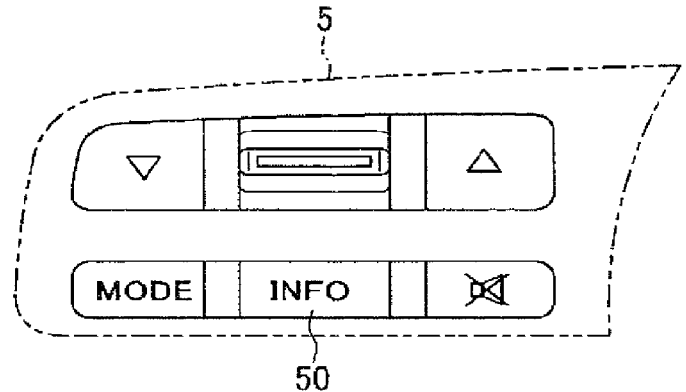
FIG. 21 is a front view showing a steering switch.

As shown in FIG. 21, the steering switch 50 is provided to the vehicle steering 5, and although detailed explanation will be given hereafter, when this steering switch 50 is pressed and operated, a display screen is switched to the display 60.

Figure 22:
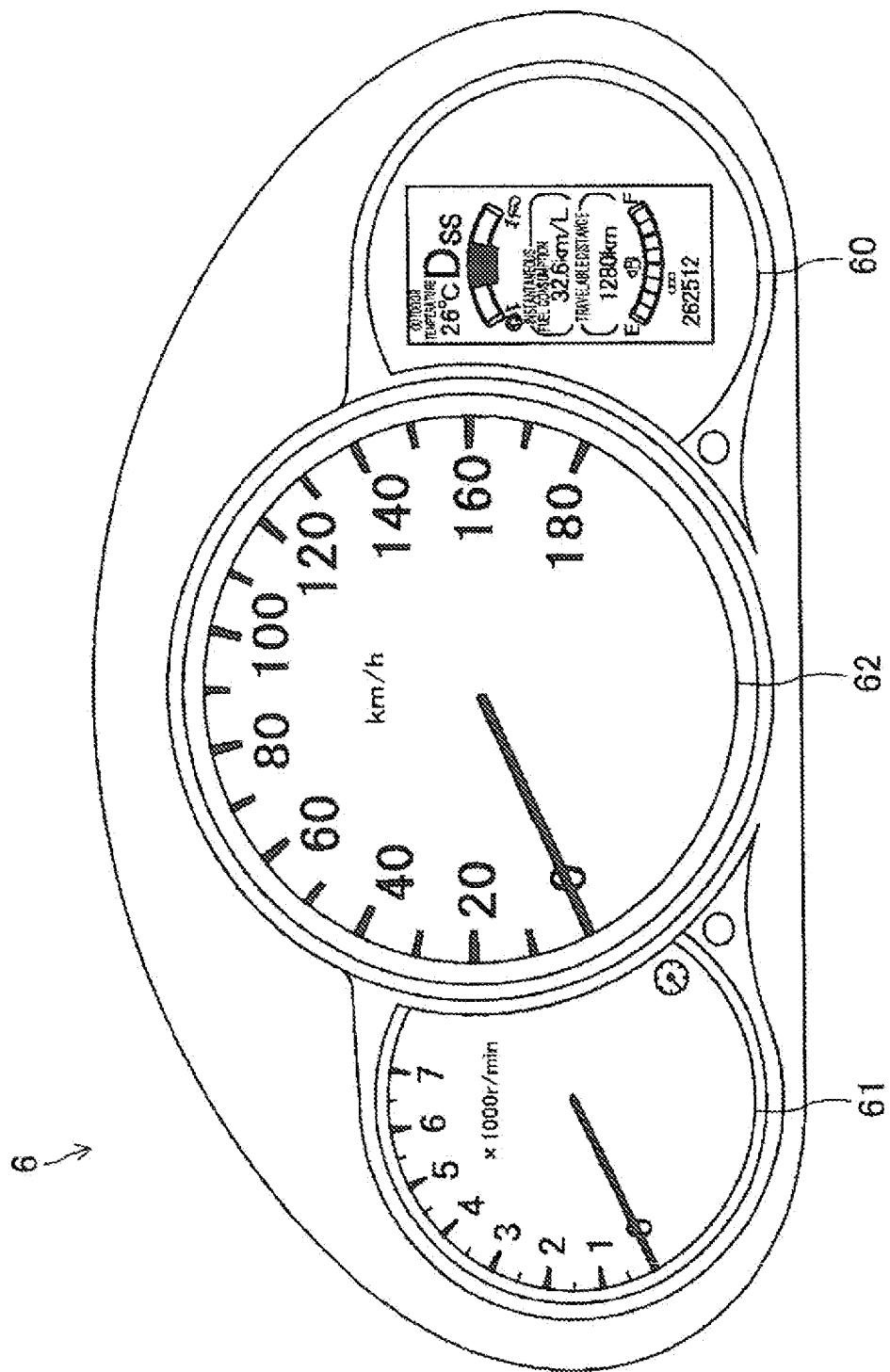
FIG. 22 is a front view showing a meter indicator.

The display 60 is a TFT color liquid crystal multiple information display, and, as shown in FIG. 22, is provided on a right end part of a meter indicator 6 which is provided in a passenger compartment. An engine speed display part 61 for displaying an engine speed is provided on a left end part of the meter indicator 6, and a vehicle speed display part 62 for displaying a vehicle speed is provided in a center part.

The meter-side controller 3 includes a decision/determining part 30 (decision unit) into which a signal detected by the ignition sensor 40 is inputted, and a display controller 31 (display unit, notification unit) into which signals detected by the ignition sensor 40 and the steering sensor 41 are inputted.

The decision/determining part 30 decides, from the result of the comprehensive determination and evaluation by the comprehensive determination part 17, message information regarding the driving operation of the current drive of the vehicle, determines the stage, and decides the advice information regarding the next driving operation of the vehicle. Detailed explanation thereof will be described hereafter.

<Decision of the Message Information Regarding the Current Driving Operation of the Vehicle>

First, the decision of the message information regarding the current driving operation of the vehicle will be described.

Namely, from the signal detected by the ignition sensor 40, when it is determined that the ignition is switched from on to off, the message information regarding the current driving operation of the vehicle is selected and decided, from the SD degree in the current drive of the vehicle calculated by the comprehensive determining part 17. Specifically, when the SD degree in the current drive of the vehicle is 5.0, "excellent drive" is selected and decided, and when the SD degree is 4.0 to 4.9, or when the SD degree in the current drive of the vehicle is 2.0 to 3.9 and when the SD degree in the current drive of the vehicle is nearest cumulative average SD degree (the cumulative average SD degree will be described later) or more, "driving skill is improved" is selected and decided as the message information. Note that when the SD degree in the current drive of the vehicle is 2.0 to 3.9, and when the SD degree in the current drive of the vehicle is less than the nearest cumulative average SD degree, or when the SD degree in the current drive of the vehicle is 1.0 to 1.9, the message information is not selected and decided.

As described above, the message information regarding the current driving operation of the vehicle is decided.

<Determination of the Stage>

Subsequently, determination of the stage will be described. This stage shows a stage evaluation of the driving operation, and includes the stages of a first stage to a fifth stage. The signal including the information regarding the stage is transmitted to the system-side controller 1.

First, from the signal detected by the ignition sensor 40, when it is determined that the ignition is switched from off to on, the cumulative average SD degree is calculated from the nearest 10 SD degrees calculated by the comprehensive determining part 17. Namely, the cumulative average SD degree is expressed by the following formula (mathematical relation).

Cumulative average SD degree=(total of nearest 10 SD degrees)/10

Then, when all of the nearest 5 cumulative average SD degrees are 4.75 or more, the stage is raised by one stage, and when all of the nearest 15 cumulative average SD degrees are less than 2.0, the stage is lowered by one stage. In other case, the stage stays as it is.

The stage is determined as described above.

Note that when the number of stage is raised, the driving operation state of the vehicle is strictly determined and evaluated by the system-side controller 1. For example, the first and second predetermined values used in the method with 5-points as a perfect point, is set to be small (see the broken line of FIG. 12), or the sample time used for calculating the generation frequency of the peak is set to be longer. Meanwhile, when the number of stage is raised, the driving operation state is loosely determined and evaluated. For example, the first and second predetermined values are set to be large or the sample time is set to be shorter.

<Decision of the Advice Information Regarding the Next Driving Operation of the Vehicle>Subsequently, decision of the advice information regarding the next driving operation of the vehicle will be described.

Namely, from the signal detected by the ignition sensor 40, when it is determined that the ignition is switched from off to on, the advice information regarding the next driving operation of the vehicle is selected and decided, from the SD degree and the nearest cumulative average SD degree in the current drive of the vehicle, calculate d by the comprehensive determination part 17. Specifically, when the SD degree in the current drive of the vehicle is 5.0, "let's continue to always try this driving state" is selected and decided, and when the SD degree in the current drive of the vehicle is 4.0 to 4.9, "let's keep this driving state and try further upper level" is selected and decided as the advice information.

Further, when the SD degree in the current drive of the vehicle is 2.0 to 3.9, and when the SD degree in the current drive of the vehicle is equal to the nearest cumulative average SD degree or more, "let's keep this driving state and try further upper level" is selected and decided.

Further, when the SD degree in the current drive of the vehicle is 2.0 to 3.9, and the SD degree in the current drive of the vehicle is less than the nearest cumulative average SD degree, or when the SD degree in the current drive of the vehicle is 1.0 to 1.9 (predetermined points or less), it is determined that the driving operation in the current drive receives lowest evaluation, and the advice information corresponding to such a driving operation is selected and decided.

The advice information includes: "Driving advice: let's refrain from frequent accelerator operation", "Driving advice: let's refrain from frequent brake operation", "Driving advice: let's refrain from frequent steering operation", "Driving advice: let's try moderate acceleration", "Driving address: let's try moderate deceleration", "Driving address: let's try a smooth steering operation", and "Driving address: let's try a sharp driving".

As described above, the message information regarding the current driving operation of the vehicle is decided.

<Display of Vehicle Driving Information on a Display>

Subsequently, display of vehicle driving information on a display 60 by the display control part 31 will be described.

Figure 23:
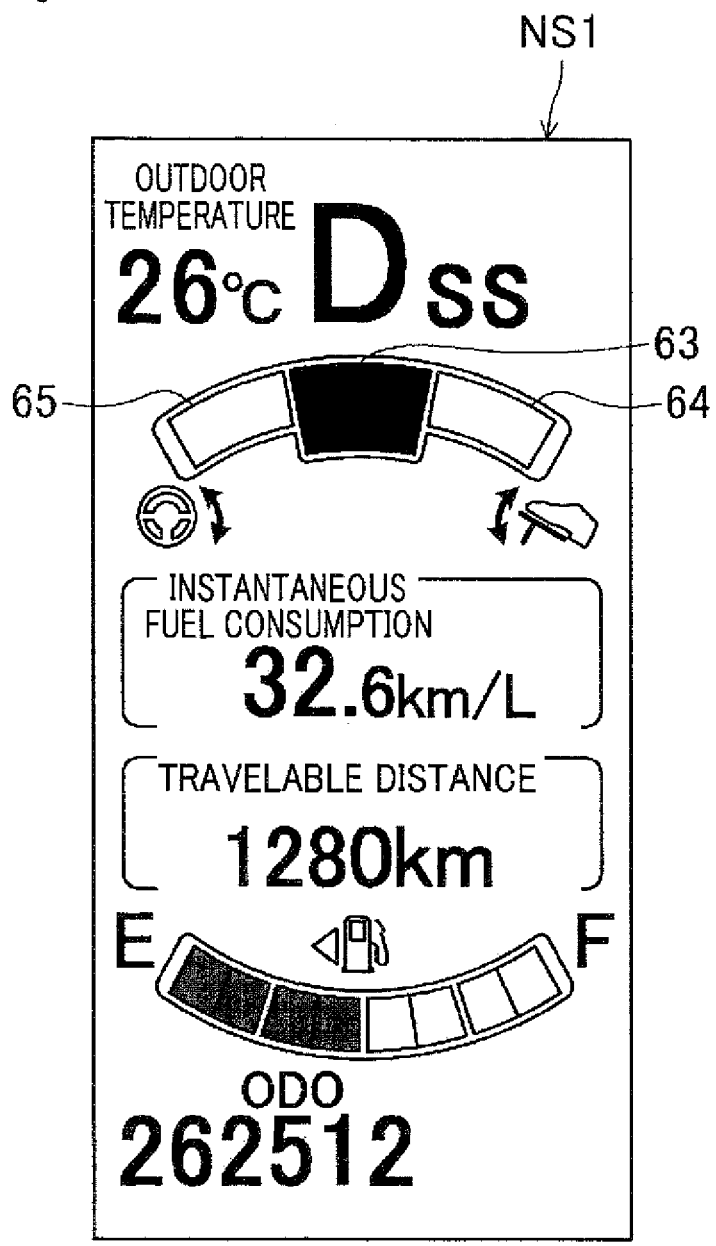
FIG. 23 is a view showing an example of a first normal screen in a state that a sleek (stylish) operation display part is lighted.
Figure 24:
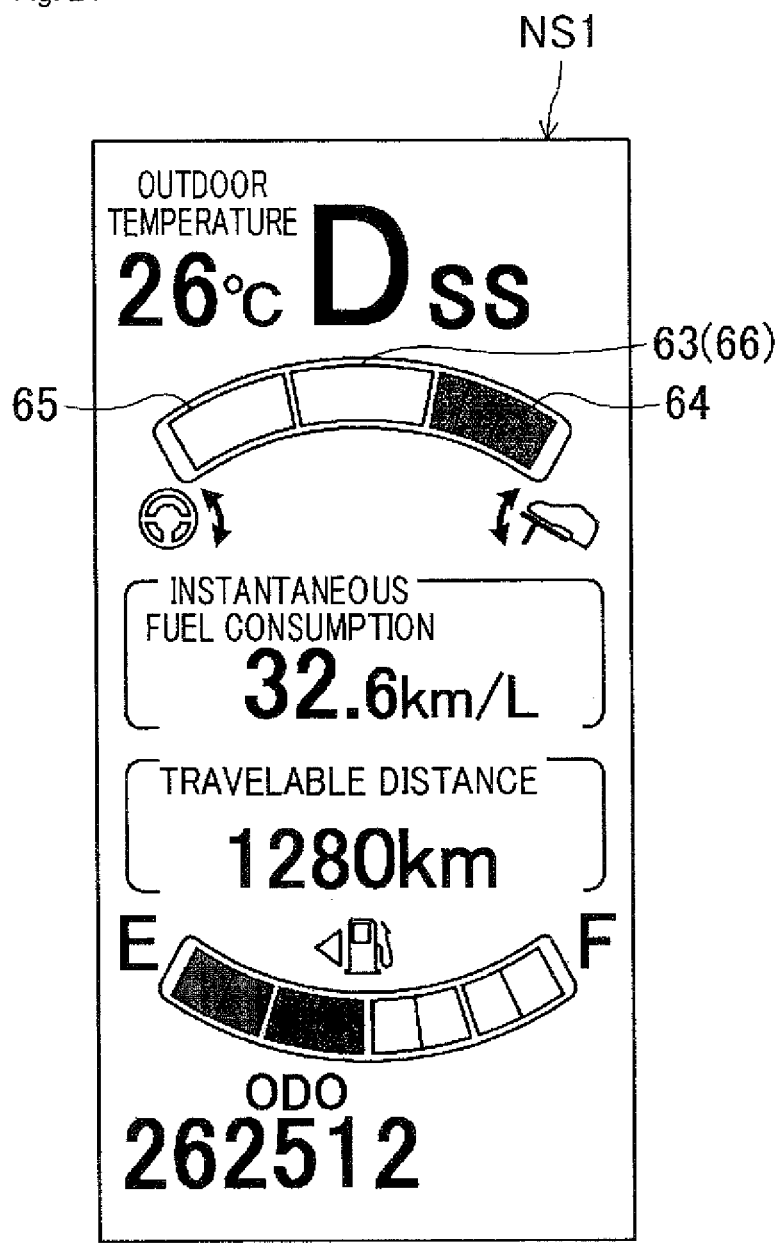
FIG. 24 is a view showing an example of the first normal screen in a state that the operation display part shaking in a back and forth direction is lighted and displayed.
Figure 25:
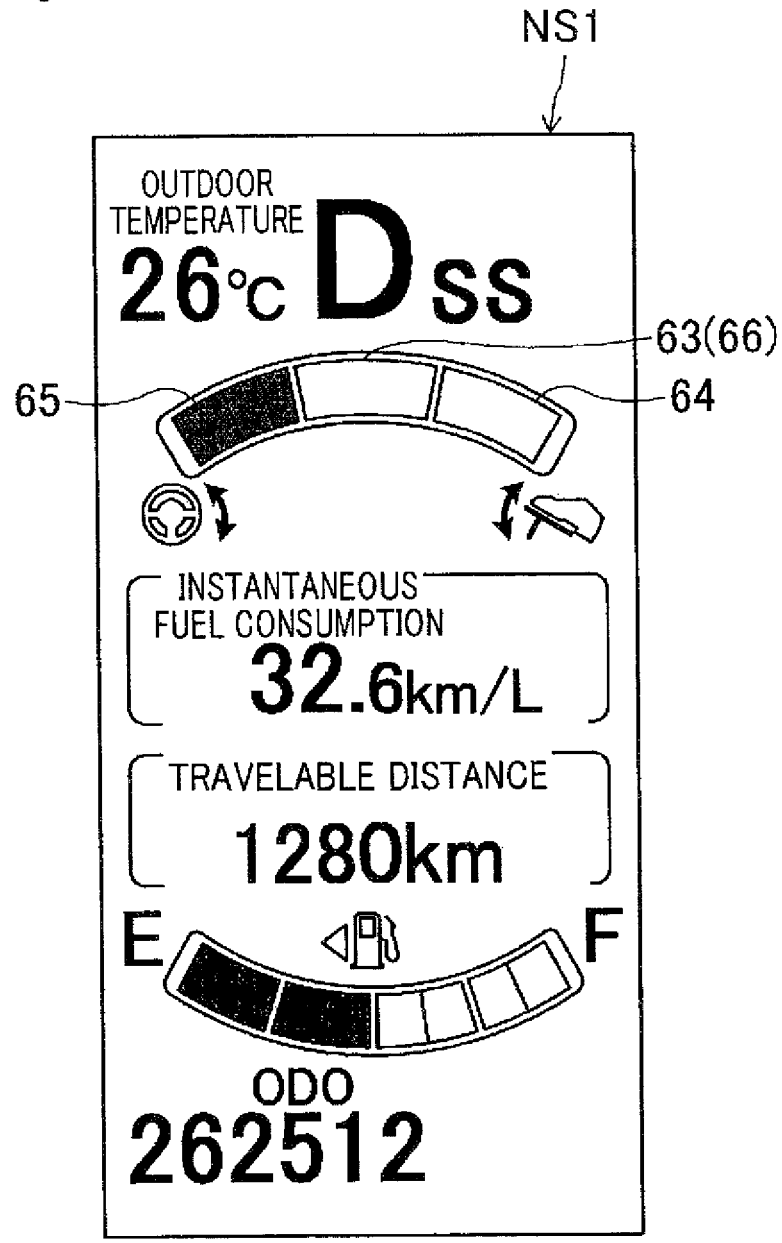
FIG. 25 is a view showing an example of the first normal screen in a state that the operation display part shaking in a right and left direction is lighted and displayed.
Figure 26:
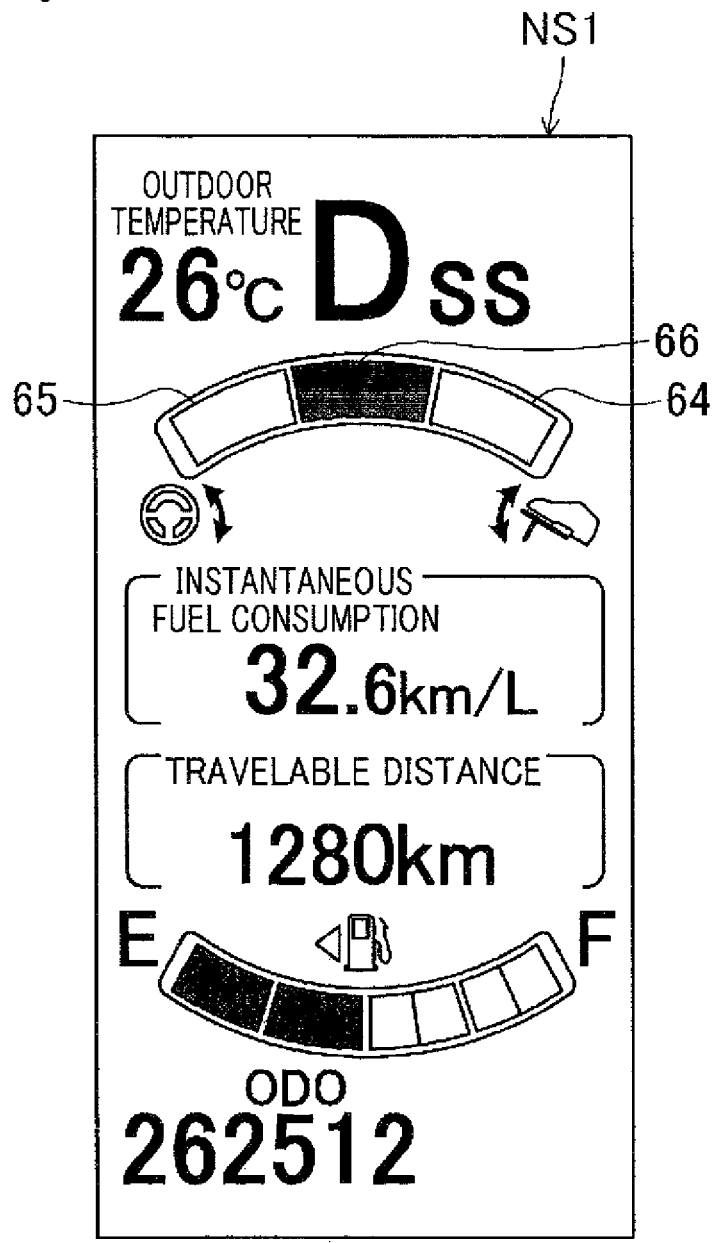
FIG. 26 is a view showing an example of the first normal screen in a state that a gentle operation display part is lighted and displayed.

Namely, in the on-state of the ignition (during traveling of the vehicle, and also during stop of the vehicle), vehicle driving information is displayed on the display 60 as a normal screen, including the information regarding the sleek driving state (preferable driving operation state), the shaking driving state (unpreferable driving operation state), and the gentle driving state (preferable driving operation state), so determined and evaluated by the comprehensive determining part 17 and the decision/determining part 30. A first normal screen is displayed first, as the normal screen. Details of the first normal screen will be described hereafter using FIG. 23 to FIG. 26. FIG. 23 to FIG. 26 show an example of the first normal screen NS1 respectively, and FIG. 23 shows a state that a sleek drive display part as will be described later is lighted and displayed, and FIG. 24 shows a state that a back and forth shaking drive display part is lighted and displayed, and FIG. 25 shows a state that the right and left shaking drive display part is lighted and displayed, and FIG. 26 shows a state that a gentle drive display part is lighted and displayed.

As shown in FIG. 23 to FIG. 26, an outdoor temperature, AT gear position, and CVT mode are displayed at the top of the first normal screen NS 1, sequentially from the left. In examples of FIG. 23 to FIG. 26, the outdoor temperature is character-displayed as "26 degrees Celsius", the AT gear position is character-displayed as "D", and the CVT mode is character-displayed as "SS".

A sleek drive display part (first display part) 63, a back and forth shaking drive display part (second display part) 64, a right and left shaking drive display part 65 (second display area), and a gentle drive display part (third display part) 66 are provided on a lower side of the display part of the outdoor temperature, AT gear position, and CVT mode of the first normal screen NS1. Note that the second display part includes the back and forth shaking drive display part 64 (also called one second display area) and the right and left shaking drive display part 65 (also called the other second display area).

The sleek drive display part 63, the back and forth shaking drive display part 64, and the right and left shaking drive display part 65 are arranged in parallel with each other in the right and left direction of the vehicle, wherein these display parts (display areas) ate curved in such a manner that a center portion is more protruded to an upper side than both end portions in the right and left direction of the vehicle. The right and left shaking drive display part 65 is arranged on the left side of the sleek drive display part 63, and the back and forth shaking drive display part 64 is arranged on the right side thereof respectively. The gentle drive display part 66 is provided at the same position in the right and left direction of the vehicle, as the position of the sleek drive display part 63. The sleek drive display part 63 and the gentle drive display part 66 have approximately trapezoidal shapes, and the back and forth shaking drive display part 64 and the right and left shaking drive display part 65 have approximately rectangular shapes.

The sleek drive display part 63 is more protruded to a lower side than the back and forth shaking drive display part 64, the right and left shaking drive display part 65, and the gentle drive display part. Note that although the sleek drive display part 63 is protruded to the lower side, it may be protruded to the upper side or to both sides in a vertical direction. The sleek drive display part 63 has an area larger than areas of the back and forth shaking drive display part 64, the right and left shaking drive display part 65, and the gentle drive display part.

The sleek drive display part 63 is lighted and displayed (lamp is lighted) in blue color in real time, for notifying a driver of the driving operation state when it is determined by the operation state determining part 13 as the sleek driving state in the back and forth direction of the vehicle, and in the right and left direction of the vehicle. Specifically, the sleek drive display part 63 has three areas in the vertical direction, although not shown, and when it is lighted and displayed, the area is lighted and displayed sequentially from a lowermost side area, and all areas are finally lighted and displayed (see FIG. 23).

A shaking driving state degree of the back and forth shaking drive display part 64 is bar-displayed in real time, when the driving operation state is determined as the shaking driving state in the back and forth direction of the vehicle by the operation state determining part 13. The bar (gauge) has three calibrations (segments) in the right and left direction of the vehicle, and areas of these calibrations (regions) become larger from a left side (sleek drive display part 63 side) to a right side (opposite side to the sleek drive display part 63).

Then, as the shaking driving state degree in the back and forth direction of the vehicle is increased, it is displayed in steps from the left side to the right side. Specifically, in the evaluation point (real time evaluation point) of the shaking driving state degree, the calibration of innermost side (left side) is lighted and displayed in white color in a case of 1-point deduction, and a second calibration from the innermost side is lighted and displayed in white color in a case of 2-points deduction, and third calibration from the innermost side is lighted and displayed in white color in a case of 3-points deduction (in FIG. 24, they are all displayed in gray colors, for easily understanding the figure).

Thus, the displayed color of the back and forth shaking drive display part 64 and the displayed color of the sleek drive display part 63 are different from each other. In the example of FIG. 24, all of the three calibrations are lighted and displayed (fully marked). As described above, the shaking driving state degree is expressed by increase/decrease of the calibration, and therefore movement of a visual line of the driver can be suppressed.

When the driving operation state is determined as the shaking driving state in the right and left direction of the vehicle by the operation state determining part 13, the shaking driving state degree of the right and left shaking drive display part 65 is bar-displayed in real time. The bar has three calibrations in the right and left direction of the vehicle, and the areas of these calibrations become larger from the right side (the sleek drive display part 63 side) to the left side (the opposite side to the sleek drive display part 63).

Then, as the shaking driving state in the right and left direction of the vehicle is increased, it is displayed in steps from the left side to the right side. Specifically, in the evaluation point (real time evaluation point) of the shaking driving state degree, the calibration of innermost side (right side) is lighted and displayed in white color in a case of 1-point deduction, and a second calibration from the innermost side is lighted and displayed in white color in a case of 2-points deduction, and a third calibration from the innermost side is lighted and displayed in white color in a case of 3-points deduction (in FIG. 25, they are all displayed in gray colors, for easily understanding the figure).

Thus, the displayed color of the right and left shaking drive display part 65 and the displayed color of the back and forth shaking drive display part 64 are the same with each other. In an example shown in FIG. 25, all three calibrations are lighted and displayed.

The gentle drive display part 66 is lighted and displayed in green color in real time, for notifying the driver of the driving operation state, when it is determined as the gentle driving state in the back and forth direction and in the right and left direction of the vehicle by the operation state determining part 13 (see FIG. 26). Thus, the displayed color of the gentle drive display part 66, the displayed color of the back and forth shaking drive display part 64 and the displayed color of the sleek drive display part are different from each other.

Further, only one of the sleek drive display part 63, the shaking drive display parts 64, 65, and the gentle drive display part 66 is lighted and displayed. Namely, the sleek drive display part 63, the shaking drive display parts 64, 65, and the gentle drive display part 66 are not simultaneously lighted and displayed. However, the back and forth shaking drive display part 64 and the right and left shaking drive display part 65 are simultaneously lighted and displayed in some cases.

An instantaneous fuel consumption, a travelable distance, a fuel gauge, a travel distance (total travel distance (ODO) or travel distance (TRIP)) are displayed from the top, on the lower side of the sleek drive display part 63, the back and forth shaking drive display part 64, the right and left shaking drive display part 65, and the gentle drive display part 66 in the first normal screen NS1. In the examples of FIG. 23 to FIG. 26, the instantaneous fuel consumption of "32.6 km/L", the travelable distance of "1280 km", the total travel distance of "262512" are character-displayed. Further, half of the calibrations of the fuel gauge is lighted and displayed.

Further, from the signal detected by the steering sensor 41 when it is determined that the steering switch 50 is pressed and operated (predetermined operation), the display screen is switched to the display 60. Specifically, by pressing and operating the steering switch 50, the display screen is sequentially switched to the first normal screen NS 1, the second normal screen, the third normal screen, the fourth normal screen, and the fifth normal screen every time the operation is performed.

Figure 27:
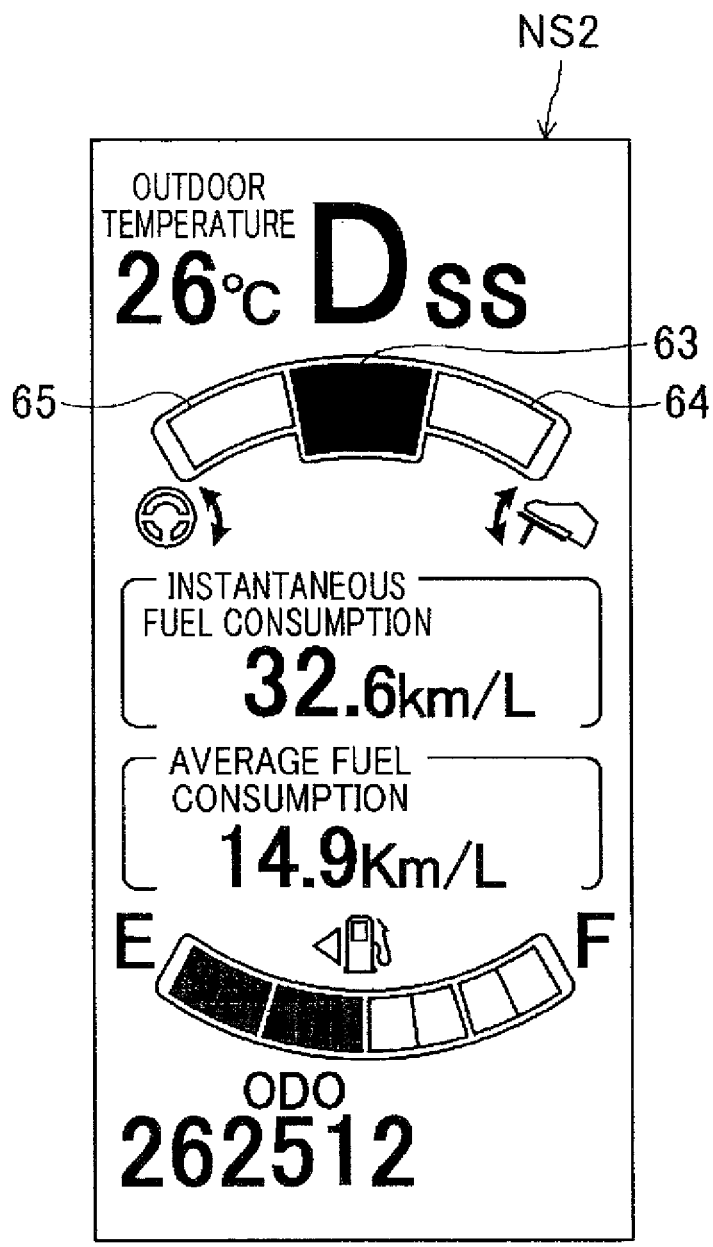
FIG. 27 is a view showing an example of a second normal screen.
Figure 28:
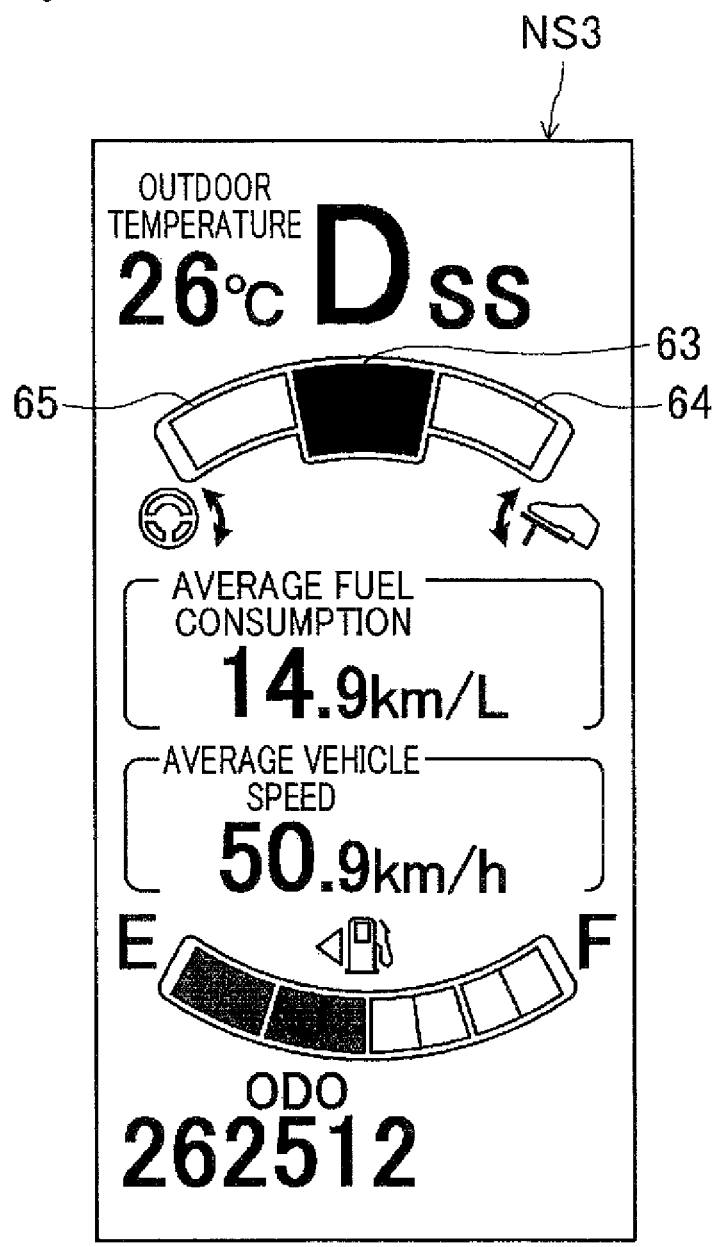
FIG. 28 is a view showing an example of a third normal screen.
Figure 29:
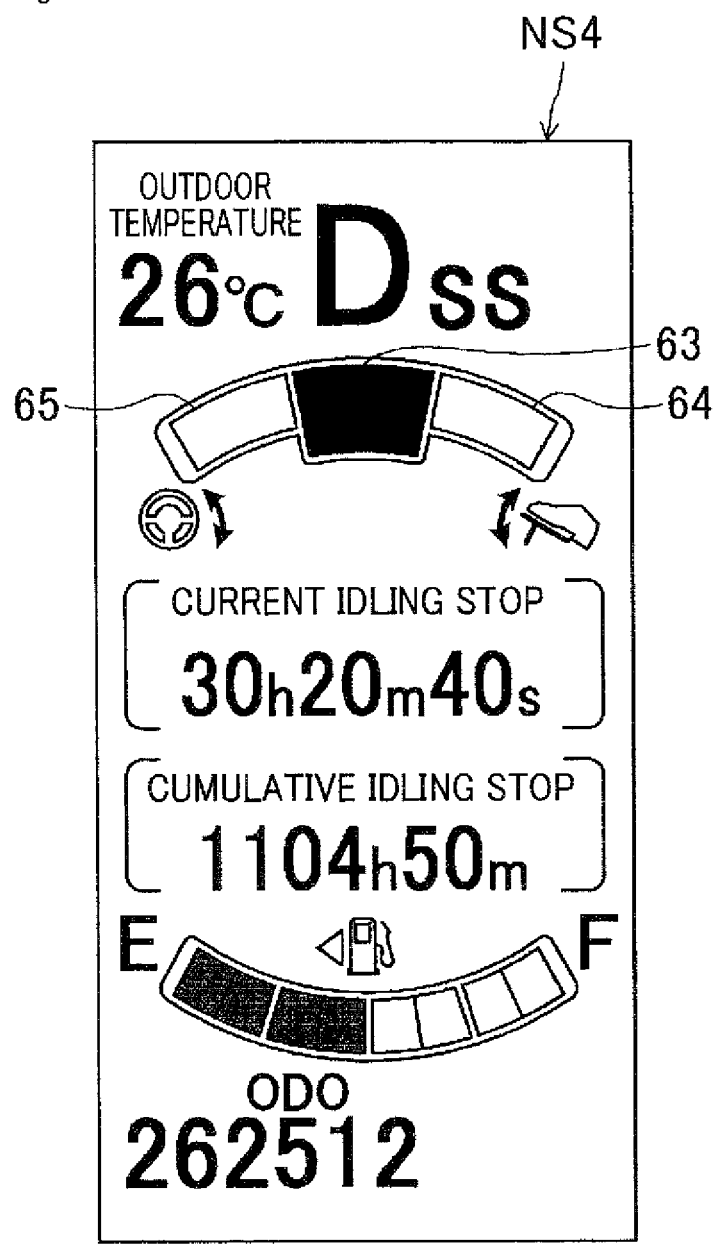
FIG. 29 is a view showing an example of a fourth normal screen.
Figure 30:
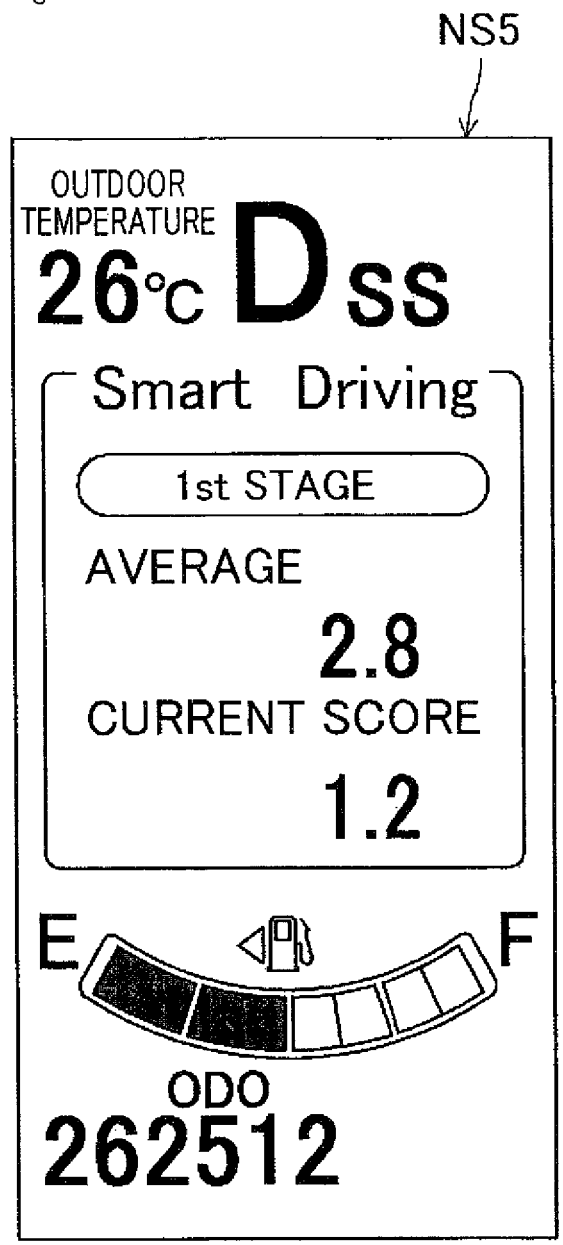
FIG. 30 is a view showing an example of a fifth normal screen.

Then, by pressing and operating the steering switch 50 in the fifth normal screen, the display screen is returned to the first normal screen NS1. The second to fifth normal screens will be described hereafter using FIG. 27 to FIG. 30. FIG. 27 is a view showing an example of the second normal screen NS2, FIG. 28 is a view showing an example of the third normal screen NS3, FIG. 29 is a view showing an example of the fourth normal screen NS4, and FIG. 30 is a view showing an example of the fifth normal screen NS5.

As shown in FIG. 27, the outdoor temperature, AT gear position, and CVT mode are displayed at the top of the second normal screen NS2, sequentially from the left. In the example of FIG. 27, the outdoor temperature is displayed as "26 degrees Celsius", the AT gear position is displayed as "D", and the CVT mode is displayed as "SS" by characters.

The sleek drive display part 63, the back and forth shaking drive display part 64, the right and left shaking drive display part 65, and the gentle drive display part 66 are provided on the lower side of the display part of the outdoor temperature, AT gear position, and CVT mode of the second normal screen NS2. An arrangement, a structure, and a display method of them are substantially same as the arrangement, the structure, and the display method of the sleek drive display part 63, the back and forth shaking drive display part 64, the right and left shaking drive display part 65, and the gentle drive display part 66 in the first normal screen NS1.

The instantaneous fuel consumption, the average fuel consumption, the fuel gauge, and the travel distance are displayed sequentially from the top, on the lower side of the sleek drive display part 63, the back and forth shaking drive display part 64, the right and left shaking drive display part 65, and the gentle drive display part 66 in the second normal screen NS2. In the example of FIG. 27, the instantaneous fuel consumption of "32.6 km/L", the average fuel consumption of "14.9 km/L", and the total travel distance of "262512" are character-displayed. Further, half of the calibrations of the fuel gauge is lighted and displayed.

As shown in FIG. 28, the outdoor temperature, AT gear position, and CVT mode are displayed sequentially from the left, at the top of the third normal screen NS3. In the example of FIG. 28, the outdoor temperature is displayed as "26 degrees Celsius", the AT gear position is displayed as "D", and the CVT mode is displayed as "SS" by characters.

The sleek drive display part 63, the back and forth shaking drive display part 64, the right and left shaking drive display part 65, and the gentle drive display part 66 are provided on the lower side of the display part of the outdoor temperature, AT gear position, and CVT mode in the third normal screen NS3. The arrangement, the structure, and the display method of them are substantially the same as the arrangement, the structure, and the display method of the sleek drive display part 63, the back and forth shaking drive display part 64, the right and left shaking drive display part 65, and the gentle drive display part 66 of the first normal screen NS1.

The average fuel consumption, the average vehicle speed, the fuel gauge, and the travel distance are displayed sequentially from the top, on the lower side of the sleek drive display part 63, the back and forth shaking drive display part 64, the right and left shaking drive display part 65, and the gentle drive display part 66 in the third normal screen NS3. In the example of FIG. 28, the average fuel consumption is displayed as "14.9 km/L", the average vehicle speed is displayed as "50.9 km/h", and the total travel distance is displayed as "262512" by characters. Further, half of the calibrations of the fuel gauge is lighted and displayed.

As shown in FIG. 29, the outdoor temperature, AT gear position, and CVT mode are displayed sequentially from the left, at the top of the fourth normal screen NS4. In the example of FIG. 29, the outdoor temperature is displayed as "26 degrees Celsius", the AT gear position is displayed as "D", and the CVT mode is displayed as "SS" by characters.

The sleek drive display part 63, the back and forth shaking drive display part 64, the right and left shaking drive display part 65, and the gentle drive display part 66 are provided on the lower side of the display part of the outdoor temperature, AT gear position, and CVT mode of the fourth normal screen NS4. The arrangement, the structure, and the display method of them are substantially the same as the arrangement, the structure, and the display method of the sleek drive display part 63, the back and forth shaking drive display part 64, the right and left shaking drive display part 65, and the gentle drive display part 66 of the first normal screen NS1.

Current idling stop, cumulative idling stop, the fuel gauge, and the travel distance are displayed sequentially from the top, on the lower side of the sleek drive display part 63, the back and forth shaking drive display part 64, the right and left shaking drive display part 65, and the gentle drive display part 66 of the fourth normal screen NS4. An idling stop time in the current drive of the vehicle is displayed in the current idling stop. A cumulative idling stop time is displayed in the cumulative idling stop. A cumulative idling stop time is displayed in the cumulative idling stop. In the example of FIG. 29, the current idling stop of "30 h20 m40 s", the cumulative idling stop of "1104 h50 m", and the total travel distance of "262512" are character-displayed. Further, half of the calibrations of the fuel gauge is lighted and displayed.

As shown in FIG. 30, the outdoor temperature, AT gear position, and CVT mode are displayed at the top of the fifth normal screen NS5, sequentially from the left. In the example of FIG. 30, the outdoor temperature is displayed as "26 degrees Celsius", the AT gear position is displayed as "D", and the CVT mode is displayed as "SS" by characters.

The information regarding "Smart Driving" (smart drive support) is displayed on the lower side of the display part of the outdoor temperature, AT gear position, and CVT mode of the fifth normal screen NS5. Stages, average, and the current score are displayed sequentially from the top, as such information. The cumulative average SD degree calculated by the decision/determining part 30 is displayed in the average. Note that the average is not fluctuated when the ignition is on. The SD degree (comprehensive evaluation point of the driving operation state) for the current drive of the vehicle calculated by the comprehensive determining part 17 is displayed in the current score in real time. The current score is updated every 5 seconds. In the example of FIG. 30, the stage of "first stage", the average of "2.8", and the current score of "1.2" are character-displayed.

The fuel gauge and the travel distance are displayed sequentially from the top, on the lower side of the display part of the information regarding "Smart Driving" in the fifth normal screen NS5. In an example of FIG. 30, the total travel distance is indicated to read "262512". Further, half of the calibrations of the fuel gauge is lighted and displayed.

As describe above, the temperature, AT gear position, CVT mode, fuel gauge, and travel distance are always displayed in the normal screens NS1 to NS5.

Further, from the signal detected by the ignition sensor 40, when it is determined that the ignition is switched from on to off, the message information regarding the current drive operation of the vehicle and the advice information regarding the next drive operation of the vehicle are displayed on the display 60 as an ending screen, and thereafter the display on the display 60 is ended.

Specifically, when it is determined that the ignition is off, the vehicle driving information regarding the current drive of the vehicle is displayed for a predetermined time (for example, 5 seconds) on the display 60 as a first ending screen, and thereafter the message information regarding the current driving operation of the vehicle and the advice information regarding the next driving operation of the vehicle determined by the decision/determining part 30 are displayed for a predetermined time (for example, 5 seconds) on the display 60 as a second ending screen, and thereafter the display is ended.

Figure 31:
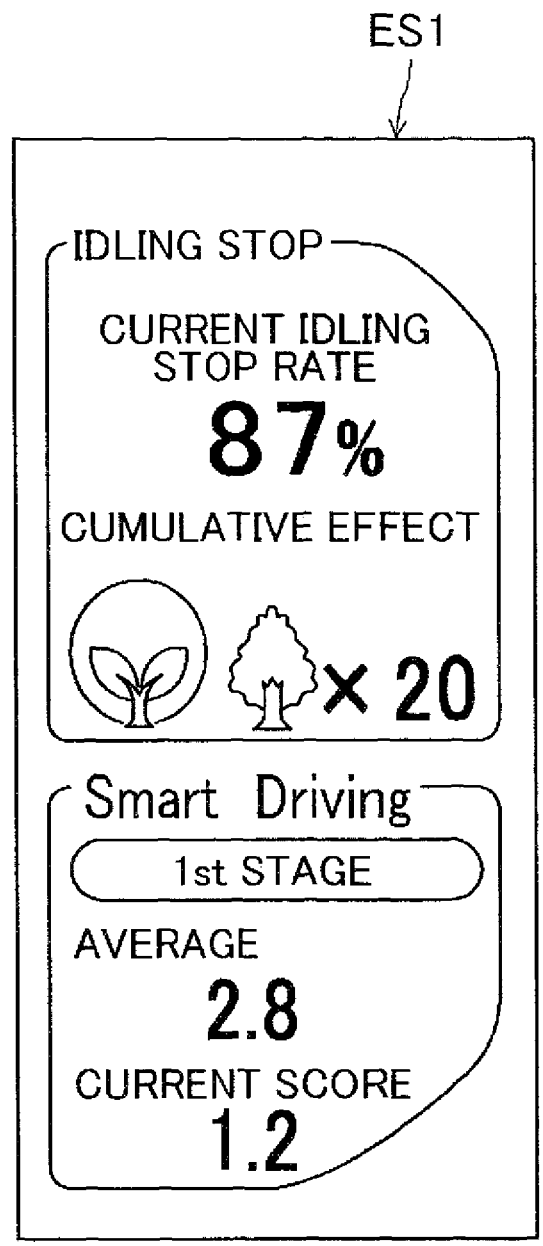
FIG. 31 is a view showing an example of a first ending screen.

The information regarding the sleek driving state, the shaking driving state, and the gentle driving state in the current drive of the vehicle, and the information regarding the current eco-driving of the vehicle are included in the first ending screen. Details of the first and second ending screens are described using FIG. 31 and FIG. 32. FIG. 31 is a view showing an example of the first ending screen ES1, and FIG. 32 is a view showing an example of the second ending screen ES2.

As shown in FIG. 31, the information regarding the idling stop is displayed on the upper side, and the information regarding the "Smart Driving" is displayed on the lower side of the first ending screen ES1. As the information regarding the idling stop, the current idling stop ratio is displayed on the upper side thereof, and a cumulative effect is displayed on the lower side thereof. The idling stop ratio is the ratio of the idling stop with respect to a stop time in the current drive of the vehicle.

As the cumulative effect, the cumulative effect of the idling stop from purchase of the vehicle until now is shown by the number of trees. Further, the stages, the average, and the current score are displayed sequentially from the top, as the information regarding the "Smart Driving". In the example of FIG. 31, the current idling stop ratio of "87%", the cumulative effect of "20", the stage of "first stage", the average of "2.8", and the current score of "1.2" are character-displayed.

Figure 32:
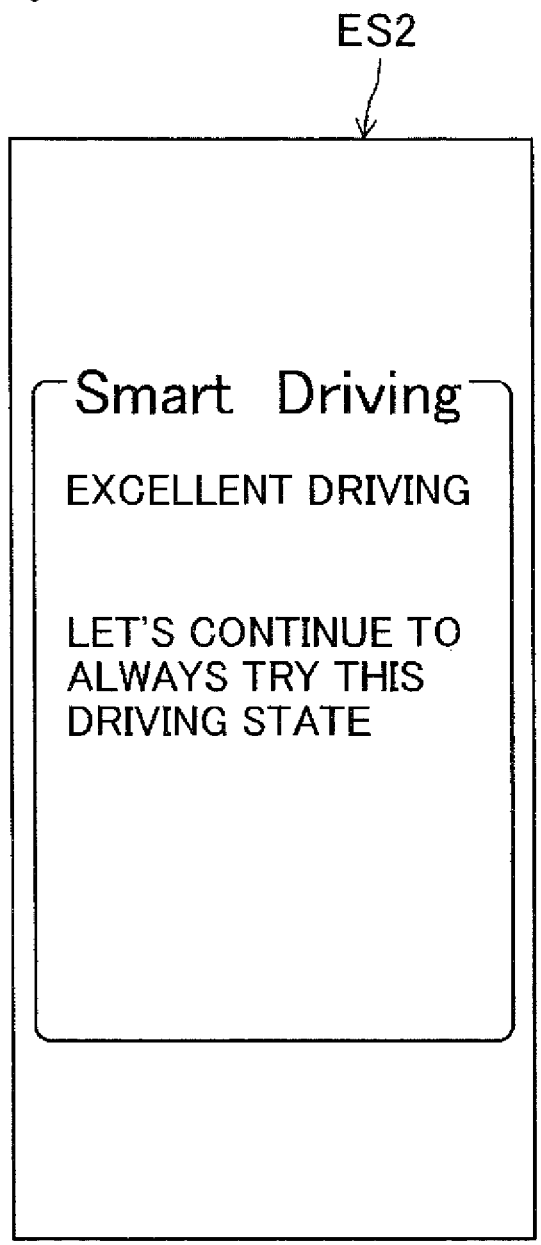
FIG. 32 is a view showing an example of a second ending screen.

As shown in FIG. 32, the information regarding the "Smart Driving" is displayed in the second ending screen ES2. As the "Smart Driving" information, the message information regarding the current driving operation of the vehicle is displayed on the upper side thereof, and the advice information regarding the next driving operation of the vehicle is displayed on the lower side thereof. In the example of FIG. 32, "excellent driving" is character-displayed as the message information regarding the current driving operation of the vehicle, and "let's always try this kind of driving" is character-displayed as the advice information regarding the next driving operation of the vehicle.

Further, from the signal detected by the ignition sensor 40, when it is determined that the ignition is switched from off to on, the vehicle driving information regarding the previous driving operation of the vehicle is displayed on the display 60 as a start screen, and thereafter the vehicle driving information regarding the current drive of the vehicle is displayed on the display 60.

Figure 33:
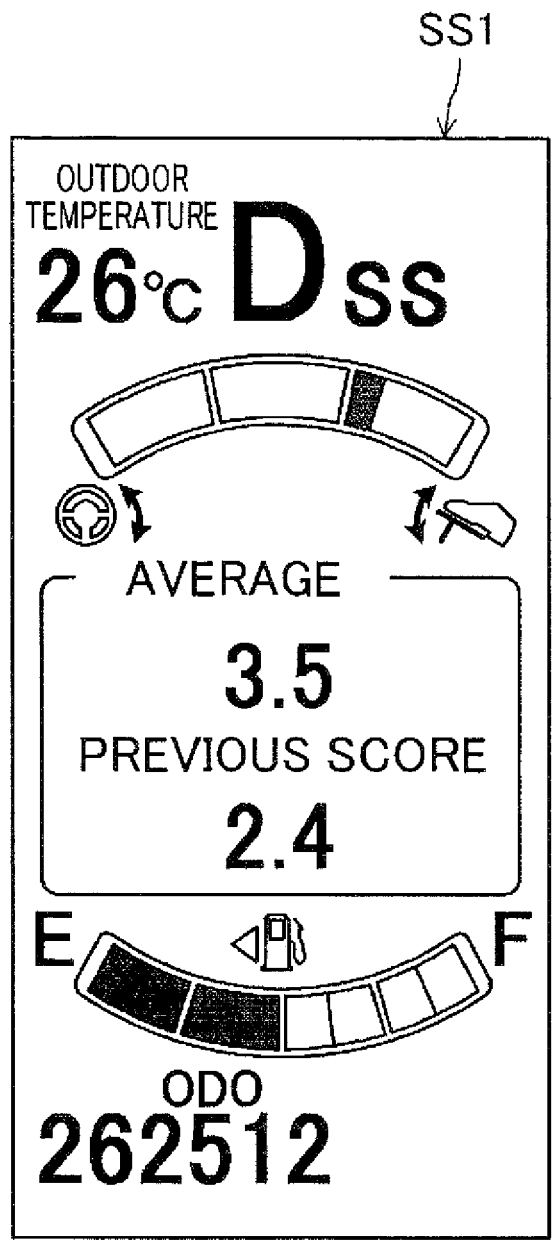
FIG. 33 shows an example of a first start screen.

Specifically, when it is determined that the ignition is off, the vehicle driving information regarding the previous drive of the vehicle is displayed for a predetermined time (for example, 5 seconds) on the display 60 as a first start screen, and thereafter the message information regarding the previous driving operation of the vehicle and the advice information regarding the current driving operation of the vehicle are displayed on the display 60 for a predetermined time (for example, 5 seconds) as a second start screen, and thereafter the first normal screen NS1 is displayed on the display 60. The first and second start screens will be described hereafter using FIG. 33 and FIG. 32. FIG. 33 shows an example of the first start screen SS1.

As shown in FIG. 33, the outdoor temperature, AT gear position, and CVT mode are displayed sequentially from the left, at the top of the first start screen SS1. In the example of FIG. 33, the outdoor temperature is displayed as "26 degrees Celsius", the AT gear position is displayed as "D", and the CVT mode is displayed as "SS" by characters.

The average and the previous score are displayed sequentially from the top, on the lower side of the display part of the outdoor temperature, AT gear position, and CVT mode in the first start screen SS1. For the previous score, the DS degree at the previous driving of the vehicle is indicated. In the example of FIG. 33, the average of "3.5" and the previous score of "2.4" are character-displayed.

The fuel gauge and the travel distance are displayed sequentially from the top, on the lower side of the display part of the previous score in the first start screen SS1. In the example of FIG. 30, the total travel distance of "262512" is character-displayed. Further, half of the calibrations of the fuel gauge is lighted and displayed.

The second start screen SS2 is completely the same as the second ending screen ES2 displayed in the previous drive of the vehicle.

Note that when the ignition is on, the driver is notified of the fluctuation of the stage by sound, if such a fluctuation occurs.

Further, a display form of the vehicle driving information on the display 60 is changed based on the driving operation state of the vehicle. Specifically, display color of the display part of the stage in the fifth normal screen NS5 and the first ending screen ES1 is changed, in accordance with the number of stages determined by the decision/determining part 30.

<<Determination/Evaluation Control of the Driving Operation State of the Vehicle>>

Figure 34:
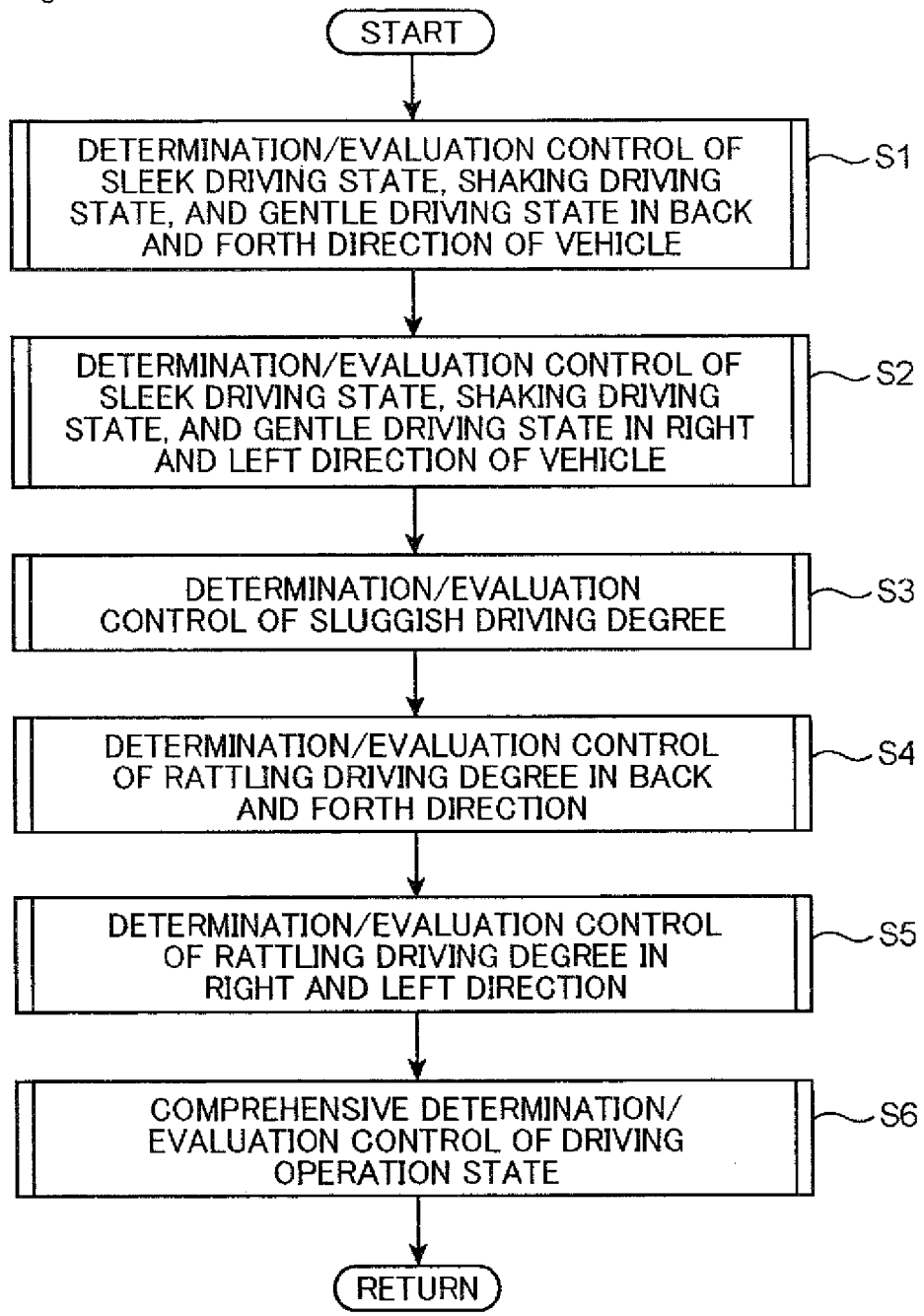
FIG. 34 is a flowchart showing determination/evaluation control of a driving operation state of a vehicle.

The determination/evaluation control of the driving operation state of the vehicle by the system-side controller 1 will be described using the flowchart of FIG. 34.

First, in step S1, the determination/evaluation control of the sleek driving state, the shaking driving state, and the gentle driving state is performed in the back and forth direction of the vehicle. In the subsequent step S2, the determination/evaluation control of the sleek driving state, the shaking driving state, and the gentle driving state is performed in the right and left direction of the vehicle. In the subsequent step S3, the determination/evaluation control of the sluggish driving degree is performed. In the subsequent step S4, the determination/evaluation control of the rattling driving degree is performed in the back and forth direction of the vehicle. In the subsequent step S5, the determination/evaluation control of the rattling driving degree is performed in the right and left direction of the vehicle. In the subsequent step S6, the comprehensive determination/evaluation of the driving operation state of the vehicle is performed. Details thereof will be described hereafter.

Figure 35:
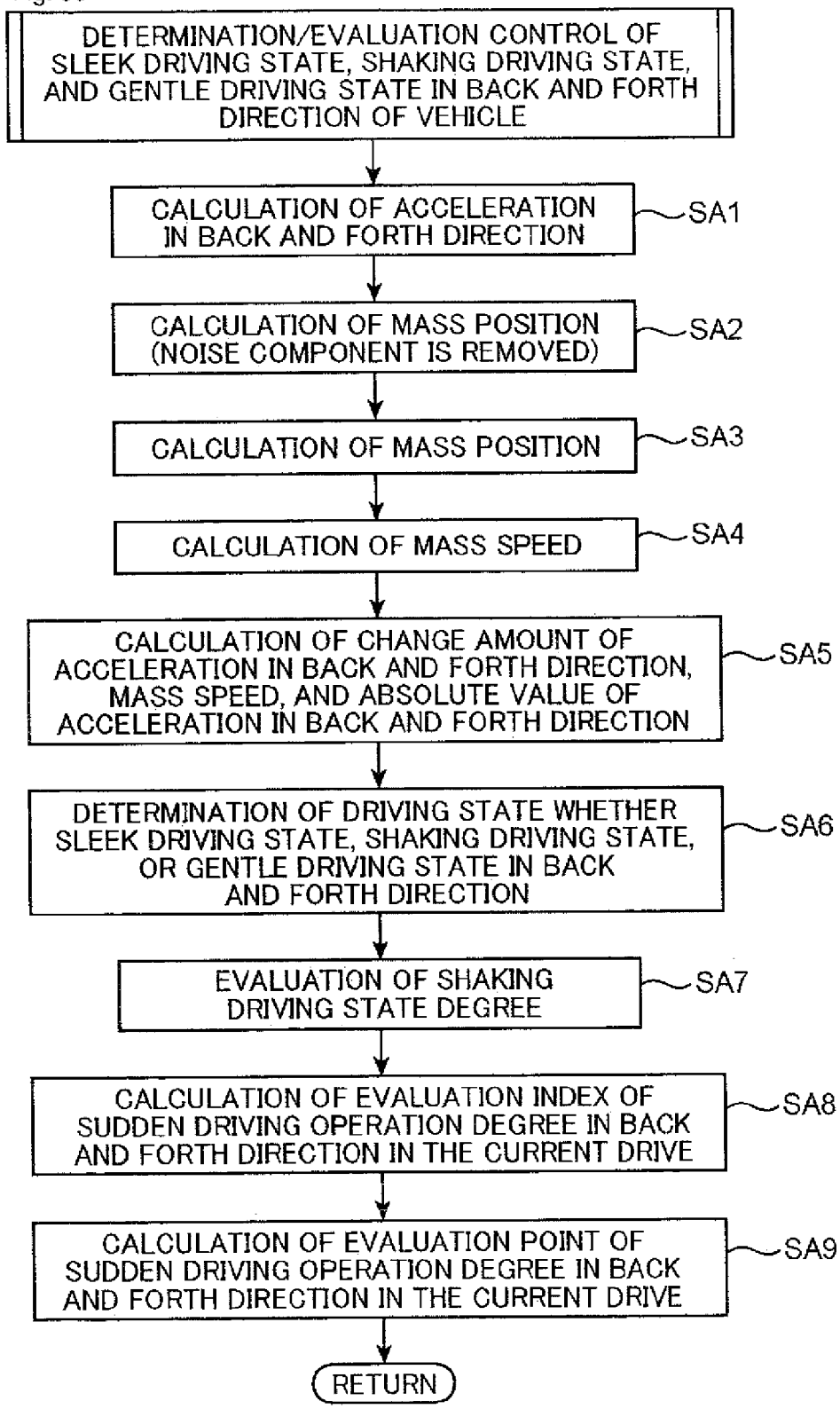
FIG. 35 is a flowchart showing determination/evaluation control of a sleek driving state, a shaking driving state, and a gentle driving state in the back and forth direction of the vehicle.

First, explanation will be given for the determination/evaluation control of the sleek driving state, the shaking driving state, and the gentle driving state in the back and forth direction of the vehicle in step S1, using the flowchart of FIG. 35.

First, in step SA1, the acceleration in the back and forth direction of the vehicle is calculated by differentiating the signal detected by the vehicle speed sensor 20 corresponding to the vehicle speed, with respect to time.

In the subsequent step SA2, the mass position is calculated as the acceleration in the back and forth direction of the vehicle, using the vibration model, from the acceleration in the back and forth direction of the vehicle calculated in step SA1, with high frequency noise component removed.

In the subsequent step SA3, the mass position is calculated from the acceleration in the back and forth direction of the vehicle with high frequency noise component removed, calculated in step SA2, by using the vibration model on the assumption that the passenger's head is moved by the change of the acceleration in the back and forth direction of the vehicle.

In the subsequent step SA4, the mass speed is calculated as the jerk in the back and forth direction of the vehicle, by differentiating the mass position calculated in step SA3, with respect to time.

In the subsequent step SA5, the change amount of the acceleration in the back and forth direction of the vehicle at a point when the input to the mass point is 0, and the mass speed at the end point of this change (at next 0 of the input to the mass point), and the absolute value of the acceleration in the back and forth direction of the vehicle at the end point of this change, are calculated by the change amount calculating part 10, the jerk calculating part 11, and the acceleration calculating part 12.

In the subsequent step SA6, the operation state determining part 13 determines the driving operation state using the first and second determination maps, whether it is the sleek driving state, the shaking driving state, or the gentle driving state in the back and forth direction of the vehicle, from the change amount of the acceleration in the back and forth direction of the vehicle calculated in step SA5, the mass speed at the end point of this change, and the absolute value of the acceleration in the back and forth direction of the vehicle at the end point of this change.

In the subsequent step SA7, when the driving operation state is determined as the shaking driving state in the back and forth direction in step SA6, the shaking driving state degree is evaluated by the operation state determining part 13.

In the subsequent step SA8, the operation state determining part 13 calculates the evaluation index of the sudden driving operation degree in the back and forth direction of the vehicle in the current drive of the vehicle.

In the subsequent step SA9, the operation state determining part 13 calculates the evaluation point of the sudden driving operation degree in the back and forth direction of the vehicle in the current drive of the vehicle, from the evaluation index calculated in step SA8. Thereafter, processing is advanced to return.

Figure 36:
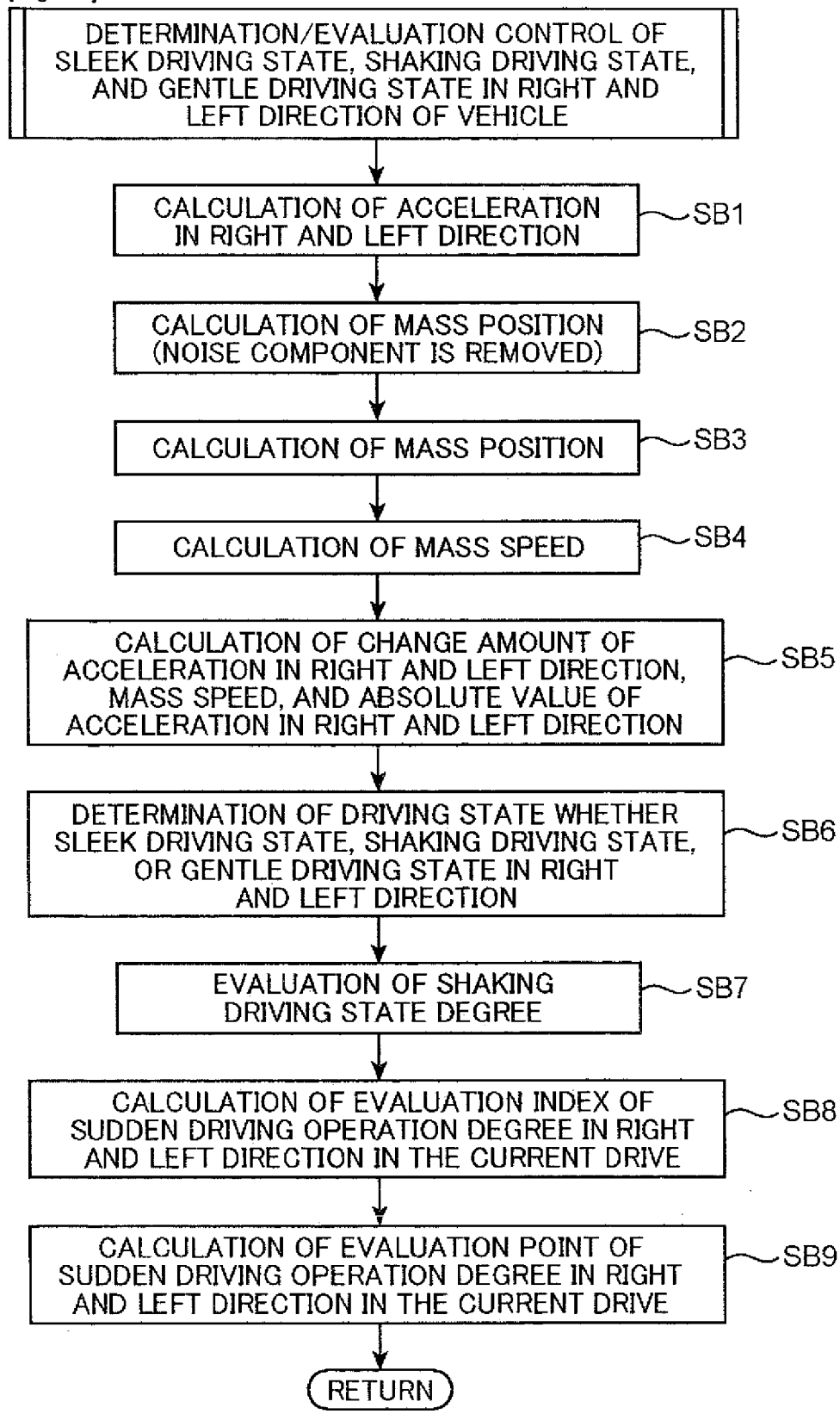
FIG. 36 is a flowchart showing determination/evaluation control of the sleek driving state, the shaking driving state, and the gentle driving state in the right and left direction of the vehicle.

Subsequently, explanation will be given for the determination/evaluation control of the sleek driving state, the shaking driving state, and the gentle driving state in the right and left direction of the vehicle in step S2, using the flowchart of FIG. 36.

First, in step SB1, the acceleration in the right and left direction of the vehicle is calculated, from the signals detected by the vehicle speed sensor 20 and the steering angle sensor 21.

In the subsequent step SB2, the mass position is calculated as the acceleration in the right and left direction of the vehicle with high frequency noise component removed, using the vibration model, from the acceleration in the right and left direction of the vehicle calculated in step SB1.

In the subsequent step SB3, the mass position is calculated from the acceleration in the right and left direction of the vehicle with high frequency noise component removed, calculated in step SB2, by using the vibration model on the assumption that the passenger's head is moved by the change of the acceleration in the right and left direction of the vehicle.

In the subsequent step SB4, the mass speed is calculated as the jerk in the right and left direction of the vehicle, by differentiating the mass position calculated in step SB3 with respect to time.

In the subsequent step SB5, the change amount of the acceleration in the back and forth direction of the vehicle at a point when the input to the mass point is 0, and the mass speed at the end point of this change, and the absolute value of the acceleration in the right and left direction of the vehicle at the end point of this change, are calculated by the change amount calculating part 10, the jerk calculating part 11, and the acceleration calculating part 12.

In the subsequent step SB6, the operation state determining part 13 determines the driving operation state using the first and second determination maps, whether it is the sleek driving state, the shaking driving state, or the gentle driving state in the back and forth direction of the vehicle, from the change amount of the acceleration in the right and left direction of the vehicle calculated in step SB5, the mass speed at the end point of this change, and the absolute value of the acceleration in the right and left direction of the vehicle at the end point of this change.

In step SB7, when the driving operation state is determined as the shaking driving state in the right and left direction in step SB6, the shaking driving state degree is evaluated by the operation state determining part 13.

In the subsequent step SB8, the evaluation index of the sudden driving operation degree in the right and left direction in the current drive of the vehicle is calculated by the operation state determining part 13.

In the subsequent step SA9, the operation state determining part 13 calculates the evaluation point of the sudden driving operation degree in the right and left direction of the vehicle in the current drive of the vehicle, from the evaluation index calculated in step SB8. Thereafter, processing is advanced to return.

Figure 37:
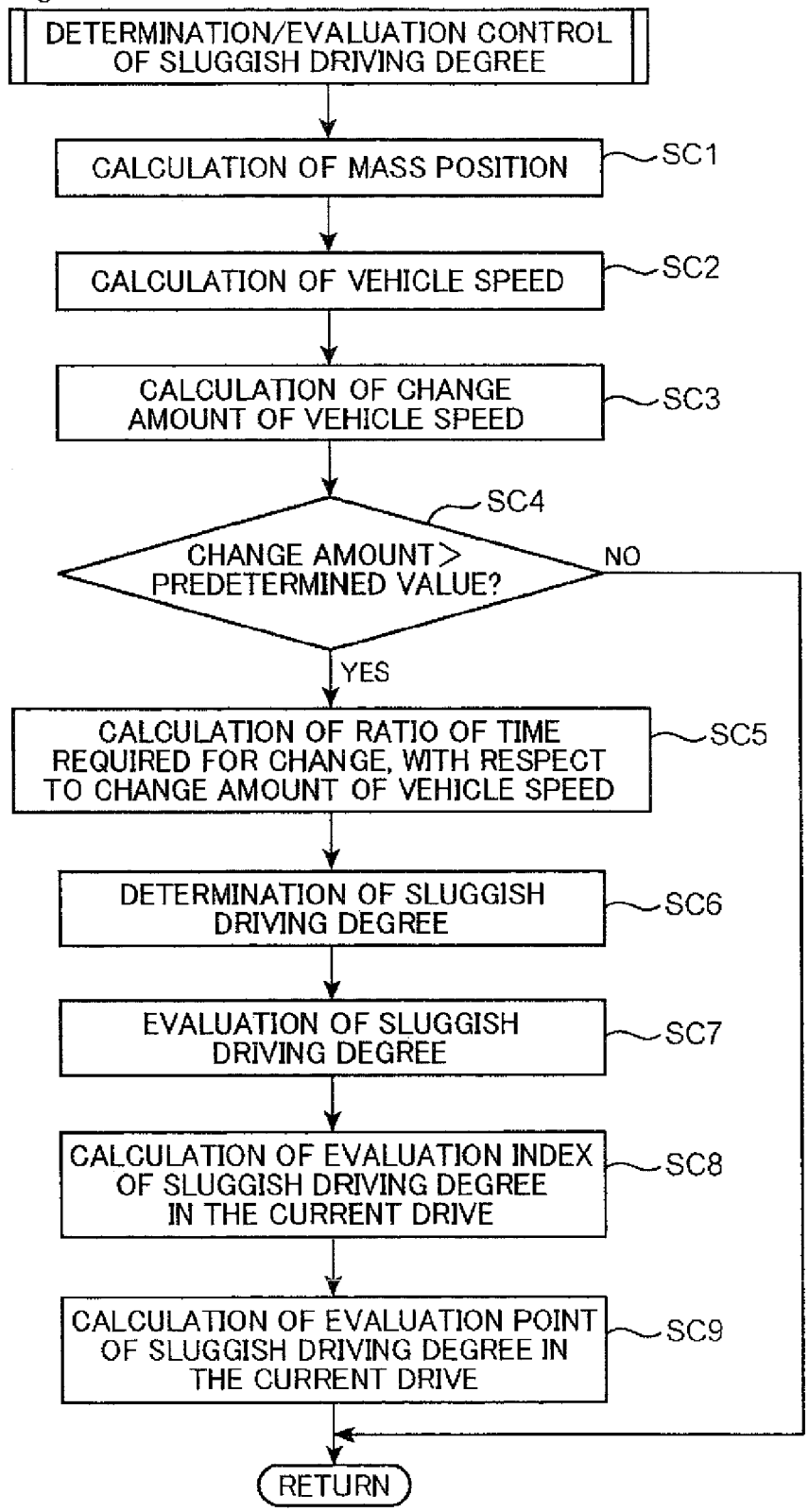
FIG. 37 is a flowchart showing determination/evaluation control of a sluggish driving degree.

Subsequently, explanation will be given for the determination/evaluation control of the sluggish driving degree in the aforementioned step S3, using the flowchart of FIG. 37.

First, in step SC1, the mass position is calculated from the acceleration in the back and forth direction of the vehicle calculated by a ratio calculation part 15 in the aforementioned step SA2 with high frequency noise component removed, calculated by using the vibration model, on the assumption that a rough change occurs in the vehicle speed.

In the subsequent step SC2, the ratio calculating part 15 calculates the vehicle speed by integrating the mass position calculated in step SC1 with respect to time.

In the subsequent step SC3, the ratio calculating part 15 calculates the change amount of the vehicle speed in a period from 0 to the next 0 of the acceleration of the vehicle.

In the subsequent step SC4, the ratio calculating part 15 determines whether or not the change amount of the vehicle speed calculated in step SC3 is larger than a predetermined value. When it is larger than the predetermined value (in a case of YES), the processing is advanced to step SC5, and when it is the predetermined value or less (in a case of NO), the processing is advanced to return.

In step SC5, the ratio calculating part 15 calculates the ratio of the time required for change, with respect to the change amount of the vehicle speed calculated in step SC3.

In the subsequent step SC6, the sluggish driving degree determining part 16 compares the magnitude correlation, between the ratio of the time required for change with respect to the change amount of the vehicle speed which is calculated in step SC5, and first to fourth threshold values. Then, from this comparison result, the sluggish driving degree is determined.

In the subsequent step SC7, the sluggish driving degree is evaluated by the sluggish driving degree determining part 16.

In the subsequent step SC8, the sluggish driving degree determining part 16 calculates the evaluation index of the sluggish driving degree in the current drive of the vehicle.

In the subsequent step SC9, the sluggish driving degree determining part 16 calculates the evaluation point of the sluggish driving degree in the current drive of the vehicle, from the evaluation index calculated in step SC8. Then, the processing is advanced to return.

Figure 38:
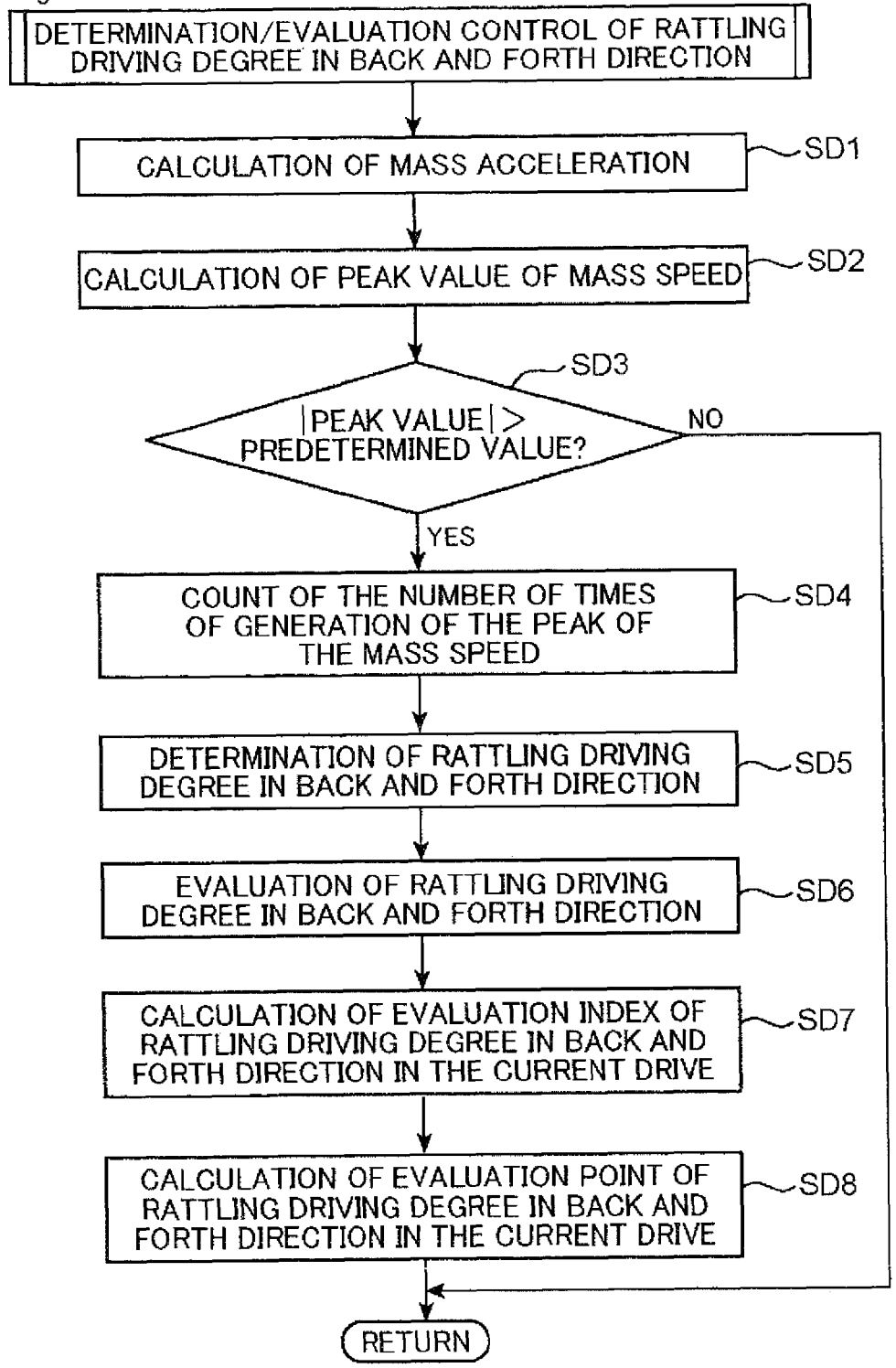
FIG. 38 is a flowchart showing determination/evaluation control of a rattling driving degree in the back and forth direction of the vehicle.

Subsequently, the determination/evaluation control of the rattling driving degree in the back and forth direction of the vehicle in the aforementioned step S4, will be described using the flowchart of FIG. 38.

First, in step SD1, the rattling driving degree determining part 14 calculates the mass acceleration by differentiating the mass speed calculated in the aforementioned step SA4.

In the subsequent step SD2, the rattling driving degree determining part 14 calculates the peak value of the mass speed at a point when the mass acceleration calculated in step SD1 is 0.

In the subsequent step SD3, the rattling driving degree determining part 14 determines whether or not the absolute value of the peak value of the mass speed calculated in step SD2, is larger than a predetermined value. When it is larger than the predetermined value (in a case of YES), the processing is advanced to step SD4, and when it is the predetermined value or less (in a case of NO), the processing is advance to return.

In step SD4, the rattling driving degree determining part 14 counts the number of generations of the peak of the mass speed per sample time calculated in step SD2.

In the subsequent step SD5, the rattling driving degree determining part 14 compares the magnitude correlation, between the number of times of generation of the peak of the mass speed per sample time counted in step SD4, and evaluation points of 2 to 5. From this comparison result, the rattling driving degree in the back and forth direction of the vehicle is determined.

In the subsequent step SD6, the rattling driving degree determining part 14 evaluates the rattling driving degree in the back and forth direction of the vehicle.

In the subsequent step SD7, the rattling driving degree determining part 14 calculates the evaluation index of the rattling driving degree in the back and forth direction of the vehicle in the current drive of the vehicle.

In the subsequent step SD8, the rattling driving degree determining part 14 calculates the evaluation point of the rattling driving degree in the back and forth direction of the vehicle in the current drive of the vehicle, from the evaluation index calculated in step SD7. Thereafter, the processing is advanced to return.

Figure 39:
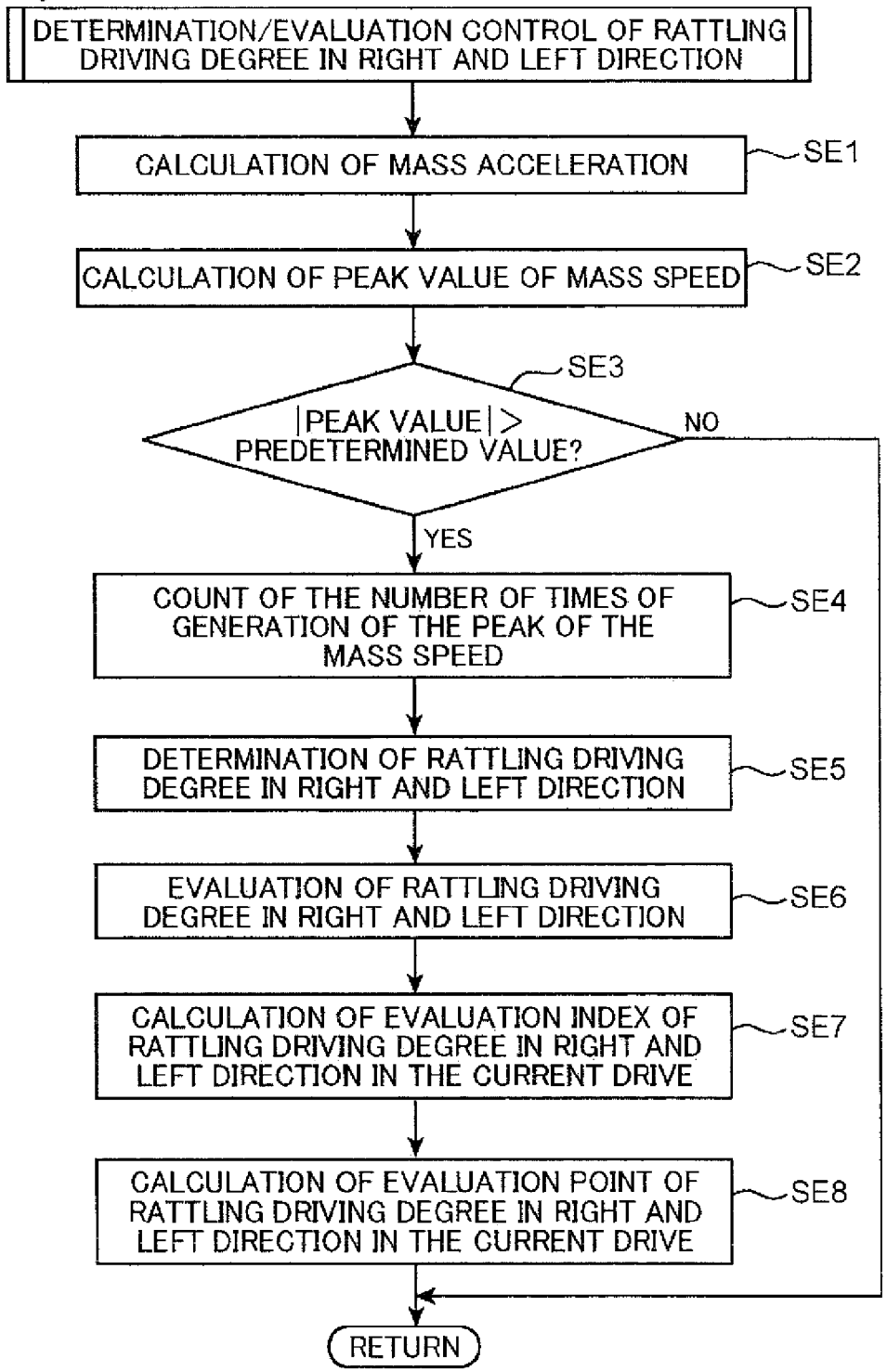
FIG. 39 is a flowchart showing determination/evaluation control of the rattling driving degree in the right and left direction of the vehicle.

Subsequently, explanation will be given for the determination/evaluation control of the rattling driving degree in the right and left direction of the vehicle in the aforementioned step S5, using the flowchart of FIG. 39.

First, in step SE1, the rattling driving degree determining part 14 calculates the mass acceleration by differentiating the mass speed calculated in the aforementioned step SB4.

In the subsequent step SE2, the rattling driving degree determining part 14 calculates the peak value of the mass speed at a point when the mass acceleration calculated in step SE1 is 0.

In the subsequent step SE3, the rattling driving degree determining part 14 determines whether or not the absolute value of the peak value of the mass speed calculated in step SE2 is larger than a predetermined value. When it is larger than the predetermined value (in a case of YES), the processing is advanced to step SE4, and when it is the predetermined value or less (in a case of NO), the processing is advance to return.

In step SE4, the rattling driving degree determining part 14 counts the number of times of generation of the peak of the mass speed per sample time calculated in step SE2.

In the subsequent step SE5, the rattling driving degree determining part 14 compares the magnitude correlation, between the number of times of generation of the peak of the mass speed per sample time counted in step SE4, and evaluation points of 2 to 5. From this comparison result, the rattling driving degree in the back and forth direction of the vehicle is determined.

In the subsequent step SE6, the rattling driving degree determining part 14 evaluates the rattling driving degree in the right and left direction of the vehicle.

In the subsequent step SE7, the rattling driving degree determining part 14 calculates the evaluation index of the rattling driving degree in the right and left direction of the vehicle in the current drive of the vehicle.

In the subsequent step SE8, the rattling driving degree determining part 14 calculates the evaluation point of the rattling driving degree in the right and left direction of the vehicle in the current drive of the vehicle, from the evaluation index calculated in step SE7. Thereafter, the processing is advanced to return.

Figure 40:
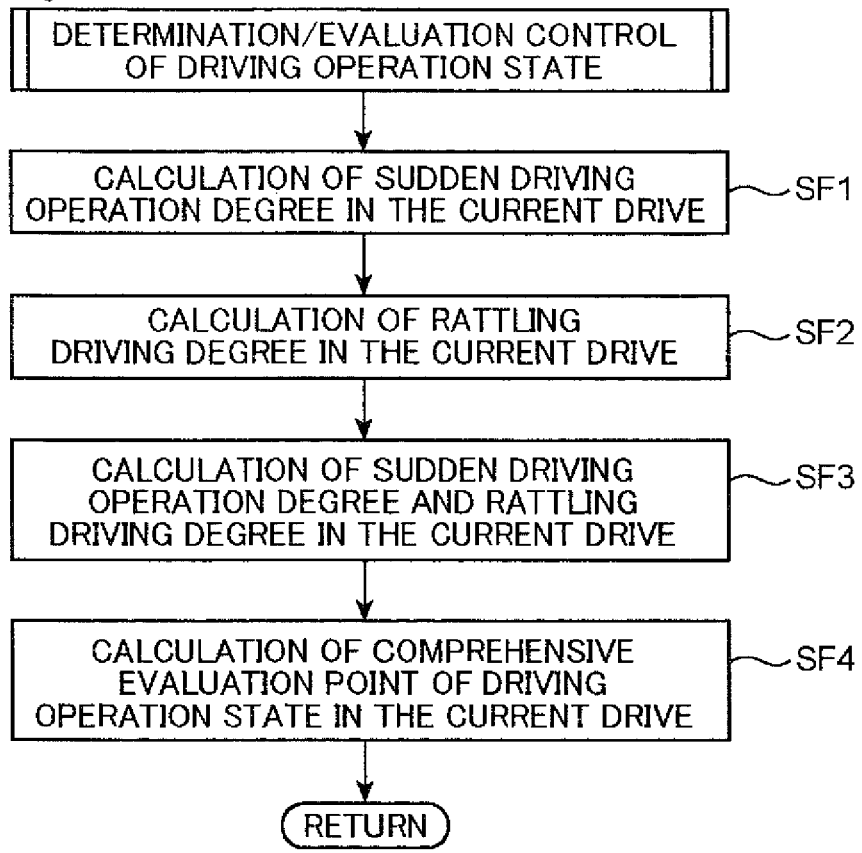
FIG. 40 is a flowchart showing a comprehensive determination/evaluation of the driving operation state of the vehicle.

Subsequently, explanation will be given for the comprehensive determination/evaluation control of the driving operation state of the vehicle in the aforementioned step S6, using the flowchart of FIG. 40.

First, in step SF1, the comprehensive determining part 17 calculates the evaluation index of the sudden driving operation degree in the current drive of the vehicle.

In the subsequent step SF2, the comprehensive determining part 17 calculates the evaluation index of the rattling driving degree in the current drive of the vehicle.

In the subsequent step SF3, the comprehensive determining part 17 calculates the sudden driving operation degree in the current drive of the vehicle, from the evaluation index calculated in step SF1, and calculates the evaluation point of the rattling driving degree in the current drive of the vehicle from the evaluation index calculated in step SF2.

In the subsequent step SF4, the comprehensive determining part 17 calculates the comprehensive evaluation point of the driving operation state in the current drive of the vehicle, from the evaluation point calculated in step SF3. Thereafter, the processing is advanced to return.

Figure 41:
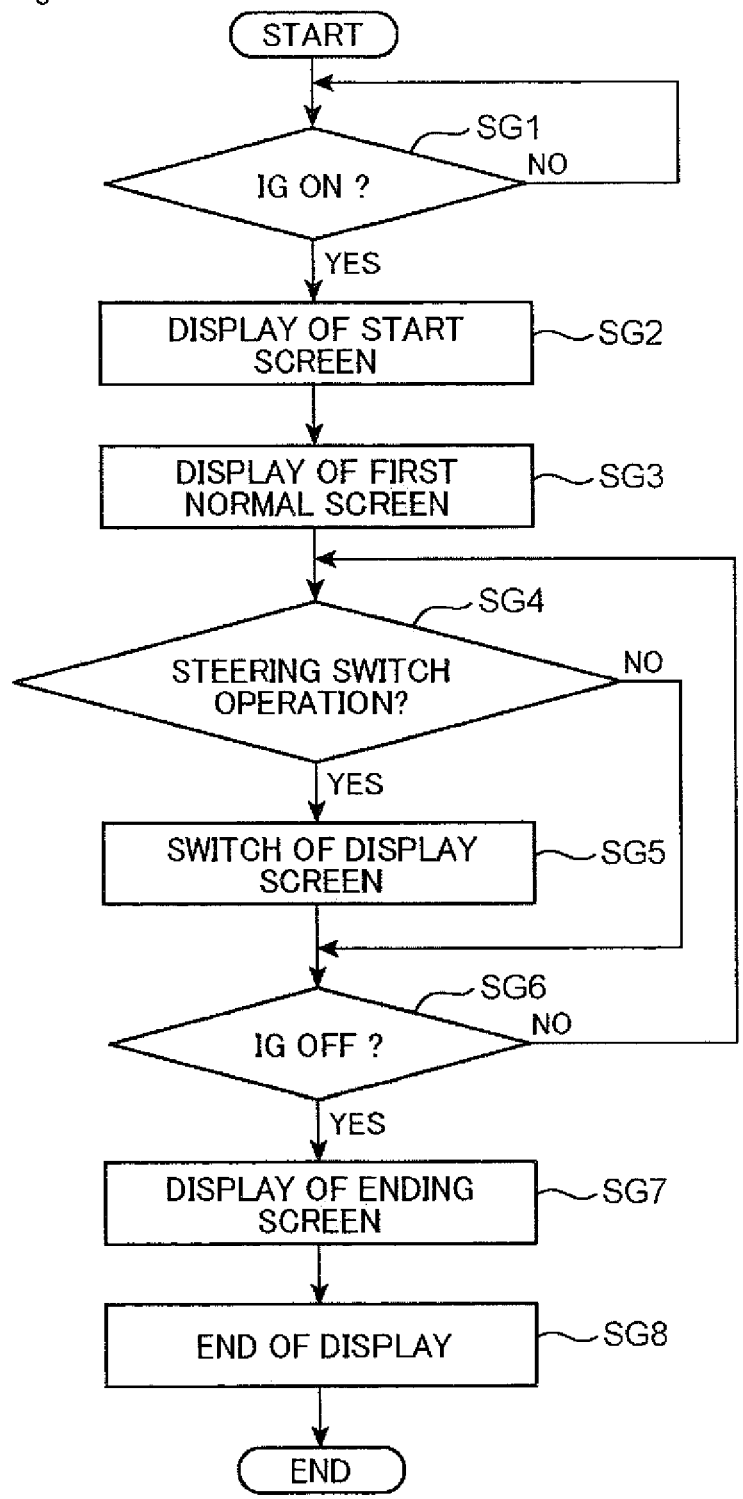
FIG. 41 is a flowchart showing a display control of vehicle driving information.

Further, explanation will be given for the display control of the vehicle driving information by the meter-side controller 3, using the flowchart of FIG. 41.

First, in step SG1, the display control part 31 determines whether or not the ignition is switched from off to on from the signal detected by the ignition sensor 40. When the ignition is on (in a case of YES), the processing is advanced to SG2, and when the ignition is not on (in a case of NO), the processing is returned to SG1.

In step SG2, the display control part 31 controls to display the first start screen SS1 (see FIG. 33) on the display 60, and thereafter displays the second start screen SS2 (see FIG. 32) on the display 60.

In the subsequent step SG3, the display control part 31 controls to display the first normal screen NS1 (see FIG. 23 to FIG. 26) on the display 60.

In the subsequent step SG4, the display control part 31 controls to determine whether or not the steering switch 50 is pressed and operated, from the signal detected by the steering sensor 41. When it is pressed and operated (in a case of YES), the processing is advanced to step SG5, and when it is not pressed and operated (in a case of NO), the processing is advanced to step SG6.

In step SG5, the display control part 31 controls to switch the display screen to the display 60. Specifically, whenever the steering switch 50 is pressed, the display screen is sequentially switched from the first normal screen NS1 to the second normal screen NS2 (see FIG. 27), the third normal screen NS3 (see FIG. 28), the fourth normal screen NS4 (see FIG. 29), and the fifth normal screen NS5 (see FIG. 30).

In step SG6, the display control part 31 controls to determine from the signal detected by the ignition sensor 40, whether or not the ignition is switched from on to off. When the ignition is off (in a case of YES), the processing is advanced to step SG7, and when the ignition is not off (in a case of NO), the processing is advanced to step SG4.

In step SG7, the display control part 31 displays the first ending screen ES1 (see FIG. 31) on the display 60, and thereafter displays the second ending screen ES2 (see FIG. 32) on the display 60.

In the subsequent step SG8, the display on the display 60 is ended. Thereafter, the processing is advanced to end.

As described above, the vehicle driving support device is capable of notifying the driver of the driving operation state of the vehicle driven by the driver, and notifying the driver of the driving operation state particularly when the acceleration of the vehicle is changed, and let the driver improve the driving operation skill by learning the driving operation state. Thus, a driving pleasure can be increased and an economical and environmentally-friendly driving can be realized. Specifically, an accelerating/decelerating driving, a turning driving, and a smooth driving are realized which are comfortable for the passenger, and with such a driving manner, wasteful acceleration/deceleration can be reduced, and the fuel consumption can be improved.

Effect

As described above, according to this embodiment, the driving operation state of the vehicle is determined based on the first correlation value correlated to the change amount of the acceleration of the vehicle, and the second correlation value correlated to the jerk of the vehicle, in accordance with the determination reference previously set based on the ratio of the kinetic energy of the mass point at the end point of the change when the acceleration of the vehicle is changed, with respect to the change amount of the acceleration of the vehicle calculated using the vibration model showing the movement of the mass point in the passenger compartment.

Further, the kinetic energy of the mass point is obtained by removing the influence of the kinetic energy of the mass point at the end point of the previous change of the acceleration of the vehicle. Therefore, the determination reference can be precisely set, and the driving operation state of the vehicle can be further precisely determined.

Further, when there is a change of the acceleration of the vehicle, and when the accelerator operation or the brake operation is performed by a certain operation amount or lower (when the accelerator operation and the brake operation are substantially not performed), the change of the acceleration is caused by a factor other than the driving operation of the vehicle (for example, caused by traveling of the vehicle on a bad road, such as a puddle or a bump), an in this state, the driving operation state of the vehicle is not determined, and therefore the driving operation state of the vehicle can be further precisely determined.

Further, when the accelerator operation or the brake operation is carried out by a certain operation amount or higher, with a certain frequency or higher, the driving operation state is determined as an unpreferable driving operation, irrespective of the magnitude of the first and second correlation values. Namely, when the accelerator operation, the brake operation, or the steering operation is repeatedly carried out for a short period of time (carried out at a predetermined cycle or less), the acceleration of the vehicle is not changed even if the driving operation of the vehicle (for example, the accelerator operation) is carried out, or the vibration model does not follow the frequency of the change of the acceleration which is caused by the driving operation (for example, the bake operation or the steering operation) of the vehicle, and the driving operation state of the vehicle can not be determined in accordance with the determination reference based on the first and second correlation values. Such a driving operation is regarded as an unpreferable driving operation state, and therefore is determined as the shaking driving state. Therefore, the driving operation state of the vehicle can be further precisely determined.

Further, the driving operation state is determined whether it is the sleek driving state or the gentle driving state or the shaking driving state exhibiting sudden change of the acceleration, in accordance with the determination reference, based on the first and second correlation values. Therefore, whether the driving operation state is the sleek driving state or the gentle driving state or the shaking driving state can be precisely determined.

Further, when the driving operation state is determined as the sleek driving state or the gentle driving state, and when the first correlation value is equal to a predetermined value or more, the driving operation state is determined as the sleek driving state exhibiting moderate change of the acceleration. Meanwhile, when the first correlation value is smaller than a predetermined value, the driving operation state is determined as the gentle driving state exhibiting slow change of the acceleration. Therefore, whether the driving operation state is the sleek driving state or the gentle driving state can be precisely determined.

Further, the information regarding the driving operation state of the vehicle is displayed, and therefore the driver can know the information regarding the driving operation state, and based on such information, the vehicle driving operation skill can be improved.

Other Embodiments

According to the aforementioned embodiment, the second correlation value correlated to the jerk of the vehicle, is calculated using the vibration model, from the signals detected by the vehicle speed sensor 20 and the steering angle sensor 21. However, the embodiment is not limited thereto, and for example, the second correlation value may also be calculated using the vibration model, from the signals detected by a vehicle back and forth direction G sensor and a vehicle right and left direction G sensor.

Further, according to the aforementioned embodiment, the advice information regarding the next driving operation of the vehicle is displayed on the display 60, when the SD degree in the current drive of the vehicle is lower than a predetermined score. However, the driver may be notified of such information by sound. Further, instead of displaying the advice information on the display 60, or in addition to displaying the advice information on the display 60, a message showing that the SD degree in the current drive of the vehicle is lower than the predetermined score, may be displayed on the display 60 or may notify the driver of this message by sound (notification unit).

Figure 42:
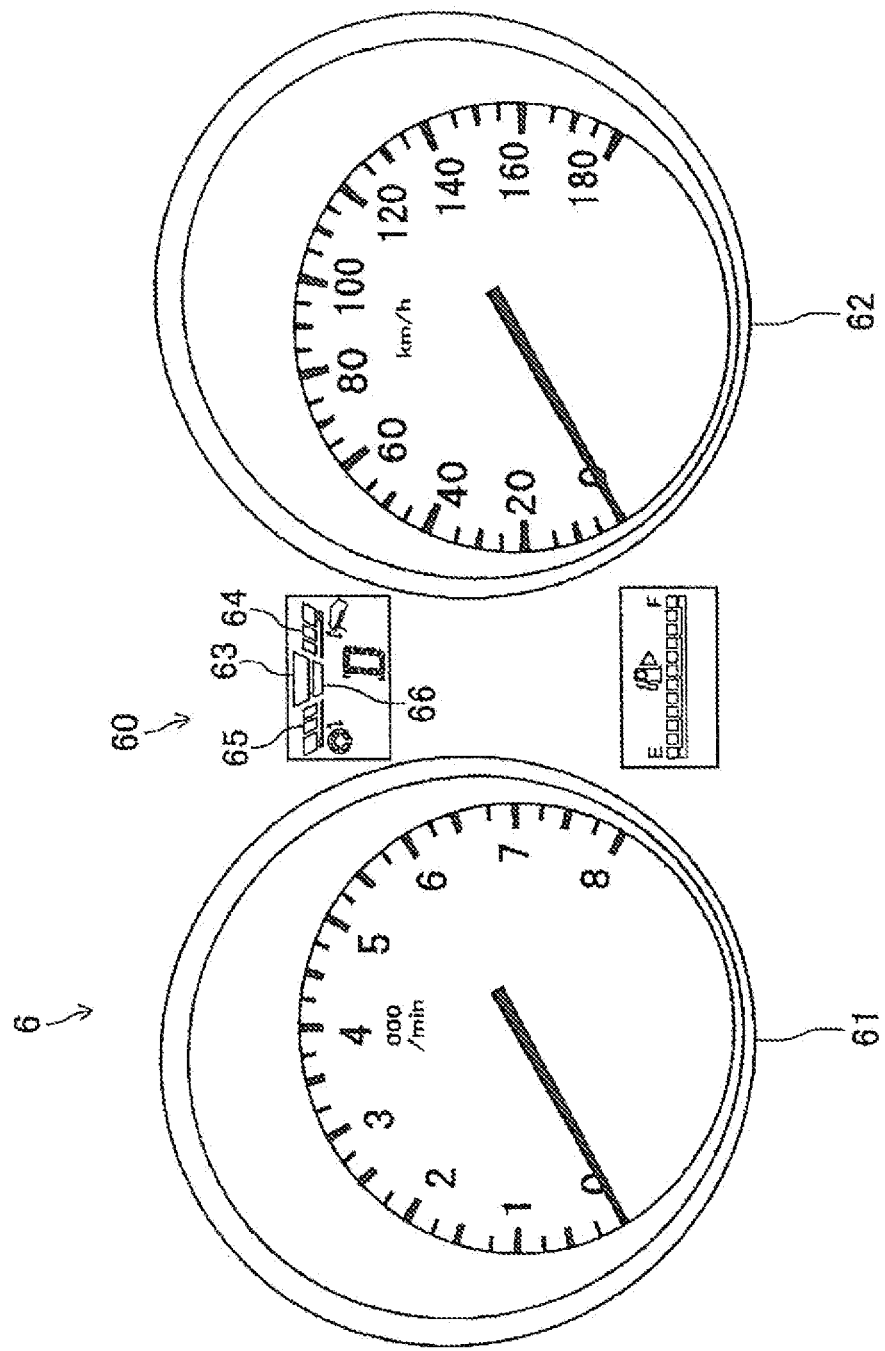
FIG. 42 is a front view showing a modified example of a meter indicator.

Further, according to the aforementioned embodiment, the display 60 is provided at a right end part of a meter indicator 6. However, as shown in FIG. 42, the display 60 may also be provided in a center part of the meter indicator 6 in the right and left direction of the vehicle. At this time, the engine speed display part 61 is disposed at a left side of the display 60, and the vehicle speed display part 62 is disposed at a right side of the display 60 respectively. In the example of FIG. 42, the gentle drive display part 66 is provided on the lower side of the sleek drive display part 63, and the sleek drive display part 63 (or the gentle drive display part 66), the back and forth shaking drive display part 64, and the right and left shaking drive display part 65 are respectively disposed in parallel with each other in the right and left direction of the vehicle.

Further, according to the aforementioned embodiment, the sleek drive display part 63 (or the gentle drive display part 66), the back and forth shaking drive display part 64, and the right and left shaking drive display part 65 are disposed in parallel with each other in the right and left direction of the vehicle. However, they may be disposed as described below.

Figure 43:
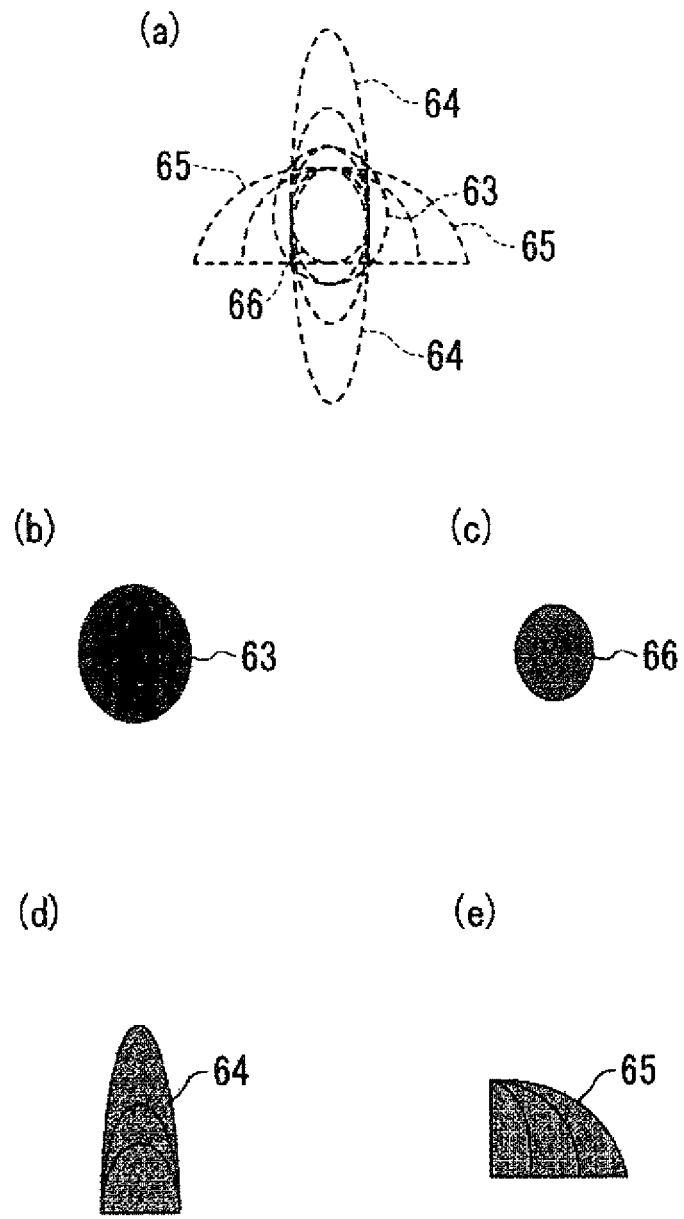

In the example of FIG. 43, the gentle drive display part 66 is provided at the same position as the position of the sleek drive display part 63. Further, the back and forth shaking drive display part 64 and the right and left shaking drive display part 65 are provided around the sleek drive display part 63 (or the gentle drive display part 66).

Specifically, the back and forth shaking drive display part 64 is disposed at vertical both sides of the sleek drive display part 63 (or the gentle drive display part 66), and the right and left shaking drive display part 65 is disposed at both sides of the sleek drive display part 63 (or the gentle drive display part 66) in the right and left direction of the vehicle. The sleek drive display part 63 and the gentle drive display part 66 are formed into circular shapes, and the back and forth shaking drive display part 64 and the right and left shaking drive display part 65 are formed into tapered shapes tapered from inside toward outside. The sleek drive display part 63 has an area larger than the area of the gentle drive display part 66.

Then, when the driving operation state is determined as the sleek driving state, the sleek drive display part 63 (see FIG. 43(b)) is lighted and displayed, and when the driving operation state is determined as the gentle driving state, the gentle drive display part 66 (see FIG. 43(c)) is lighted and displayed. Meanwhile, when the driving operation state is determined as the shaking driving state in the back and forth direction of the vehicle, the upper side back and forth shaking drive display part 64 (see FIG. 43(d)) is displayed in steps, and when it is determined as the shaking driving state in the back direction, the lower side back and forth shaking drive display part 64 is displayed in steps, and when the driving operation state is determined as the shaking driving state at the left side in the right and left direction of the vehicle, the right and left shaking drive display part 65 at the left side is displayed in steps, and when the driving operation state is determined as the shaking driving state at the right side, right and left drive display part 65 at the right side (see FIG. 43(e)) is displayed in steps.

Namely, the shaking drive display parts 64, 65 display the information regarding the direction (direction in which sudden change of acceleration occurs) determined as the shaking driving state, in such a manner that a driver can recognize this direction.

Figure 44:
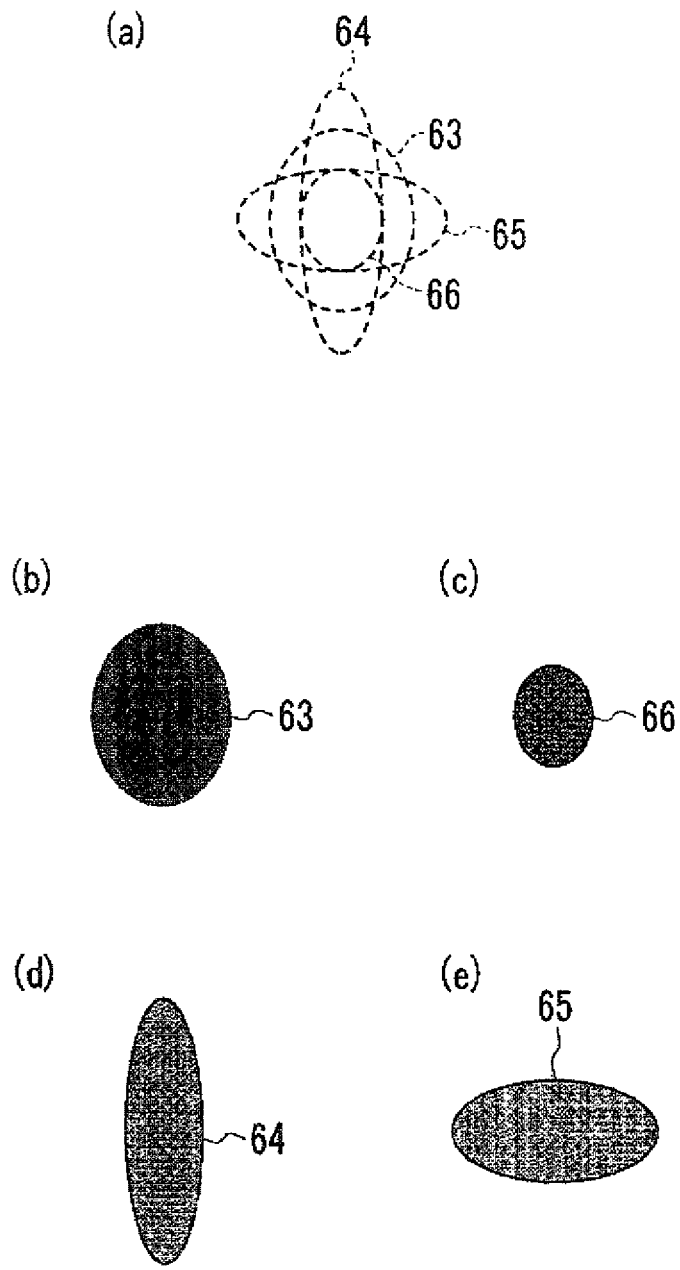

In the example of FIG. 44, the gentle drive display part 66 is provided at the same position as the position of the sleek drive display part 63. Further, the back and forth shaking drive display part 64 is provided to extend vertically through the sleek drive display part 63 (or the gentle drive display part 66), and the right and left shaking drive display part 65 is provided to extend in the right and left direction of the vehicle through the sleek drive display par 63 (or the gentle drive display part 66). The sleek drive display part 63 and the gentle drive display part 66 are formed into circular shapes, and the back and forth shaking drive display part 64 and the right and left shaking drive display part 65 are formed into ellipsoidal shapes.

The sleek drive display part 63 has an area larger than the area of the gentle drive display part 66. Then, when the driving operation state is determined as the sleek driving state, the sleek drive display part 63 (see FIG. 44(b)) is lighted and displayed, and when the driving operation state is determined as the gentle driving state, the gentle drive display part 66 (see FIG. 44(c)) is lighted and displayed. Meanwhile, when the driving state is determined as the shaking driving state in the back and forth direction of the vehicle, the back and forth shaking drive display part 64 (see FIG. 44(d)) is lighted and displayed, and when the driving state is determined as the shaking drive state in the right and left direction of the vehicle, the right and left shaking drive display part 65 is lighted and displayed.

Namely, the shaking drive display parts 64, 65 display the information regarding the direction determined as the shaking driving state, in such a manner that a driver can recognize this direction.

As described above, according to the example of these figures, the information is displayed regarding the direction in which sudden change of acceleration occurs, in such a manner that a driver can recognize this direction. Therefore, the driver can know the direction in which sudden change of acceleration occurs at a first glance, and based on such information, the vehicle driving operation skill can be improved.

SUMMARY OF THE EMBODIMENTS

In one aspect of the present invention, there is provided a vehicle driving support device that supports driving of a vehicle, which comprises: a change amount calculation unit that calculates a first correlation value correlated to a change amount of an acceleration of the vehicle; a jerk calculation unit that calculates a second correlation value correlated to a jerk of the vehicle; and an operation state determination unit that determines a driving operation state of the vehicle, wherein based on the first correlation value and the second correlation value, the operation state determination unit calculates a ratio of a kinetic energy of a mass point to the change amount of the acceleration of the vehicle, at an end point of a change when the acceleration of the vehicle is changed, by using a vibration model showing a movement of the mass point in a passenger compartment, and the operation state determination unit determines a driving operation state of the vehicle in accordance with a determination reference in which the ratio of the kinetic energy to the change amount of the acceleration is previously set.

According to this structure, based on the first correlation value and the second correlation value, the operation state determination unit calculates the ratio of the kinetic energy of the mass point at the end point of the change when the acceleration of the vehicle is changed, with respect to the change amount of the acceleration of the vehicle, using the vibration model showing the movement of the mass point in the passenger compartment, and determines the driving operation state of the vehicle in accordance with the determination reference in which the ratio of the kinetic energy with respect to the change amount of the acceleration is previously set. Therefore, the driving operation state of the vehicle can be precisely determined.

In a second aspect of the present invention according to the first aspect, the kinetic energy of the mass point is obtained by removing an influence of the kinetic energy of the mass point at the end point of the previous change of the acceleration of the vehicle.

According to this structure, the kinetic energy of the mass point is obtained by removing the influence of the kinetic energy of the mass point at the end point of the previous change of the acceleration of the vehicle. Therefore, the determination reference can be precisely set, and the driving operation state of the vehicle can be further precisely determined.

In a third aspect of the present invention according to the first aspect, the operation state determination unit does not determine the driving operation state of the vehicle, when there is a change of the acceleration of the vehicle, and when an accelerator operation or a brake operation is carried out by a certain operation amount or lower.

According to this structure, when there is the change of the acceleration of the vehicle, and when the accelerator operation or brake operation is carried out by a certain operation amount or lower (when the accelerator operation and the brake operation are not substantially carried out), the change of the acceleration is caused by a factor other than the driving operation (for example, caused by traveling of the vehicle on a bad road, such as a puddle or a bump), and therefore the driving operation state of the vehicle is not determined. Accordingly, the driving operation state of the vehicle can be further precisely determined.

In a fourth aspect of the present invention according to the first aspect, the operation state determination unit is configured to determine the driving operation state as an unpreferable driving operation state, irrespective of magnitudes of the first and second correlation values, when the accelerator operation, the brake operation or a steering operation is carried out by a certain operation amount or higher, with a certain frequency or higher.

According to this structure, the driving operation state is determined as the unpreferable driving operation state, irrespective of the magnitudes of the first and second correlation values, when the accelerator operation, the brake operation, or the steering operation is carried out by a certain operation amount or higher at a certain frequency or higher. Namely, when the accelerator operation, the brake operation, or the steering operation is repeatedly carried out for a short period of time (carried out at a predetermined cycle or less), the acceleration of the vehicle is not changed even if the driving operation of the vehicle (for example, the accelerator operation) is carried out, or the vibration model does not follow the frequency of the change of the acceleration which is caused by the driving operation (for example, the bake operation or the steering operation) of the vehicle, and the driving operation state of the vehicle can not be determined in accordance with the determination reference based on the first and second correlation values. Such a driving operation is regarded as an unpreferable driving operation state, and therefore is determined as the unpreferable driving state. Therefore, the driving operation state of the vehicle can be further precisely determined.

In a fifth aspect of the present invention according to the first aspect, the operation state determination unit is configured to determine whether the driving operation state is a preferable driving operation state or an unpreferable driving operation state exhibiting sudden change of acceleration, based on the first and second correlation values, in accordance with the determination reference.

According to this structure, on the basis of the first and second correlated values, the driving operation state is determined whether it is the preferable driving operation state or the unpreferable driving operation state exhibiting sudden change of acceleration. Therefore, the driving operation state can be precisely determined whether it is the preferable driving operation state or the driving operation state exhibiting sudden change of acceleration.

In a sixth aspect of the present invention according to the fifth aspect, on condition that the operation state determination unit determines the driving operation state as the preferable driving operation state, when the first correlation value is equal to a predetermined value or more, the operation state determination unit determines the driving operation state to be a state exhibiting moderate change of acceleration, and when the first correlation value is smaller than the predetermined value, determines the driving operation state to be a state exhibiting slow change of acceleration.

According to this structure, when the driving operation state is determined as the preferable driving operation state and when the first correlation value is the predetermined value or more, this driving operation state is determined as the state exhibiting moderate change of acceleration, and when the first correlation value is smaller than the predetermined value, this driving operation state is determined as the state exhibiting slow change of acceleration. Therefore, whether the driving operation state is the state exhibiting moderate change of acceleration or the state exhibiting slow change of acceleration, can be precisely determined.

In a seventh aspect of the present invention according to the first aspect, an acceleration calculation unit is further provided, which calculates a third correlation value correlated to an absolute value of the acceleration of the vehicle, wherein when the first correlation value calculated by the change amount calculation unit is a predetermined value or higher, based on the first correlation value and the second correlation value, and by using a first determination map, the operation state determination unit calculates the ratio of the kinetic energy of the mass point to the change amount of the acceleration of the vehicle at the end point of the change when the acceleration of the vehicle is changed by using the vibration model showing the movement of the mass point in the passenger compartment, and determines the driving operation state of the vehicle in accordance with the determination reference in which the ratio of the kinetic energy to the change amount of the acceleration is previously set, and when the first correlation value is smaller than the predetermined value, the driving operation state of the vehicle is determined based on the first correlation value and the third correlation value by using a second determination map different from the first determination map.

According to this structure, when the first correlation value correlated to the change amount of the acceleration of the vehicle is equal to the predetermined value or more, based on the first correlation value and the second correlation value, and by using a first determination map, the operation state determination unit calculates the ratio of the kinetic energy of the mass point at the end point of the change when the acceleration of the vehicle is changed, with respect to the change amount of the acceleration of the vehicle, using the vibration model showing the movement of the mass point in the passenger compartment, and determines the driving operation state of the vehicle in accordance with the determination reference in which the ratio of the kinetic energy with respect to the change amount of the acceleration is previously set, and when the first correlation value is smaller than the predetermined value, the driving operation state of the vehicle is determined based on the first correlation value and the third correlation value, using a second determination map different from the first determination map. Therefore, the driving operation state of the vehicle can be precisely determined, irrespective of the magnitude of the change amount of the acceleration.

In an eighth aspect of the present invention according to the seventh aspect, the operation state determination unit determines whether the driving operation state is the state exhibiting moderate acceleration, when the first correlation value is smaller than the predetermined value.

According to this structure, when the first correlation value is smaller than the predetermined value, whether the driving operation state is the state exhibiting moderate acceleration is determined. Therefore, when the first correlation value is smaller than the predetermined value, whether the driving operation state is the state exhibiting moderate acceleration can be precisely determined.

In a ninth aspect of the present invention according to the first aspect, the operation state determination unit determines whether the driving operation state of the vehicle is a first driving operation state exhibiting moderate change of acceleration or a second driving operation state exhibiting sudden change of acceleration in accordance with the determination reference, and said the vehicle driving support device further comprises a comprehensive device unit which calculates a score of a determination result determined by the operation state determination unit in the current drive of the vehicle, and calculates a first evaluation index by dividing the score by the number of times of determinations by the operation state determination unit in the current drive of the vehicle, and calculates a comprehensive evaluation point of the driving operation state in the current drive of the vehicle based on the first evaluation index.

According to this structure, the driving operation state of the vehicle can be precisely determined, and the driver can know the information regarding the comprehensive evaluation of the driving operation state in the current drive of the vehicle at the end point of the drive, and based on such information, a driving operation skill in the next drive of the vehicle can be improved.

In a tenth aspect of the present invention according to the ninth aspect, a rattling driving degree determination unit is further provided, which determines a degree of a rattling drive related to a generation of a peak of a speed of the mass point in the vibration model, wherein the comprehensive determination unit calculates the score of a determination result determined by the rattling driving degree determination unit in the current drive of the vehicle, and calculates a second evaluation index by dividing the score by a determination time or the number of times of determinations by the rattling driving degree determination unit in the current drive of the vehicle, and calculates first and second evaluation points based on the first and second evaluation indexes, and calculates the comprehensive evaluation point of the driving operation state in the current drive of the vehicle based on the first and second evaluation points.

According to this structure, the driver can accurately know the information regarding the comprehensive evaluation of the driving operation state in the current drive of the vehicle.

In an eleventh aspect of the present invention according to the tenth aspect, the comprehensive determination unit weights the first and second evaluation points, so that the first evaluation point is more weighted than the second evaluation point, and calculates the comprehensive evaluation point of the driving operation state in the current drive of the vehicle.

According to this structure, the driver can know the information regarding the comprehensive evaluation of the driving operation state whether it is the first driving operation state or the second driving operation state in the current drive of the vehicle, wherein the first and second evaluation points are more weighted than the evaluation of the rattling driving degree.

In a twelfth aspect of the present invention according to the ninth aspect, a notification unit is further provided, which notifies a driver of at least one of the information that the comprehensive evaluation point, which is calculated by the comprehensive determination unit, is lower than a predetermined point, and advice information regarding driving operation of the vehicle.

According to this structure, the driver can know the information regarding a relatively lower comprehensive evaluation of the driving operation state in the current drive of the vehicle, and the advice information regarding the driving operation of the vehicle. Therefore, based on such information, the driving operation skill in the current drive of the vehicle can be surely improved.

In a thirteenth aspect of the present invention according to the ninth aspect, a changing unit is further provided, which changes the determination reference based on the comprehensive evaluation point calculated by the comprehensive determination unit.

According to this structure, determination of the driving operation state of the vehicle can be made corresponding to the vehicle driving operation skill.

In a fourteenth aspect of the present invention according to the first aspect, a display unit is further provided, which displays information regarding the driving operation state determined by the operation state determination unit, wherein the display unit has a first display part that displays information regarding a preferable driving operation state, and a second display part that displays information regarding an unpreferable driving operation state, and the second display part includes one second display area and the other second display area which are provided at both sides of the first display part.

According to this structure, the driver can know the information regarding the driving operation state with no burdens on eyes, when the driving operation state is the preferable driving operation state or the unpreferable driving operation state, and based on such information, the vehicle driving operation skill can be improved.

In a fifteenth aspect of the present invention according to the fourteenth aspect, one second display area and the other second display area display information different from each other.

According to this structure, the driver can easily know the information regarding the unpreferable driving operation state in detail.

In a sixteenth aspect of the present invention according to the fifteenth aspect, the preferable driving operation state is a first driving operation state exhibiting moderate change of acceleration, the unpreferable driving operation state is a second driving operation state exhibiting sudden change of acceleration, and said one second display area displays information regarding the second driving operation state exhibiting sudden change of acceleration in a back and forth direction of a vehicle, and the other second display area displays information regarding the second driving operation state exhibiting sudden change of acceleration in a right and left direction of the vehicle.

According to this structure, the driver can easily know the information regarding the driving operation state, when the driving operation state is the state exhibiting sudden change of acceleration in the back and forth direction of the vehicle, and the state exhibiting sudden change of acceleration in the right and left direction of the vehicle.

In a seventeenth aspect of the present invention according to the sixteenth aspect, the display unit executes display on one of the first and second display parts.

According to this structure, the information is not simultaneously displayed on the first and second display parts, and the driver can easily know the information regarding the current driving operation state and change of the driving operation state.

In an eighteenth aspect of the present invention according to the seventeenth aspect, display colors in the first and second display parts are different from each other, and display colors in one second display area and the other second display area are the same as each other.

According to this structure, visibility of the information displayed in the first and second display parts can be improved, and the driver can more easily know the information regarding the current driving operation state and the change of the driving operation state.

In a nineteenth aspect of the present invention according to the eighteenth aspect, the first and second display parts are arranged side by side in a right and left direction of a vehicle, and the first display part is more protruded vertically than the second display part.

According to this structure, the first and second display parts are arranged side by side in the right and left direction of the vehicle. Therefore, the driver can know the information regarding the current driving operation state and the change of the driving operation state with no burdens on the eyes. Further, since the first display part is more protruded vertically than the second display part, the information regarding the first driving operation state can be displayed so as to be easy to understand, and therefore the driver can easily know such information.

In a twentieth aspect of the present invention according to the fourteenth aspect, the screen includes a third display part that displays information regarding a third driving operation state exhibiting slow change of acceleration, the first and second display parts are arranged side by side in a right and left direction of a vehicle, and the third display part is provided at the same position as the position of the first display part in the right and left direction of the vehicle.

According to this structure, the first and second display parts are arranged side by side in the right and left direction of the vehicle, and the third display part is provided at the same position as the position of the first display part in the right and left direction of the vehicle. Therefore, the driver can know the information regarding the driving operation state with reduced movement amount of a sight line, when the driving operation state is the first driving operation state, the second driving operation state, and the third driving operation state. Further, since the third display part is provided at the same position as the position of the first display part in the right and left direction of the vehicle, space of the first to third display parts can be reduced.

In a twenty-first aspect of the present invention according to the sixteenth aspect, the display unit displays information, in steps, regarding a degree of the second driving operation state on the second display part in a direction of separation from a first display part side, as the degree is increased.

According to this structure, the information regarding the degree of the second driving operation state can be displayed so as to be easy to understand, and the driver can more easily know the information regarding the degree of the second driving operation state.

In a twenty-second aspect of the present invention according to the fourteenth aspect, an area of the first display part is larger than an area of said one second display area, and is larger than an area of the other second display area.

According to this structure, the first display part has an area larger than the area of one second display area, and larger than the area of the other second display area, which constitute the second display part. Therefore, the information regarding the preferable driving operation state can be displayed so as to be easy to understand, and the driver can more easily know the information regarding the preferable driving operation state.

In a twenty-third aspect of the present invention according to the first aspect, the operation state determination unit determines whether the driving operation state is a first driving operation state exhibiting moderate change of acceleration, and has a display unit displaying vehicle driving information including information regarding the first driving operation state when the driving operation state is determined to be the first driving operation state.

According to this structure, the driver can know the information regarding the first driving operation state when the driving operation state is determined as the first driving operation state, and based on such information, the vehicle driving operation skill can be improved.

In a twenty-fourth aspect of the present invention according to the twenty-third aspect, the operation state determination unit determines whether a second driving operation state exhibiting sudden change of acceleration is established, and the display unit displays vehicle driving information including information regarding the second driving operation state, when the operation state determination unit determines that the second driving operation state is established.

According to this structure, the driver can know the information regarding the second driving operation state when the driving operation state is determined as the second driving operation state, and based on such information, the vehicle driving operation skill can be improved.

In a twenty-fifth aspect of the present invention according to the twenty-fourth aspect, the display unit displays information regarding a direction in which sudden change of acceleration has occurred in such a manner that a driver can recognize this direction.

According to this structure, the driver can recognize the direction in which sudden change of acceleration occurs, at a first glance, and based on such information, the vehicle driving operation skill can be improved.

In a twenty-sixth aspect of the present invention according to the twenty-third aspect, the operation state determination unit determines whether a third driving operation state exhibiting slow change of acceleration is established, and the display unit displays vehicle driving information including information regarding the third driving operation state, when the operation state determination unit determines that the third driving operation state is established.

According to this structure, the driver can know the information regarding the third driving operation state when the driving operation state is determined as the third driving operation state, and based on such information, the vehicle driving operation skill can be improved.

In a twenty-seventh aspect of the present invention according to the twenty-fourth aspect, a decision unit is further provided, which decides advice information regarding next driving operation of a vehicle, based on the information regarding the second driving operation state, wherein the display unit displays the advice information decided by the decision unit when ignition is off.

According to this structure, the driver can know the advice information regarding the next driving operation of the vehicle at the end point of a drive, and based on such information, the vehicle driving operation skill can be improved at the next driving time.

In a twenty-eighth aspect of the present invention according to the twenty-seventh aspect, the display unit displays vehicle driving information regarding the current drive of a vehicle when the ignition is off, and thereafter display advice information regarding next driving operation of the vehicle.

According to this structure, the driver can know the vehicle driving information regarding the current drive of the vehicle when driving is finished, and based on such information, the vehicle driving operation skill can be further improved at next driving time.

In a twenty-ninth aspect of the present invention according to the twenty-eighth aspect, the vehicle driving information regarding the current drive of the vehicle includes information regarding first and second driving operation states in the current drive of the vehicle, and information regarding echo-driving related to the current idling stop of the vehicle.

According to this structure, the driver can know the information regarding the current echo-driving of the vehicle when the driving is finished.

In a thirtieth aspect of the present invention according to the twenty-third aspect, when the ignition is on, the display unit displays vehicle driving information regarding the previous drive of a vehicle, and thereafter display vehicle driving information regarding the current drive of the vehicle.

According to this structure, the driver can know the vehicle driving information regarding the previous drive of the vehicle when driving is started, and based on such information, the vehicle driving operation skill can be further improved at current driving time.

In a thirty-first aspect of the present invention according to the twenty-fourth aspect, the display unit displays information regarding a degree of the second driving operation state in steps.

According to this structure, the driver can know the information regarding the degree of the second driving operation state at a first glance.

In a thirty-second aspect of the present invention according to the twenty-third aspect, the display unit changes a display form of the vehicle driving information based on a driving operation state of a vehicle.

According to this structure, the driver can know the driving operation state of the vehicle at a first glance.

In a thirty-third aspect of the present invention, there is provided a vehicle driving support method, including: a step of calculating a first correlation value correlated to a change amount of an acceleration of a vehicle; a step of calculating a second correlation value correlated to a jerk of the vehicle; and a step of determining a driving operation state of the vehicle, the step of determining a driving operation state of the vehicle further including: calculating a ratio of a kinetic energy of a mass point to the change amount of the acceleration of the vehicle at an end point of a change when the acceleration of the vehicle is changed, by using a vibration model showing a movement of the mass point in a passenger compartment, based on the first correlation value and the second correlation value; and determining the driving operation state of the vehicle based on the calculated ratio of the kinetic energy to the change amount of the acceleration in accordance with the predetermined determination reference.

According to the aforementioned support method, based on the first correlation value correlated to the change amount of the acceleration of the vehicle, and the second correlation value correlated to the jerk of the vehicle, the ratio of the kinetic energy of the mass point at the end point of the change when the acceleration of the vehicle is changed, with respect to the change amount of the acceleration of the vehicle, is calculated using the vibration model showing the movement of the mass point in the passenger compartment, and the driving operation state of the vehicle is determined in accordance with the determination reference in which the kinetic energy with respect to the change amount of the acceleration is previously set. Therefore, the driving operation state of the vehicle can be precisely determined.

INDUSTRIAL APPLICABILITY

As described above, the vehicle driving support device according to the present invention can be applied to a usage that requires precise determination of the driving operation state of the vehicle.

REFERENCE SIGNS LIST

1 System-side controller
3 Meter-side controller
5 Steering
6 Meter-side indicator
10 Change amount calculating part (change amount calculation unit)
11 Jerk calculating part (jerk calculation unit)
12 Acceleration calculating part (acceleration calculation unit)
13 Operation state determining part (operation state determination unit)
14 Rattling driving degree determining part (rattling driving degree determination unit)
15 Ratio calculating part
16 Sluggish driving degree determining part
17 Comprehensive determining part (comprehensive determination unit)
18 Changing part (changing unit)
20 Vehicle speed sensor
21 Steering angle sensor
22 Accelerator opening sensor
23 Brake liquid pressure sensor
30 Decision/determining part (deciding unit)
31 Display control part (display unit, notification unit)
40 Ignition sensor
41 Steering sensor
50 Steering switch
60 Display (display unit, notification unit)
61 Engine speed display part
62 Vehicle speed display part
63 Sleek drive display part (first display part)
64 Back and forth shaking drive display part (second display part)
65 Right and left shaking drive display part (second display part)
66 Gentle drive display part (third display part)

The invention claimed is:

1. A vehicle driving support device that supports driving of a vehicle, which includes at least one of an accelerator opening sensor, a speed sensor, a steering angle sensor, brake fluid pressure sensor, ignition sensor and a steering sensor providing signals to the vehicle driving support device, the vehicle driving support device comprising:
a controller to receiving signals from at least one of the sensors;
the controller includes:
a change amount calculation unit to calculate a first correlation value correlated to a change amount of an acceleration of the vehicle provided by the acceleration opening sensor;
a jerk calculation unit to calculate a second correlation value correlated to a jerk of the vehicle, the jerk being an acceleration change rate per unit time; and
an operation state determination unit to determine a driving operation state of the vehicle,
wherein based on the first correlation value and the second correlation value, the operation state determination unit is to calculate a ratio of a kinetic energy of a mass point to the change amount of the acceleration of the vehicle, at an end point of a change when the acceleration of the vehicle is changed, by using a vibration model showing a movement of the mass point in a passenger compartment, and the operation state determination unit is to determine a driving operation state of the vehicle in accordance with a determination reference in which the ratio of the kinetic energy to the change amount of the acceleration is previously set.

2. The vehicle driving support device according to claim 1, wherein the kinetic energy of the mass point is obtained by removing an influence of the kinetic energy of the mass point at the end point of the previous change of the acceleration of the vehicle.

3. The vehicle driving support device according to claim 1, wherein the operation state determination unit is configured to not determine the driving operation state of the vehicle, when there is a change of the acceleration of the vehicle, and when an accelerator operation or a brake operation is carried out by a certain operation amount or lower.

4. The vehicle driving support device according to claim 1, wherein the operation state determination unit is configured to determine the driving operation state as an unpreferable driving operation state, irrespective of magnitudes of the first and second correlation values, when the accelerator operation, the brake operation or a steering operation is carried out by a certain operation amount or higher, at a certain frequency or higher.

5. The vehicle driving support device according to claim 1, wherein the operation state determination unit is configured to determine whether the driving operation state is a preferable driving operation state or an unpreferable driving operation state exhibiting sudden change of acceleration, based on the first and second correlation values, in accordance with the determination reference.

6. The vehicle driving support device according to claim 5, wherein on condition that the operation state determination unit determines the driving operation state as the preferable driving operation state, when the first correlation value is equal to a predetermined value or more, the operation state determination unit is configured to determine the driving operation state to be a state exhibiting moderate change of acceleration, and when the first correlation value is smaller than the predetermined value, and is configured to determine the driving operation state to be a state exhibiting slow change of acceleration.

7. The vehicle driving support device according to claim 1, further comprising an acceleration calculation unit to calculate a third correlation value correlated to an absolute value of the acceleration of the vehicle, wherein
when the first correlation value calculated by the change amount calculation unit is a predetermined value or higher, based on the first correlation value and the second correlation value, and by using a first determination map, the operation state determination unit is configured to calculate the ratio of the kinetic energy of the mass point to the change amount of the acceleration of the vehicle at the end point of the change when the acceleration of the vehicle is changed by using the vibration model showing the movement of the mass point in the passenger compartment, and the operation state determination unit determines the driving operation state of the vehicle in accordance with the determination reference in which the ratio of the kinetic energy to the change amount of the acceleration is previously set, and
when the first correlation value is smaller than the predetermined value, the driving operation state of the vehicle is determined based on the first correlation value and the third correlation value by using a second determination map different from the first determination map.

8. The vehicle driving support device according to claim 7, wherein the operation state determination unit determines whether the driving operation state is the state exhibiting moderate acceleration, when the first correlation value is smaller than the predetermined value.

9. The vehicle driving support device according to claim 1, wherein the operation state determination unit is configured to determine whether the driving operation state of the vehicle is a first driving operation state exhibiting moderate change of acceleration or a second driving operation state exhibiting sudden change of acceleration in accordance with the determination reference;

said vehicle driving support device further comprising a comprehensive determination unit to calculate a score of a determination result determined by the operation state determination unit in the current drive of the vehicle, and to calculate a first evaluation index by dividing the score by the number of times of determinations by the operation state determination unit in the current drive of the vehicle, and to calculate a comprehensive evaluation point of the driving operation state in the current drive of the vehicle based on the first evaluation index.

10. The vehicle driving support device according to claim 9, further comprising a rattling driving degree determination unit to determine a degree of a rattling drive related to a generation of a peak of a speed of the mass point in the vibration model, wherein the comprehensive determination unit is configured to calculate the score of a determination result determined by the rattling driving degree determination unit in the current drive of the vehicle, and is configured to calculate a second evaluation index by dividing the score by a determination time or the number of times of determinations by the rattling driving degree determination unit in the current drive of the vehicle, and is configured to calculate first and second evaluation points based on the first and second evaluation indexes, and calculates the comprehensive evaluation point of the driving operation state in the current drive of the vehicle based on the first and second evaluation points.

11. The vehicle driving support device according to claim 10, wherein the comprehensive determination unit is configured to weight the first and second evaluation points, so that the first evaluation point is more weighted than the second evaluation point, and is configured to calculate the comprehensive evaluation point of the driving operation state in the current drive of the vehicle.

12. The vehicle driving support device according to claim 9, further comprising a notification unit to notify a driver of at least one of the information that the comprehensive evaluation point, which is calculated by the comprehensive determination unit, is lower than a predetermined point, and advices information regarding driving operation of the vehicle.

13. The vehicle driving support device according to claim 9, further comprising a changing unit to change the determination reference based on the comprehensive evaluation point calculated by the comprehensive determination unit.

14. The vehicle driving support device according to claim 1, further comprising a display unit to display information regarding the driving operation state determined by the operation state determination unit, wherein the display unit has a first display part that displays information regarding a preferable driving operation state, and a second display part that displays information regarding an unpreferable driving operation state, and the second display part includes one second display area and the other second display area which are provided at both sides of the first display part.

15. The vehicle driving support device according to claim 14, wherein said one second display area and the other second display area are configured to display information different from each other.

16. The vehicle driving support device according to claim 15, wherein the preferable driving operation state is a first driving operation state exhibiting moderate change of acceleration, the unpreferable driving operation state is a second driving operation state exhibiting sudden change of acceleration, and said one second display area displays information regarding the second driving operation state exhibiting sudden change of acceleration in a back and forth direction of a vehicle, and the other second display area is configured to display information regarding the second driving operation state exhibiting sudden change of acceleration in a right and left direction of the vehicle.

17. The vehicle driving support device according to claim 16, wherein the display unit executes display on one of the first and second display parts.

18. The vehicle driving support device according to claim 17, wherein display colors in the first and second display parts are different from each other, and display colors in said one second display area and said other second display area are the same as each other.

19. The vehicle driving support device according to claim 18, wherein the first and second display parts are arranged side by side in a right and left direction of a vehicle, and the first display part is more protruded vertically than the second display part.

20. The vehicle driving support device according to claim 14, wherein the screen includes a third display part configured to display information regarding a third driving operation state exhibiting slow change of acceleration, the first and second display parts are arranged side by side in a right and left direction of a vehicle, and the third display part is provided at the same position as the position of the first display part in the right and left direction of the vehicle.

21. The vehicle driving support device according to claim 16, wherein the display unit displays information, in steps, regarding a degree of the second driving operation state on the second display part in a direction of separation from a first display part side, as the degree is increased.

22. The vehicle driving support device according to claim 14, wherein an area of the first display part is larger than an area of said one second display area, and is larger than an area of said other second display area.

23. The vehicle driving support device according to claim 1, wherein the operation state determination unit is configured to determine whether the driving operation state is a first driving operation state exhibiting moderate change of acceleration, and has a display unit displaying vehicle driving information including information regarding the first driving operation state when the driving operation state is determined to be the first driving operation state.

24. The vehicle driving support device according to claim 23, wherein
the operation state determination unit is configured to determine whether a second driving operation state exhibiting sudden change of acceleration is established, and
the display unit is configured to display vehicle driving information including information regarding the second driving operation state, when the operation state determination unit determines that the second driving operation state is established.

25. The vehicle driving support device according to claim 24, wherein the display unit is configured to display information regarding a direction in which sudden change of acceleration has occurred in such a manner that a driver can recognize this direction.

26. The vehicle driving support device according to claim 23, wherein
the operation state determination unit is configured to determine whether a third driving operation state exhibiting slow change of acceleration is established, and
the display unit is configured to display vehicle driving information including information regarding the third driving operation state, when the operation state determination unit determines that the third driving operation state is established.

27. The vehicle driving support device according to claim 24, further comprising a decision unit to decide advice information regarding next driving operation of a vehicle, based on the information regarding the second driving operation state, wherein
the display unit is configured to display the advice information decided by the decision unit when ignition is off.

28. The vehicle driving support device according to claim 27, wherein the display unit is configured to display vehicle driving information regarding the current drive of a vehicle when the ignition is off, and thereafter display advice information regarding next driving operation of the vehicle.

29. The vehicle driving support device according to claim 28, wherein the vehicle driving information regarding the current drive of the vehicle includes information regarding first and second driving operation states in the current drive of the vehicle, and information regarding echo-driving related to the current idling stop of the vehicle.

30. The vehicle driving support device according to claim 23, wherein when the ignition is on, the display unit is configured to display vehicle driving information regarding the previous drive of a vehicle, and thereafter is configured to display vehicle driving information regarding the current drive of the vehicle.

31. The vehicle driving support device according to claim 24, wherein the display unit is configured to display information regarding a degree of the second driving operation state in steps.

32. The vehicle driving support device according to claim 23, wherein the display unit is configured to change a display form of the vehicle driving information based on a driving operation state of a vehicle.

33. A vehicle driving support method performed by a vehicle driving support device having a controller to receive signals from at least one of an accelerator opening sensor, a speed sensor, a steering angle sensor, brake fluid pressure sensor, ignition sensor and a steering sensor of the vehicle, the controller includes a change amount calculation unit, a jerk calculation unit and an operation state determination unit, comprising:
utilizing the change amount calculation unit to calculate a first correlation value correlated to a change amount of an acceleration of a vehicle;
utilizing the jerk calculation unit to calculate a second correlation value correlated to a jerk of the vehicle; and
utilizing the operation state determination unit to determine a driving operation state of the vehicle,
the determining a driving operation state of the vehicle utilizing the operation state determination unit further including:
calculating a ratio of a kinetic energy of a mass point to the change amount of the acceleration of the vehicle at an end point of a change when the acceleration of the vehicle is changed, by using a vibration model showing a movement of the mass point in a passenger compartment, based on the first correlation value and the second correlation value; and
determining the driving operation state of the vehicle based on the calculated ratio of the kinetic energy to the change amount of the acceleration in accordance with the predetermined reference.

* * * * *